United States Patent
Hoshino et al.

(10) Patent No.: US 8,205,074 B2
(45) Date of Patent: Jun. 19, 2012

(54) DATA COMMUNICATION METHOD AND DATA COMMUNICATION SYSTEM

(75) Inventors: Kazuyoshi Hoshino, Tokyo (JP); Keisuke Takeuchi, Kunitachi (JP); Osamu Takata, London (GB); Tadashi Kaji, Yokohama (JP); Takahiro Fujishiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1555 days.

(21) Appl. No.: 11/637,694

(22) Filed: Dec. 13, 2006

(65) Prior Publication Data

US 2007/0162744 A1  Jul. 12, 2007

(30) Foreign Application Priority Data

Dec. 13, 2005  (JP) ................. 2005-358398

(51) Int. Cl.
*H04L 29/06* (2006.01)
*G06F 15/177* (2006.01)
*G06F 15/16* (2006.01)

(52) U.S. Cl. ......... 713/156; 709/220; 709/227; 709/238

(58) Field of Classification Search ............... None
See application file for complete search history.

(56) References Cited

U.S. PATENT DOCUMENTS

| | | | | |
|---|---|---|---|---|
| 6,374,300 | B2* | 4/2002 | Masters | 709/229 |
| 7,729,341 | B2* | 6/2010 | Kobayashi et al. | 370/352 |
| 2002/0027915 | A1* | 3/2002 | Foti et al. | 370/392 |
| 2002/0032799 | A1* | 3/2002 | Wiedeman et al. | 709/245 |
| 2004/0186850 | A1* | 9/2004 | Chowdhury et al. | 707/102 |
| 2004/0249951 | A1* | 12/2004 | Grabelsky et al. | 709/227 |
| 2006/0029045 | A1* | 2/2006 | Kobayashi et al. | 370/352 |
| 2006/0029049 | A1* | 2/2006 | Kobayashi et al. | 370/356 |
| 2006/0098624 | A1* | 5/2006 | Morgan et al. | 370/352 |
| 2006/0155864 | A1 | 7/2006 | Izumi | |
| 2006/0259625 | A1* | 11/2006 | Landfeldt et al. | 709/227 |
| 2007/0043829 | A1* | 2/2007 | Dua | 709/219 |

FOREIGN PATENT DOCUMENTS

| | | |
|---|---|---|
| JP | 2002-152805 | 5/2002 |
| JP | 2005-160005 | 6/2005 |
| JP | 2006-128751 | 5/2006 |

OTHER PUBLICATIONS

Deb Shinder, Windows OS Security, Feb. 17, 2003.*
Alan B. Johnson, SIP Understanding the Session Initiation Protocol, 2001, Artech House, Norwood, pp. 23-44.
Rohan Mahy, TLS vs IPsec, SIP Mailing List, Jan. 29, 2002, pp. 1-3.

* cited by examiner

*Primary Examiner* — Nathan Flynn
*Assistant Examiner* — Trang Doan
(74) *Attorney, Agent, or Firm* — Antonelli, Terry, Stout & Kraus, LLP.

(57) ABSTRACT

In a data communication method and a data communication system, a session control message designating a destination server with identification information unique to application is transferred to the destination via a session management server. When an application program or encrypted communication software on a client issues a connection request designating a destination with identification information unique to application, the client or the session management server automatically converts the identification information into a desired resource identifier identifiable a domain to thereby determine a domain as the destination of the received connection request message.

13 Claims, 44 Drawing Sheets

LOCATION SERVICE TABLE 60

| AOR | IP ADDRESS | |
|---|---|---|
| cl1@aaa.com | 192.0.2.1 | EN-1 |
| cl2@aaa.com | ..... | EN-2 |
| sv1@aaa.com | ..... | EN-3 |
| sv2@aaa.com | ..... | EN-4 |
| cl1@bbb.com | ..... | EN-5 |
| cl2@bbb.com | ..... | EN-6 |
| sv1@bbb.com | 192.0.2.4 | EN-7 |
| sv2@bbb.com | ..... | EN-8 |

IDENTIFICATION INFORMATION MANAGEMENT TABLE 64

| IDENTIFICATION INFORMATION | AOR | |
|---|---|---|
| ftp://www.aaa.com/ | sv1@aaa.com | REN-1 |
| http://www.aaa.com/ | sv2@aaa.com | REN-2 |
| http://www.bbb.com/ | sv1@bbb.com | REN-3 |
| ipv4:192.0.2.4 | sv1@bbb.com | REN-4 |

SIP PROXY PRa

DATA COMMUNICATION METHOD AND DATA COMMUNICATION SYSTEM

CROSS-REFERENCE TO RELATED APPLICATION

This application is related to U.S. application Ser. No. 11/258,418 filed Oct. 26, 2005, the content of which is incorporated herein by reference.

INCORPORATION BY REFERENCE

The present application claims priority from Japanese application JP-2005-358398 filed on Dec. 13, 2005, the content of which is hereby incorporated by reference into this application.

BACKGROUND OF THE INVENTION

The present invention relates to a data communication method and a data communication system and, more particular, to a data communication method and a data communication system for enabling encrypted data communication between a client and a server, using a session management server.

In a method of encrypted communication in a network, a client and a server carry out a peer device authentication procedure to prevent communication with an unintended peer for each other and, upon a successful peer device authentication, exchange encryption parameters for communication. Public key certificates are applied in Internet Protocol Security (IPsec) described in RFC 2401 of the Internet Engineering Task Force (IETF) and Transport Layer Security (TLS) described in RFC 2246.

In the case of authentication using public key certificates, it is necessary for each node which may be a client or a server to verify that a public key certificate provided by its peer is the one issued from a reliable certificate authority by any method. For example, one method of verifying a public key certificate is to obtain in advance a reliable certificate authority's root certificate for authenticating the certificate authority that issued the public key certificate offered by the peer by any method and verify the certificate authority's signature attached to the public key certificate offered by the peer by the public key of the certificate authority's root certificate. According to this verification method, a server and a client have to prepare in advance the root certificates of certificate authorities in association with public key certificates of all peer devices with which the server/client may communicate.

As FIG. 1 shows, for example, assume a system where a plurality of clients (terminal devices) CL1, CL2, and CL3 have secret keys SK1, SK2, and SK3 and public key certificates PK1, PK2, and PK3 issued by different certificate authorities (CA1, CA2, and CA3), respectively, and servers SV1, SV2, and SV3 also have secret keys SK1, SK12, and SK13 and public key certificates PK11, PK12, and PK13 issued by different certificate authorities (CA1, CA2, and CA3), respectively. To enable each client to communicate with one of the servers SV1, SV2, and SV3 at any time, each server must have in advance a plurality of root certificates RT1, RT2, and RT3 for the certificate authorities (CA1, CA2, and CA3) that issued the public key certificates (PK1, PK2, PK3), respectively, each being held by each of the clients CL1, CL2, and CL3 that can be a peer to the server, as shown. Likewise, each client also must prepare in advance the plurality of root certificates RT1, RT2, and RT3 for the certificate authorities (CA1, CA2, and CA3) that issued the public key certificates (PK11, PK12, PK13), respectively, each being held by each of the servers SV1, SV2, and SV3 that can be a peer to the client. In this system architecture, each client and each server must repeat an authentication process each time when initiating communication with its peer.

FIG. 2 shows a block diagram of a basic configuration of software that a client arms to carry out IPsec-encrypted communication described in the above-mentioned RFC 2401.

Here, reference numeral 20 denotes a network interface card (NIC) module, 30 denotes a TCP/IP layer software module, 40 denotes an application layer software module, and 50 denotes a software module for Internet Key Exchange (IKE) process as a key management process described in RFC 2409. An encryption engine 31 is provided as a part of the TCP/IP layer software, equipped with a Security Policy Data Base (SPDB) 32 storing information (SP information) for determining whether encryption should be applied to transmission packets and a Security Association Data Base (SADB) 33 storing information (SA information) such as encryption schemes and encryption keys which are used for encrypted communication.

A server that can be a peer to the client also arms the same software as shown in FIG. 2, so that the client's application layer will communicate with the server's application layer and the client's key management process will communicate with the server's key management process.

When the encryption engine 31 detects an IP packet transmission request issued by a program in the application layer 40, it checks the header information of the IP packet against the SPDB 32 and determines whether IPsec should be applied to this IP packet. Having determined that IPsec should be applied to the IP packet, the encryption engine 31 retrieves Security Association (SA) information to be used for the IP packet from the SADB 33. At this time, if the SA information for the IP packet has not been registered in the SADB 33, the encryption engine 31 requests the IKE (key management) process 50 to exchange SA information including an encryption key with the peer (destination server).

The IKE process 50 exchanges SA information with the peer in accordance with an Internet Security Association and Key Management Protocol (ISAKMP) described in RFC 2408. In the ISAKMP, after establishing an encrypted communication path between itself and its peer, each communication node carries out an authentication procedure to verify whether the peer is a true device permitted for communication. Upon verifying that the peer is a true device permitted for encrypted communication by the above authentication procedure, the IKE process 50 starts to exchange SA information with the peer device through the communication path set up by ISAKMP. Upon completing the exchange of SA information with the peer, the IKE process 50 notifies the encryption engine 31 of the SA information and related Security Policy (SP) information.

After storing the SP information and SA information notified from the IKE process 5 into the SPDB 32 and SADB 33, respectively, the encryption engine 31 encrypts the IP packet in accordance with the SA information and transmits it to the peer. Upon receiving the encrypted IP packet, a server as the peer decrypts the received IP packet in accordance with the SA information agreed upon by the IKE process and notifies the server's application layer of the IP packet reception.

Meanwhile, RFC 3261 describes a method in which mutual authentication between a client (user agent client) and a Session Initiation Protocol (SIP) proxy which is a session management server and mutual authentication between the SIP proxy and a server (user agent server) are performed by Transport Layer Security (TLS) and encrypted communication is performed between the client and the SIP proxy and between the SIP proxy and the server. According to the SIP model of RFC 3261, the client and the server are initially verified to be true peers by the SIP proxy and encrypted SIP messages are communicated between the client and the server. Thus, it is difficult for a device other than the client, server, and SIP proxy to intercept messages communicated between the client and the server.

The SIP is a text-based protocol and a SIP message is comprised of a header and a message body indicating the contents of session. Details on the SIP are described in RFC 3263. Moreover, RFC 2327 discloses a Session Description Protocol (SDP) that is used for session descriptions and a method of describing encryption parameters to be exchanged between a client and a server. The client and server in the SIP model exchange session descriptions and encryption parameters by SIP messages through encrypted communication paths established between the client and the SIP proxy and between the SIP proxy and the server. Then, communication of encrypted packets using the encryption parameters can be performed between the client and server.

FIG. 3 shows an example of an authentication system using the above described SIP proxy. Here, "PR" denotes a ship proxy connected to a plurality of clients CL1, CL2, and CL3 and a plurality of servers SV1, SV2, and SV3. The SIP proxy PR uses a secret key SK 30 and a public key certificate PK30 issued by a certificate authority CA4 and has in advance a plurality of root certificates RT1, RT2, and RT3 corresponding to certificate authorities (CA1, CA2, and CA3) that issued public key certificates to be used by the servers SV1, SV2, and SV3, respectively, in order to authenticate these servers.

In the authentication system using the SIP proxy, each of servers and clients is solely required to have only a root certificate RT4 for the certificate authority that issued the public key certificate PK30 to be used by the SIP proxy, as the root certificate for authenticating its peer, as shown in FIG. 3. When each client wishes to connect to another server after terminating a communication with one server via the SIP proxy, the client can communicate with the SIP proxy through the already established encrypted communication path between itself and the SIP proxy. Thus, the client is solely required to exchange encryption parameters with a new peer before initiating encrypted communication with the new peer. In other words, in the authentication system using the SIP proxy, it is advantageous that each client does not have to perform a new authentication process each time connecting to another server.

Nevertheless, in the SIP framework, the session management server (SIP proxy) determines the forwarding destination of a received SIP message by an identifier (SIP-URI) in a form of "user-name@domin-name" which is termed Address-of-Record (AOR). Thus, in a network system requiring session set up via a session management server like the above SIP proxy, an application to be executed on a client has to use, as the identifier for designating a destination server, SIP-URI (Uniform Resource Identifier) capable of identifying a domain to which the server belongs.

More specifically, in the SIP framework, a client creates a connection request SIP message, in which SIP-URI in the form of AOR to specify a destination server is described as a Request-URI included in a start line, and transmits an IP packet including the SIP message in the payload to a home SIP proxy located in the domain to which the client belongs. Having received the IP packet, the SIP proxy executes, for example, NATPR Record search and SRV Record search in a Domain Name System (DNS), based on the domain name given from the AOR described as the Request-URI, thereby determining the IP address or Full Qualified Domain Name (FQDN) of a SIP proxy (forwarding destination SIP proxy) located in a domain to which the server to be the forwarding destination of the received message belongs. If the result of the SRV Record search gives FQDN, the IP address of the forwarding destination SIP proxy can be obtained by executing A Record search in the DNS. A procedure for obtaining the IP address of the forwarding destination SIP proxy from a domain name is described in RFC 3263.

If the destination server belongs to the home domain to which the SIP proxy having received the SIP message belongs, the SIP proxy obtains the IP address (or FQDN) of the destination server from a location service DB (database), using the SIP-URI described in the Request-URI of the received message as a search key, assigns this IP address to the destination address of the IP packet, and forwards the SIP message to the destination server. If the destination serve belongs to a domain different from the home domain to which the SIP proxy (or the source client) belongs, the SIP message is forwarded to a SIP proxy located in a domain to which the destination server belongs. This forwarding destination SIP proxy obtains an IP address or FQDN of the destination server from the location service DB and forwards the SIP message to the destination server.

As described above, in the network system requiring session set up via a session management server (SIP proxy), the session management server having received a SIP message determines the domain to which the destination server belongs from the requested resource identifier (SIP-URI) included in the received SIP message and forwards the received message to the destination server or destination session management server. However, each of general application programs that are executed on a client terminal connected to an IP network uses an identifier like an IP address that identifies only a destination server, rather than an identifier in a framework of SIP such as the SIP-URI in the AOR form described above, or uses an identifier like the URL which includes a domain name and which differs in the framework from the SIP-URI, to specify the destination server.

If an application program or software for encrypted communication issues a connection request designating the destination server with an IP address or a URL and a client transmits a connection request SIP message including the IP address or the URL for designating the destination server, a session management server (SIP proxy) having received this connection request message cannot identify a domain to which the received message must be forwarded. In this case, clients cannot take profit from the advantage of the authentication system shown in FIG. 3.

SUMMARY OF THE INVENTION

An object of the present invention is to provide a data communication method and a data communication system for making it possible to forward a session control message, which designates a destination server with an identifier (to be referred to also as a destination identifier hereinbelow) such as an IP address or a URL which corresponds to a specification of application and which is different from those employed by a session management server, to the destination server via the session management server.

Another object of the present invention is to provide a data communication method and a data communication system making it possible to forward a connection request, which is issued from a client and which designates a destination server with a destination identifier, to the destination server via a session management server.

A further object of the present invention to provide a data communication method and system enabling encrypted data communication between a client and a server and making it easy to perform a client-to-server authentication procedure required prior to the encrypted data communication.

To achieve the above objects, in the present invention, when an application program or encrypted communication software on a client issues a connection request designating a destination server with a destination identifier, the client, the session management server, or an identification information management server automatically converts the destination identifier into a desired resource identifier with which the session management server can identify a domain.

According to a first embodiment of the present invention, there is provided a data communication method for communication between a client and a server via a communication network to which session management servers are connected, comprising: a first step of sending from the client to first one of the session management servers or an identification information management server a query, in which a destination identifier of a destination is specified, to search for a resource identifier including a domain name assigned to the destination server; a second step of retrieving by the first one of the session management servers or the identification information management server a resource identifier corresponding to the destination identifier of the destination server from a location table indicating the correspondence of destination identifiers to resource identifiers, and notifying the client of the resource identifier; a third step of transmitting a connection request message from the client to the first one of the session management servers, the connection request message designating a request resource with the resource identifier of the destination server; and a fourth step of determining, by the first one of the session management servers having received the connection request message, a forwarding destination of the received message based on a domain name included in the resource identifier specified in the received message, and forwarding the received message to the destination server or second one of the session management servers managing a domain to which the destination server belongs.

More specifically, the data communication method of the present invention further comprises: a fifth step of replying from the destination server to the client via the first or second one of the session management servers, in response to receiving the connection request message, a connection response message including parameters required for encrypted data communication; and a sixth step of communicating packets of messages encrypted in accordance with the parameters specified in the connection response message between the client and the destination server.

The session management servers are, for example, Session Initiation Protocol (SIP) servers. In this regard, messages to be communicated between a client and a session management server are encrypted according to Transport Layer Security (TLS) defined in RFC 3261. Data to be communicated between the client and the destination server is encrypted, for example, according to Internet Protocol Security (IPsec) defined in RFC 2401.

A session management server according to the present invention is comprised of: first means for retrieving, when a connection request message designating a request resource with a destination identifier of a destination server is received from a client, a resource identifier of the destination server corresponding to the destination identifier from a location table indicating the correspondence of destination identifiers to resource identifiers, and changing the destination identifier designating the request resource in the received message to the resource identifier; and second means for determining a forwarding destination of the received message based on a domain name included in the resource identifier, and forwarding the received message to the destination server or another session management server managing a domain to which the destination server belongs.

In particular, the session management server further comprises: a network interface connected to the communication network; a message processing module for processing session control messages; and a security module for decrypting an encrypted message received from the network interface to transfer a decrypted message to the message processing module and for encrypting a session control message received from the message processing module to output an encrypted message to the network interface, wherein the message processing module is provided with the functions of the first means for changing the description of the request resource and the second means for forwarding the received message.

A client terminal according to the present invention is comprised of: a network interface connected to a communication network; a message processing module for processing session control messages; a first security module for encrypting a transmission message generated by an application program and addressed to a destination server to output an encrypted message to the network interface and decrypting an encrypted message received from the network interface to transfer a decrypted message to the application program; and a security information control module for outputting, when a request to exchange encryption parameters with a destination server occurs, a connection request message designating the destination server with a destination identifier to the message processing module and for transferring, when a connection response message is received from the message processing module, encryption parameters extracted from the received message to the first security module.

The message processing module obtains, when the connection request message is received from the security information control module, a resource identifier of the destination server from a session management server or the destination server based on the destination identifier, and transmits the connection request message, in which a request resource is specified with the resource identifier, to the session management server.

For practical application, the client terminal of the present invention further comprises a second security module for decrypting an encrypted session control message received from the network interface to transfer a decrypted message to the message processing module and encrypting a session control message received from the message processing module to output an encrypted message to the network interface module.

Data to be communicated with the destination server is encrypted by the first security module and messages to be communicated with the session management server are encrypted by the second security module.

According to the present invention, even if a connection request designating the request resource (destination sever) with a destination identifier is issued from an application program or encrypted communication software on a client, the destination identifier of the request resource in the connection request message can be automatically converted to a resource identifier by which a domain is identifiable. Thus, a session management server that controls forwarding of a connection request message can determine a domain, to which the message should be forwarded, from the resource identifier in the received message and forward the received message to the destination server or a session management server located in a domain to which the destination server belongs.

According to the present invention, even a client that executes general application programs can easily carry out encrypted data communication with a destination server by taking advantage of authentication facilities provided by a session management server.

Other objects, features and advantages of the invention will become apparent from the following description of the embodiments of the invention taken in conjunction with the accompanying drawings.

DETAILED DESCRIPTION OF THE EMBODIMENTS

Figure 1:
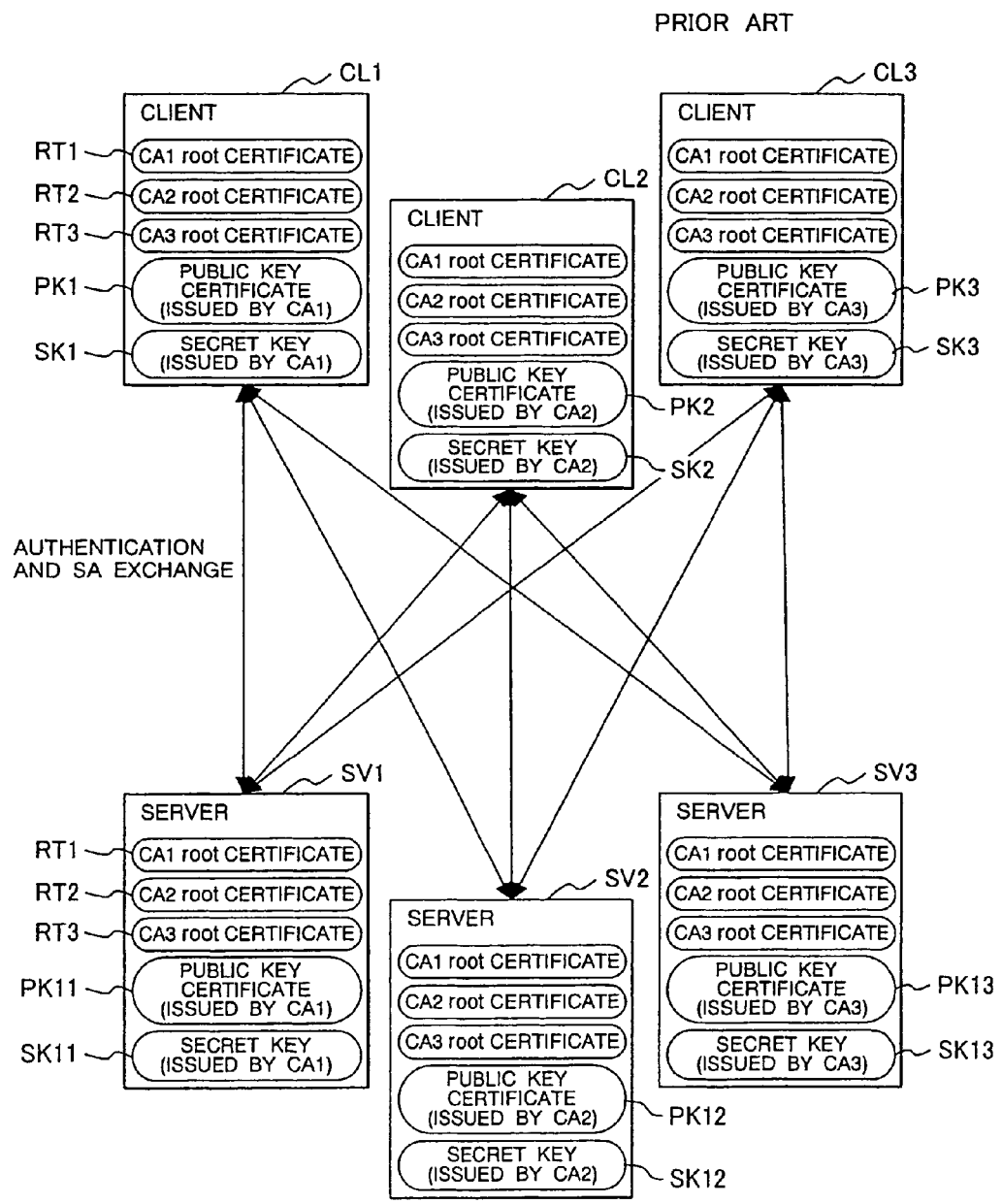
FIG. 1 is a diagram for explaining a prior art authentication procedure in public key encrypted communication.
Figure 2:
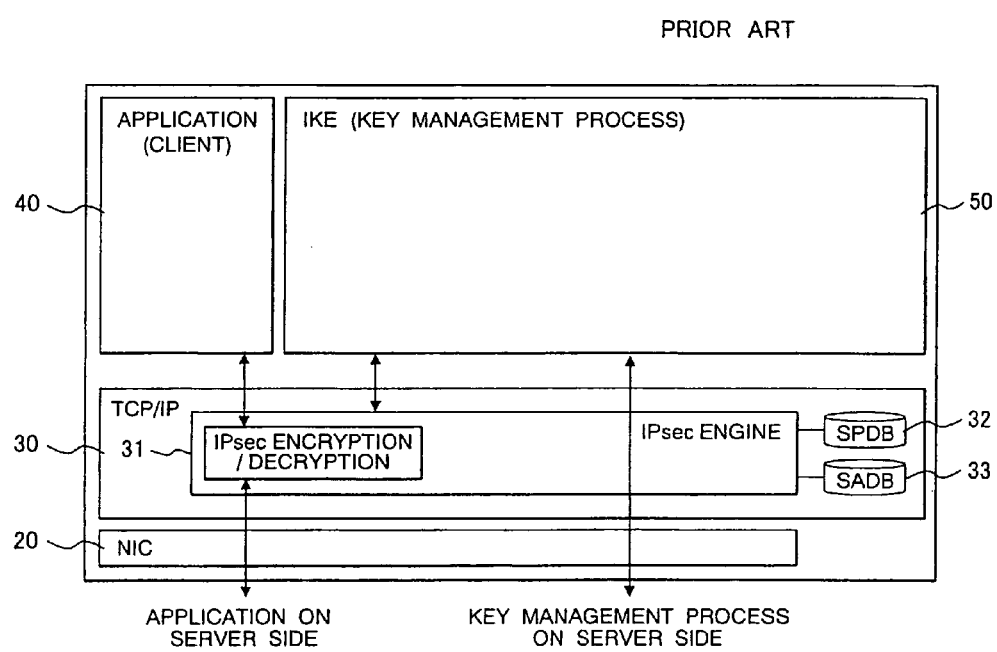
FIG. 2 is a block diagram for explaining a basic configuration of software that a client arms to carry out IPsec-encrypted communication according to prior art.
Figure 3:
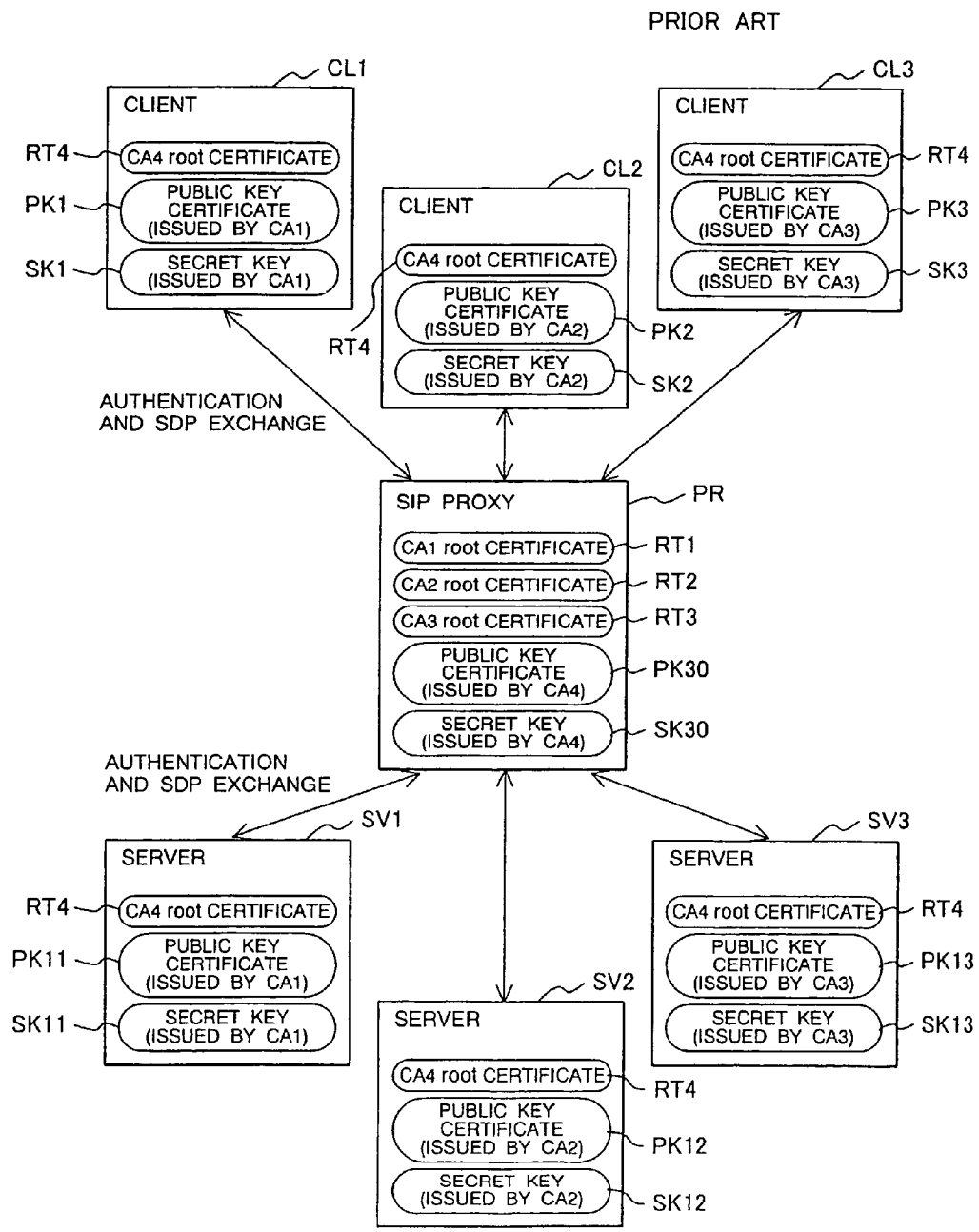
FIG. 3 is a diagram for explaining an authentication system using a SIP proxy relevant to the present invention.

Embodiments of the present invention will be described hereinafter by referring to the drawings.

Figure 4:
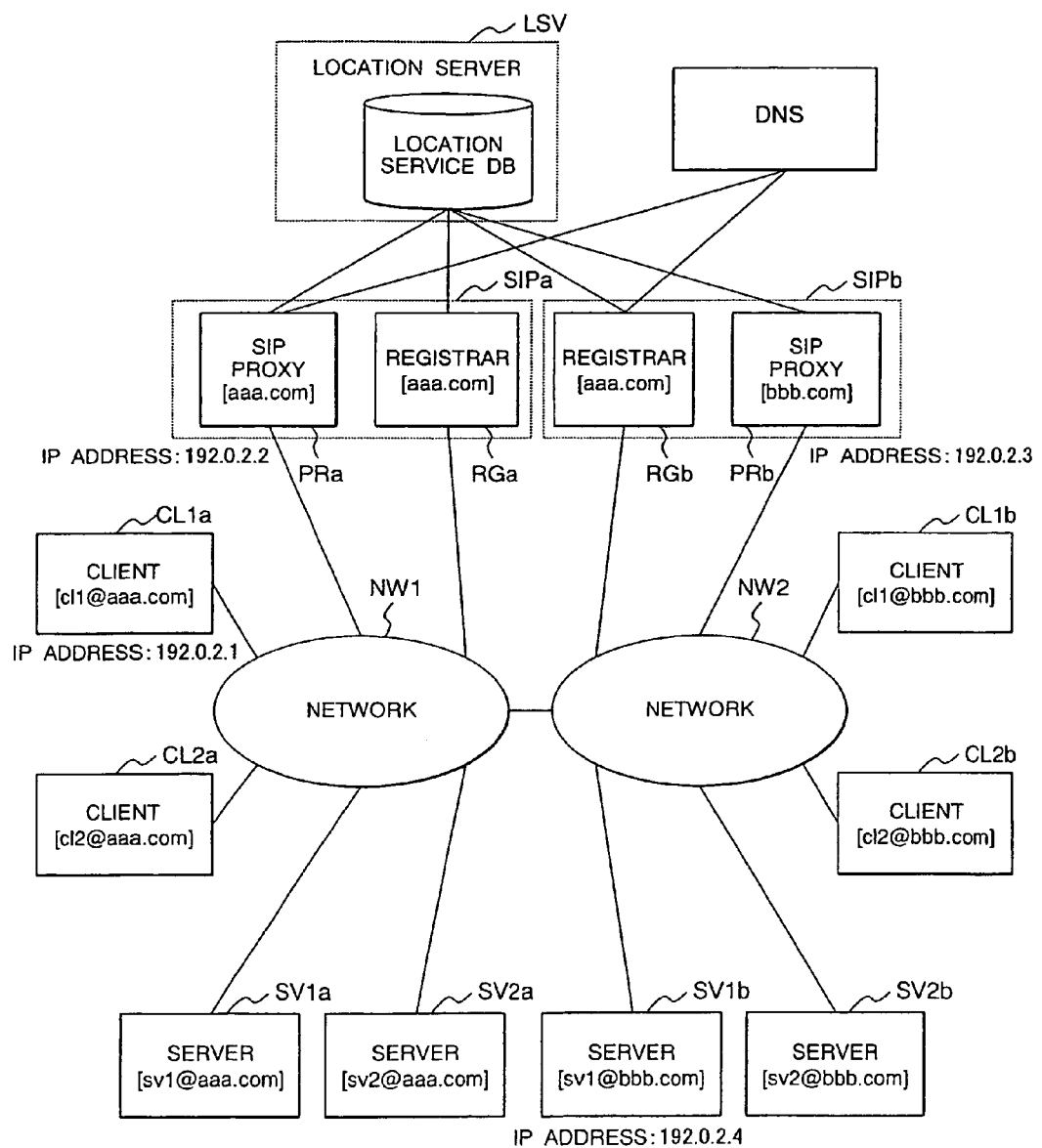
FIG. 4 is a diagram showing an example of a network configuration including session management servers (SIP servers) according to the present invention.

FIG. 4 is an example of a network configuration to which the present invention is applied.

The network shown here is composed of a location server LSV, a Domain Name System (DNS), a first network NW1 forming a first domain managed by a SIP server SIPa, and a second network NW2 forming a second domain managed by a SIP server SIPb. To the first network NW1, clients CL1a, CL2a and servers SV1a, SV2a are connected. To the second network NW2, clients CL1b, CL2b and servers SV1b, SV2b are connected. The SIP server SIPa is comprised of a SIP proxy PRa and a registrar RGa. The SIP server SIPb is comprised of a SIP proxy PRb and a registrar RGb.

Here, a character string specified in parentheses attached to each client and each server denotes a value of SIP-URI in the Address-of-Record (AOR) form, corresponding to a forwarding destination identifier (resource identifier) of a SIP message. The clients and servers connected to the first network NW1 are respectively assigned AORs including the domain identifier "aaa.com" of the SIP server SIPa. The clients and servers connected to the second network NW2 are respectively assigned AORs including the domain identifier "bbb.com" of the SIP server SIPb.

Upon receiving a SIP message designating a destination server with a URL from a client under management, the SIP server SIPa or SIPb according to the present invention requests the location server LSV to search for an AOR (resource identifier) corresponding to the URL of the destination. Upon receiving a SIP message designating a destination server with an AOR from the other SIP server, the SIP server SIPa or SIPb requests the location server LSV to search for an IP address corresponding to the AOR of the destination.

Figures 5, 6:
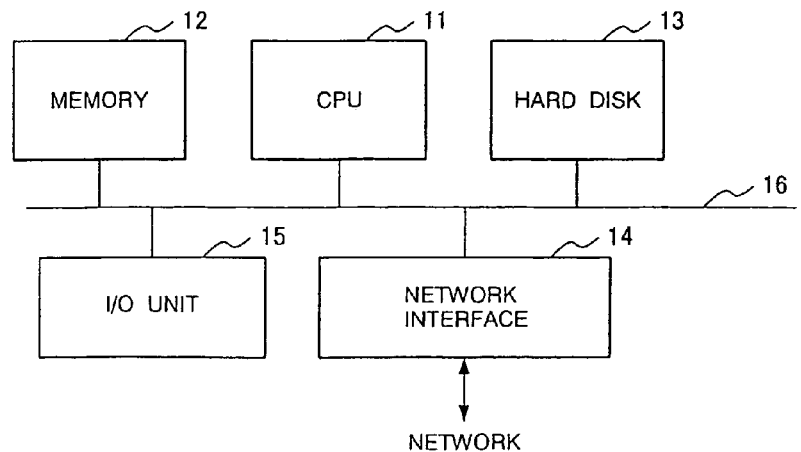
FIG. 5 shows an example of a location service table provided in a location server shown in FIG. 4
FIG. 6 is a block diagram showing a hardware configuration of a SIP proxy PRa shown in FIG. 4.

The location server LSV has a location service database (DB) in which a location service table 60 is stored. As shown in FIG. 5, the location service table 60, for example, is comprised of a plurality of entries EN-1, EN-2, and so on, each corresponding to each of the clients and servers under the management of the SIP servers SIPa and SIPb. Each entry stores a location service table 60 indicating the correspondence of a client's or server's AOR 61 to an IP address 62. Also, the location server LSV includes an identification information management table 64 including a plurality of entries REN-1, REN-2, and so on corresponding to the clients and the server under supervision of the SIP servers SIPa and SIPb. Each entry indicates a correspondence between identification information 63 and the AOR 61 in which the identification information 63 is used by an application program or encrypted communication software of the client or the server to identify a device of its communicating partner. In response to a location data search request with an AOR designated as a search key from an SIP server, the location server LSV searches the location service table 60 for an IP address corresponding to the AOR and returns the search result to the requester SIP server. Similarly, in response to a location data search request with identification information 63 such as a URL designated as a search key from an SIP server, the location server LSV searches the identification information management 63 for an AOR corresponding to the identification information 63 and returns the search result to the requester SIP server. In the embodiment, it is possible to designate a URL, a URI, or an IP address as the identification information 63. The information 63 is not limited to the URL and the like, but may be information items which are assigned to the respective devices and which are mutually identifiable. When an IP address is employed, to facilitate discrimination between the IP address, the URL, and the URI, it is desirable to additionally designate a prefix, e.g., "ipv4:" or "ipv6:" as a first item of the IP address.

FIG. 6 shows a hardware configuration of a SIP proxy PRa.

The SIP proxy PRa is comprised, for example, of a processor (CPU) 11, a memory 12 and a hard disk 13 for storing a variety of software to be executed by the processor and related data, a network interface 14 for connecting to the network NW1 (NW2), and an I/O unit 15. These elements are interconnected by an internal bus 16. The SIP proxy PRb, registrars RGa, RGb, clients CL1a to CL2b, and servers SV1a to SV1b are basically composed of the same components of the SIP proxy PRa shown in FIG. 6.

In the following, a first embodiment of the present invention will be described, taking as an example a communication procedure to be performed in an instance where the client CL1a belonging to the first domain shown in FIG. 4 communicates encrypted data with the server SV1b belonging to the second domain.

Figure 7:
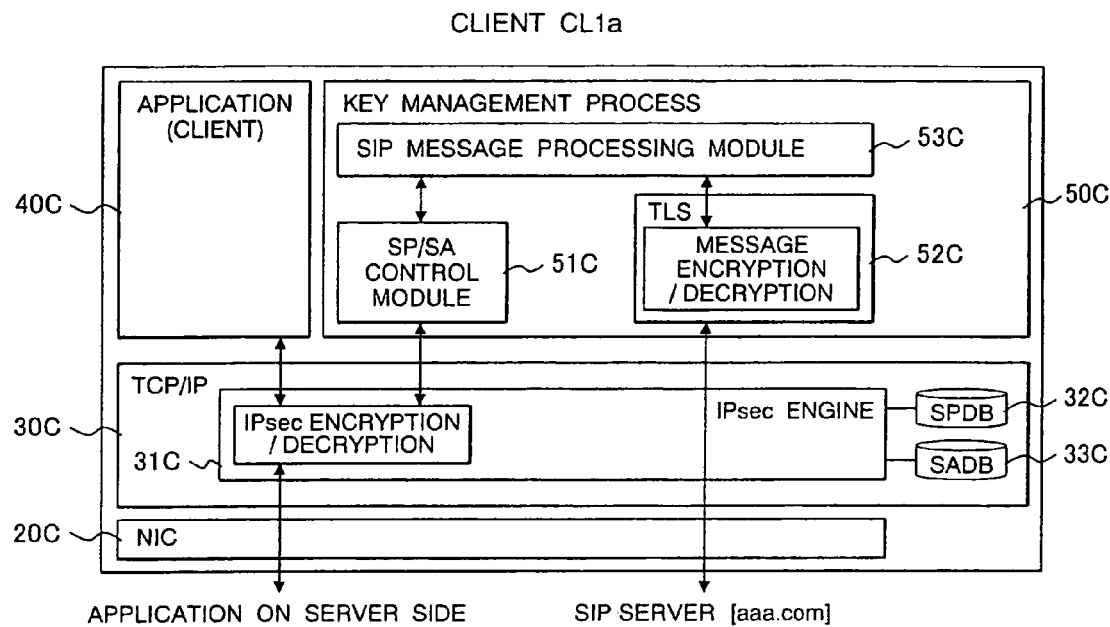
FIG. 7 is a diagram showing a basic configuration of software on a client VL1a shown in FIG. 4.

FIG. 7 shows a basic configuration of software on the client CL1a. Software on other clients CL1b to CL2b may also be organized like this. The software on the client CL1a is comprised of a network interface card (NIC) module 20C, an encrypted communication control module 30C including an encryption engine 31C provided with encryption/decryption functions, application programs 40C, and a key management process module SOC. The first embodiment has a feature in that the key management process module 50C comprises an encrypted communication control module 51C, a Transport Layer Security (TLS) module 52C, and a SIP message processing module 53C.

Figure 8:
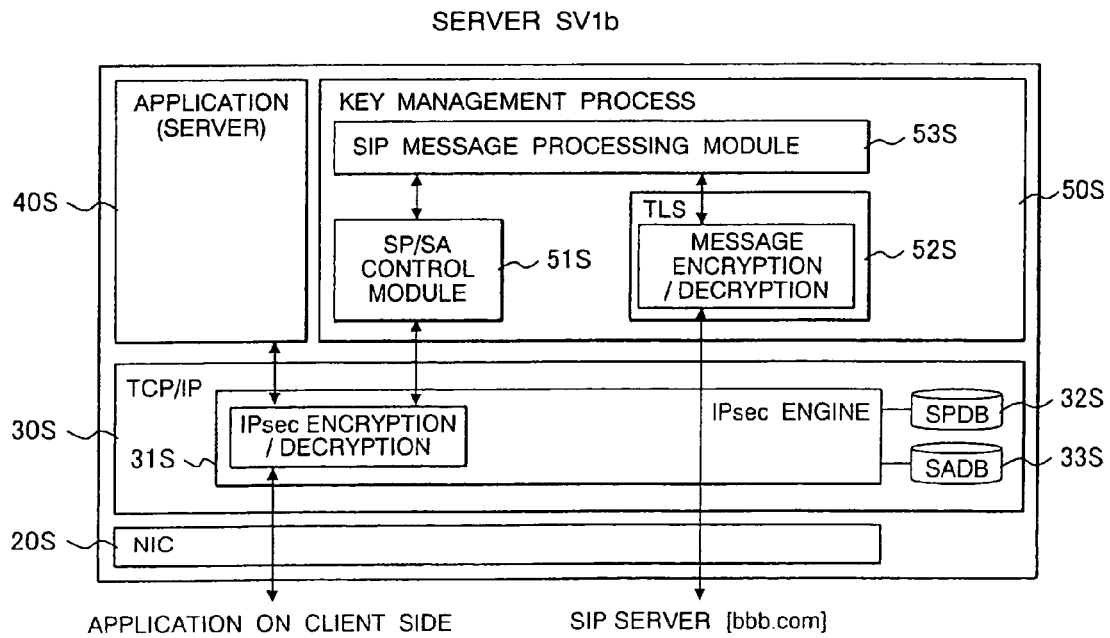
FIG. 8 is a diagram showing a basic configuration of software on a server SV1b shown in FIG. 4.

FIG. 8 shows an example of a basic configuration of software on the server SV1b. Software on other servers SV1a, SV2a, and SV2b may also be organized like this. The software on the server SV1b is comprised of a network interface card (NIC) module 20S, an encrypted communication function module 30S including a encryption engine 31S provided with IPsec encryption/decryption functions, an application program 40S, and a key management process module 50S. The key management process module 50S comprises an encrypted communication control module 51S, a TLS module 52S, and a SIP message processing module 53S.

In the embodiment, one of the application programs 40C on the client CL1a and the application program 40S on the server SV1b communicates encrypted data with each other, using the IPsec encryption/decryption functions of the encryption engines 31C, 31S provided on the client and the server. On the other hand, the SIP message processing module 53C on the client CL1a communicates encrypted SIP messages with a SIP message processing module on a SIP server SIPa (SIP proxy PRa, registrar RGa) which will be described later, using message encryption/decryption functions of the TLS modules provided on the client and the SIP server. Similarly, the SIP message processing module 53S on the server SV1b communicates encrypted SIP messages with the SIP message processing module on the SIP server SIPa (SIP proxy PRa, registrar RGa), using the message encryption/decryption functions within the TLS modules provided on the server and the SIP server.

Figure 9:
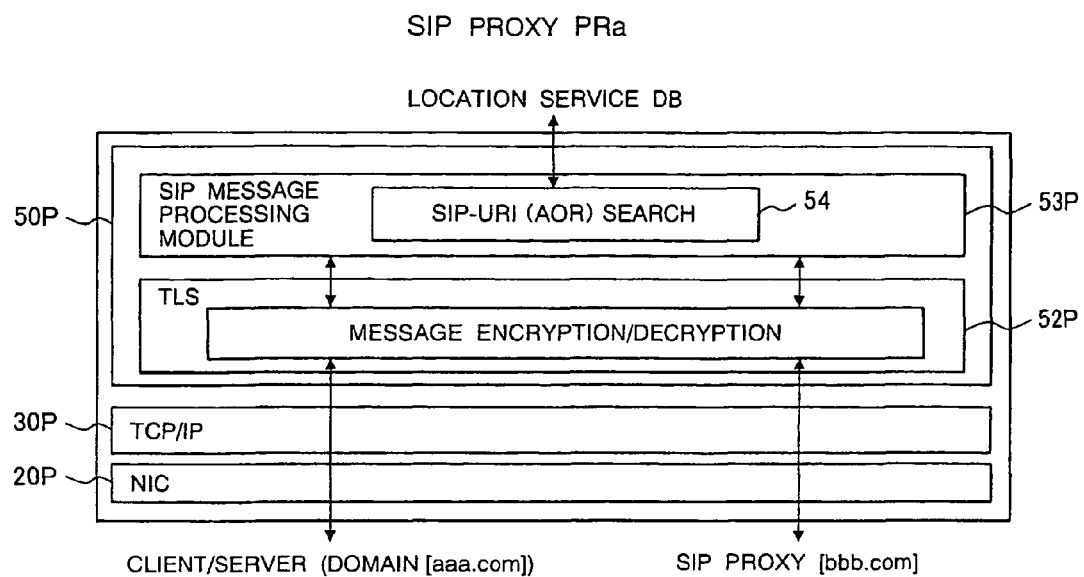
FIG. 9 is a diagram showing a basic configuration of software on a SIP proxy PRa shown in FIG. 4.

FIG. 9 shows an example of a basic configuration of software on a SIP proxy PRa. Software on a SIP proxy PRb may also be organized like this. The software on the SIP proxy PRa is comprised of a network interface card (NIC) module 20P, an encrypted communication function module 30P, and a key management process module 50P. The key management process module 50P comprises a TLS module 52P and a SIP message processing module 53P. The SIP message processing module 53P is provided with a SIP-URI (AOR) search function 54 which will be described later. The SIP message processing module 53P on the SIP proxy PRa communicates encrypted messages with each of clients and servers belonging to the domain managed by the SIP proxy and with each of the other SIP proxies each managing individual domain, for example, the SIP proxy PRb, using the message encryption/decryption functions of the TLS module 52P.

Figure 10:
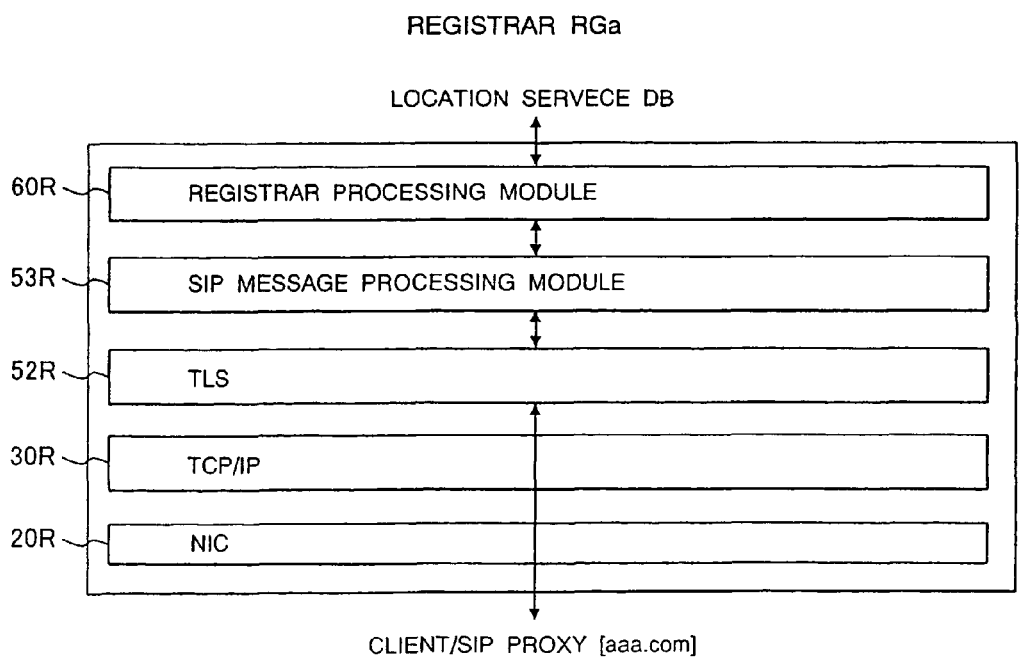
FIG. 10 is a diagram showing a basic configuration of software on a registrar PGa shown in FIG. 4.

FIG. 10 shows an example of a basic configuration of software on a registrar RGa. Software on a registrar RGb may also be organized like this. The software on the registrar RGa is comprised of a network interface card (NIC) module 20R, an encrypted communication function module 30R, a TLS module 52R provided with message encryption/decryption functions, a SIP message processing module 53R, and a registrar processing module 60R. Upon receiving an AOR request issued from a client or the SIP proxy PRa, the SIP message processing module 53R requests the registrar processing module 60R to execute location data search. In response to the request from the SIP message processing module 53R, the registrar processing module 60R accesses the location service DB provided on the location server LSV. It is not necessarily required to apply encryption to the communication between the registrar RGa and SIP proxy PRa.

Figure 11:
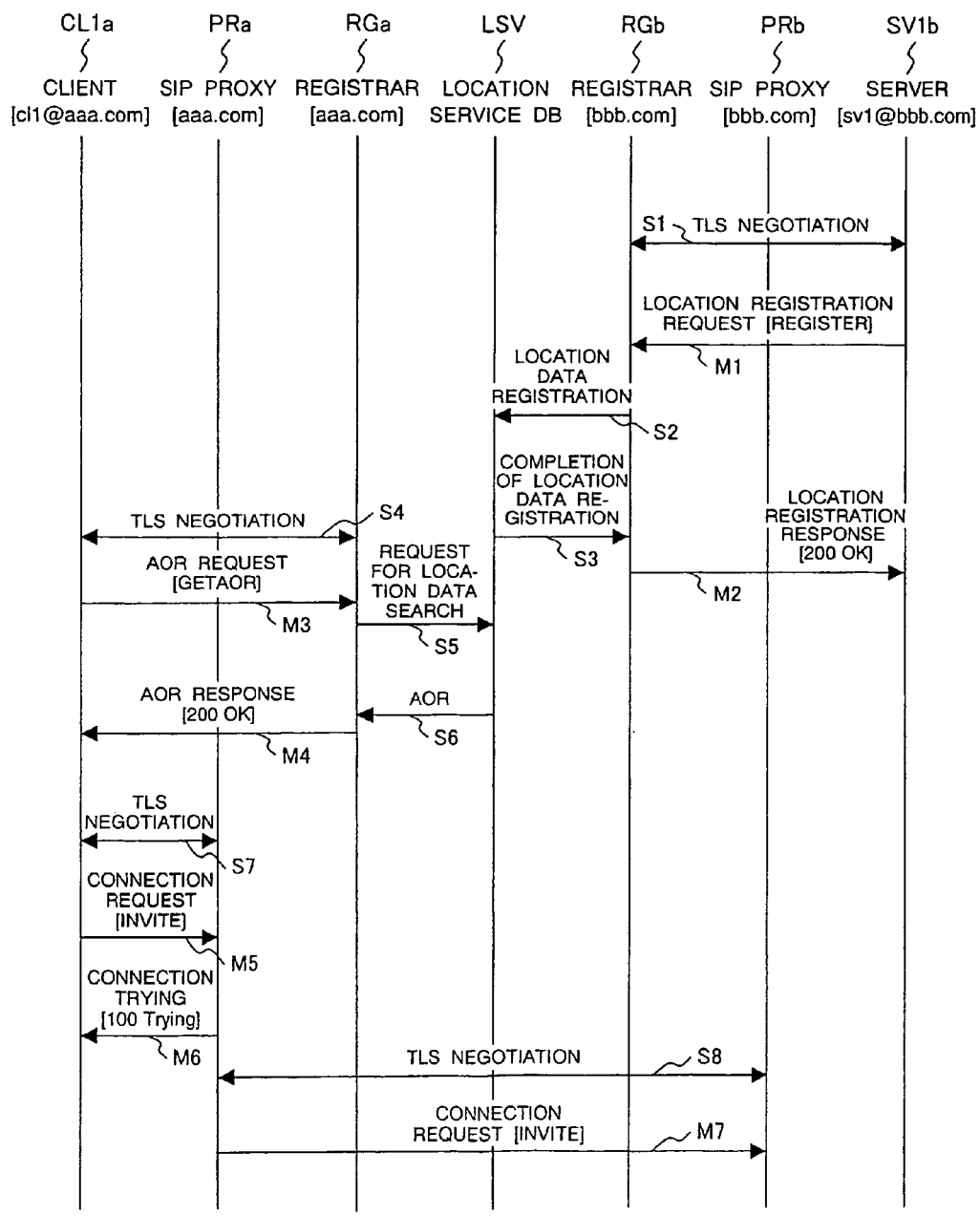
FIG. 11 is a part of a sequence chart for illustrating a first embodiment of encrypted communication according to the present invention.
Figure 12:
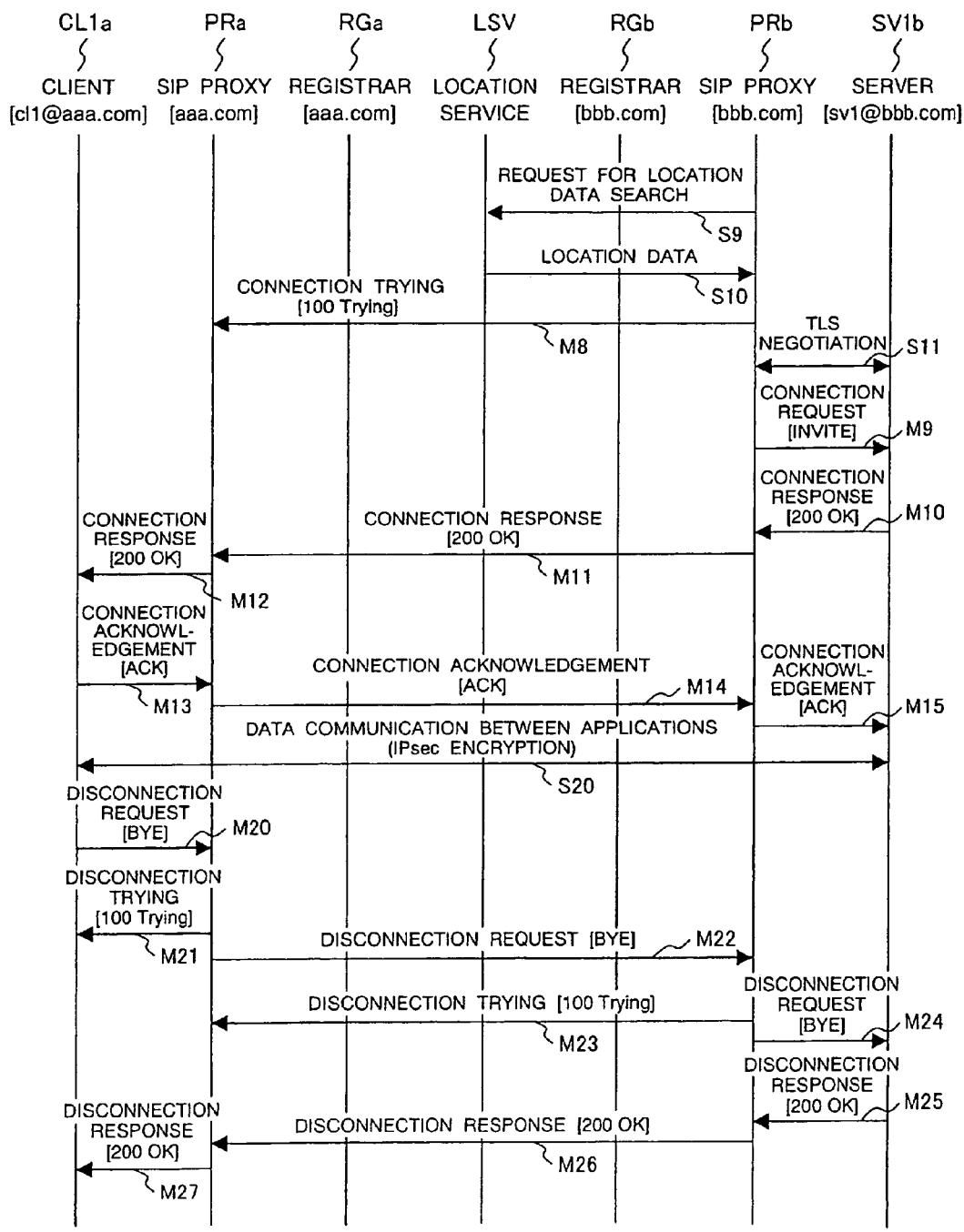
FIG. 12 is a remaining part of the sequence chart for illustrating the first embodiment of encrypted communication according to the present invention.

FIGS. 11 and 12 are a sequence chart illustrating the first embodiment of encrypted data communication according to the present invention. In the first embodiment, the client CL1a issues an AOR request. In this embodiment, the server SV1b connected to the second network, which is the destination of a connection request issued from the client CL1a, performs TLS negotiation (S1) with the registrar RGb of the SIP server SIPb to get authentication of the server SV1b and set parameters for encrypted communication prior to the connection request from the client CL1a. After that, the server SV1b transmits a location registration request (SIP: REGISTER) message M1 to the registrar RGb.

Figure 13:
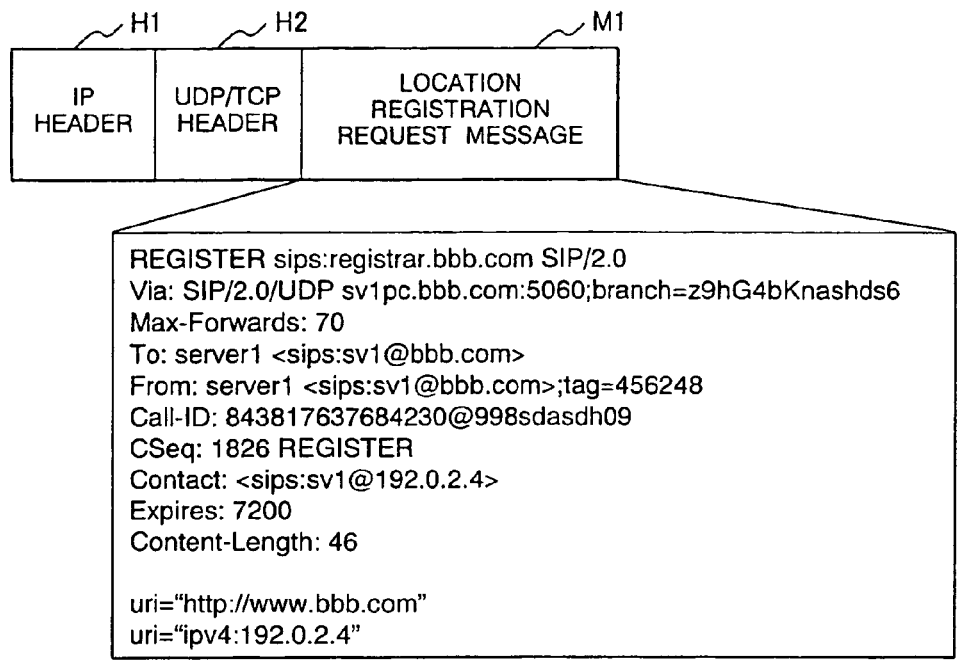
FIG. 13 shows an example of a format of a location registration request [REGISTER] message M1 shown in FIG. 11.

The location registration request message M1 is transmitted, for example, in the form of an IP packet with an IP header H1 and an UDP/TCP header H2 as shown in FIG. 13. The IP header H1 includes the IP address of the registrar RGb (SIP server SIPb) as a destination address and the IP address of the server SV1b as a source address.

A SIP message is comprised of a start line indicating the type of the SIP message (Request-Method), a header part in which information about a request or response is described, and a message body as required. The message body includes session descriptions for indicating the contents of a session. The start line includes a resource identifier (Request-URI) to identify the message destination depending on the message type. Session Description Protocol (SDP) standardized in RFC 3266 applies to writing the session descriptions in the message body.

In the case of the location registration request message M1 issued from the server SV1b, the start line includes "REGISTER" as the type of the SIP message and "registrar.bb.com" indicating the SIP-URI of the registrar RGb as the resource identifier specifying the message destination. The header part following the start line includes a Via header specifying the route of the SIP message, a To header specifying the destination of the message, a From header specifying the source of the message, a Call-ID header specifying the session identifier designated at the source, a CSeq header specifying the request method, a Contact header including the IP address "sv1@192.0.2.4" of the server SV1b to be registered into the location service table, an Expires header specifying the time-to-live of the message, a Content-Length header indicating the length of the message body that follows, and other header information. In the case of the location registration request message M1, the message contains a list of the identification information 63 of the server SV1b. A value "76" is set in the Content-Length header as the length of the message body part, and the SIP-URI value of the requester server SV1b, "sv1@bbb.com" is set in the To header and the From header.

Upon receiving the location registration request message M1, the registrar RGb registers location data indicating the relation between the requester SIP-URI "sv1@bbb.com" specified in the From header of the received message and the requester IP address "sv1@192.0.2.4" specified in the Contact header to the location service table 60 of the location service DB as well as identification information data indicating a relation between various identification information 63 contained in the message body part of the received message and the requester SIP-URI "sv1@bbb.com" specified in the From header of the received message to the identification information management table 64 (S2). Upon the completion of location data registration (S3), the registrar RGb transmits a location registration response message M2 shown in FIG. 14 to the requester server SV1b. The start line of the location registration response message M2 includes "200 OK" indicating a response and the header part includes substantially the same descriptions as that of header information of the location registration request message M1.

Description will now be given of a case in which after starting an application program in this state, the user of the client CL1a performs the operation to transmit a communication request to the URL "http://www.bbb.com/" of the server SV1b. In this case, the client CL1a performs TLS negotiation (S4) with the SIP server SIPa (registrar RGa) to get authentication of the client and to set parameters for encrypted communication. After that, the client CL1a transmits an AOR (Address-of-Record) request (SIP: GET AOR) message M3 to the SIP server SIPa (registrar RGa).

Figure 15:
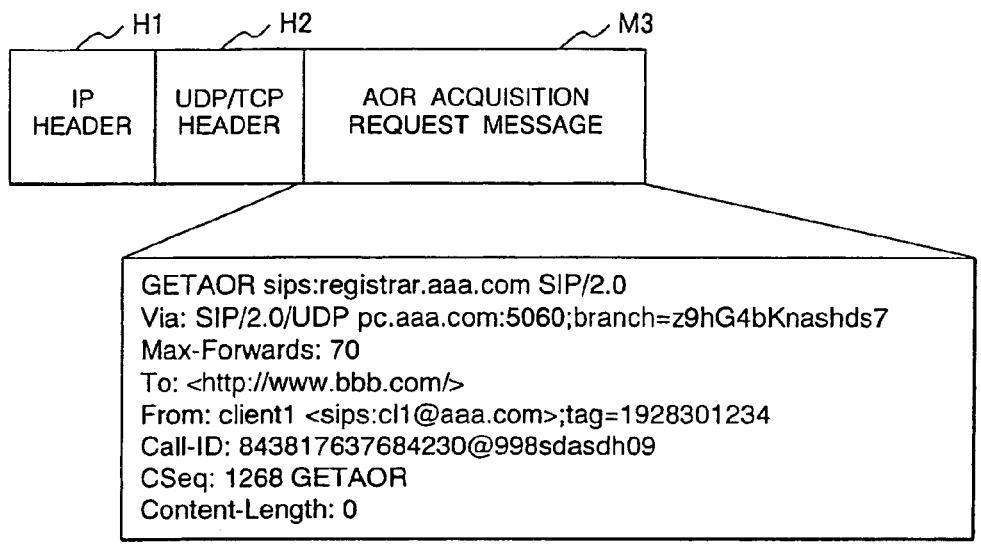
FIG. 15 shows an example of a format of an AOR request [GET AOR] message M3 shown in FIG. 11.

The AOR request message M3 includes, for example, as shown in FIG. 15, "GET AOR" indicating the type of the SIP message and "registrar.aaa.com" indicating the URI of the registrar RGa in the start line. The AOR request message M3 includes a Via header specifying the URI value to be the identifier of the encrypted communication control module 51C on the client CL1a, and a To header indicating the URL "http://www.bbb.com/" of the server SV1b to be the peer of the client CL1a. In the From header, "cl1@aa.com" indicating the URI of the client CL1a is set.

Upon receiving the AOR request message M3, the registrar RGa refers to the identification information management table 64 on the location service DB to search for the value of AOR (the URI of the server SV1b) corresponding to the URL "http://www.bbb.com/" specified in the To header of the received message (S5). When the location data AOR has been searched out (S6), the registrar RGa transmits an AOR response message M4 to the requester client CL1a.

Figure 16:
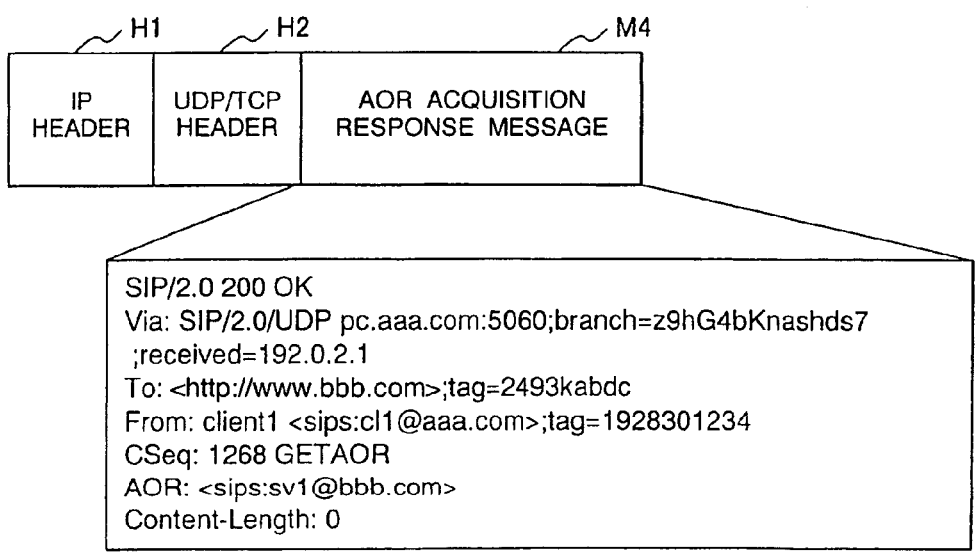
FIG. 16 shows an example of a format of an AOR response message M4 shown in FIG. 11.

The start line of the AOR response message M4 includes, as shown in FIG. 16, "200 OK" indicating that the message type is a response. The header part includes substantially the same descriptions as that of header information of the AOR request message M3 and an AOR header indicating the SIP-URI value "sv1@bbb.com" of the server SV1b retrieved from the identification information management table 64.

By receiving the AOR response message M4, the client CL1a can obtain the SIP-URI of the destination server SV1b. Then, the client CL1a performs TLS negotiation (S7) with the SIP proxy PRa of the SIP server SIPa to get authentication of the client and to set parameters for encrypted communication. After that, the client CL1a transmits to the SIP proxy PRa a connection request [INVITE] message M5 for the server SV1b.

Figure 17:
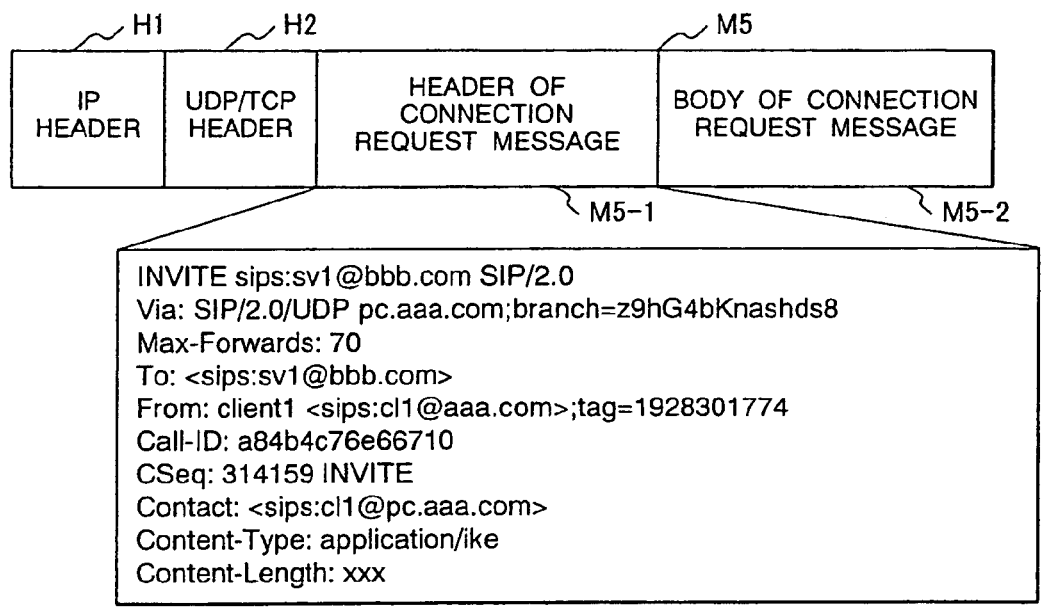
FIG. 17 shows an example of a format of a connection request [INVITE] message M5 shown in FIG. 11.

The connection request message M5 is comprised of a message header part M5-1 and a message body M5-2 as shown in FIG. 17. The message header part M5-1 begins with the start line including the message type "INVITE" and the SIP-URI "sv1@bbb.com" of the server SV1b to be the destination of the message as the Request-URI. The header part includes, as header information, a Via header specifying the SIP-URI of the SIP message processing module 53C on the client CL1a, To header including the SIP-URI "sv1@bbb.com" of the server SV1b, From header including the SIP-URI "cl1@aaa.com" of the client CL1a, Content-Type header, Content-Length header, and other information. The Content-Type header specifies the application program to which the message body M5-2 pertains and the Content-Length header specifies the length of the message body M5-2.

Figure 18:
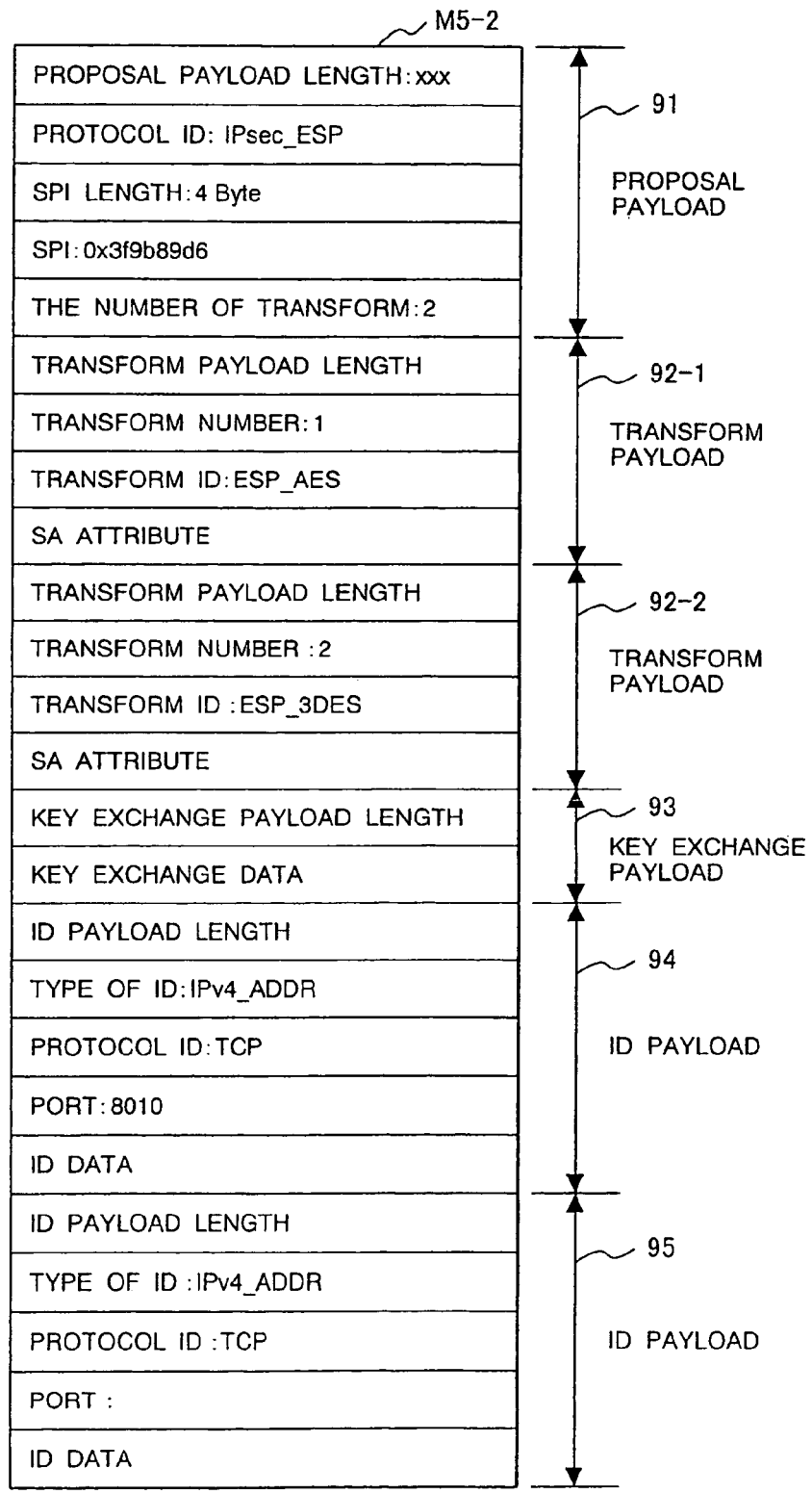
FIG. 18 shows an example of a format of a message body of the connection request message M5.

As is shown in FIG. 18, the body M5-2 of the connection request message M5 includes as SA information to be used for encrypted communication between the client CL1a and the server SV1b, for example, a proposal payload 91 indicating encryption protocol identifying information, transform payloads 92 indicating transform identifying information, a key exchange payload 93, a first ID payload 94 indicating source-of-request identifying information, and a second ID payload 95 indicating destination identifying information, in similar to the case of normal establishing SA for IPsec in IKE.

In this example, the client CL1a proposes two transform IDs of "ESP_AES" and "ESP-3DES" in two transform payloads 92-1, 92-2. The destination server SV1b will select one of these transform IDs and notify the client of the selected transform ID by a connection response message. The ID data in the first ID payload 94 indicates the IP address of the requester client CL1a and the ID data in the second ID payload 95 indicates the IP address of the destination server SV1b. The client CL1a of the embodiment obtains, as an IP address of the destination server SV1b, an IP address corresponding to the URL "http://www.bbb.com/" of the server SV1b from DNS.

Figure 19:
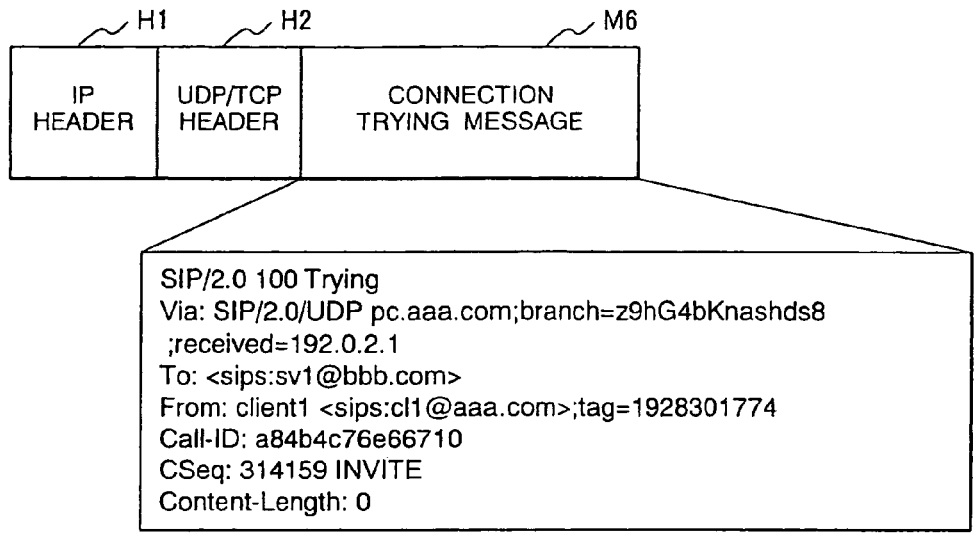
FIG. 19 shows an example of a format of a connection trying [100 Trying] message M6 shown in FIG. 11.

Upon receiving the connection request message M5, the SIP proxy PRa transmits to the requester client CL1a a connection trying message M6 shown in FIG. 19 to notify the client that it is trying to connect to the server SV1b. After that, the SIP proxy PRa performs TLS negotiation (S8) with the SIP proxy PRb in a domain, to which the destination server SV1b belongs, to get mutual authentication and to set parameters for encrypted communication. The connection trying message M6 begins with the start line including, as the message type, "100 Trying" indicating that the request is being processed. The message M6 has a header part including several items of header information such as Via, To, From, Call-ID, and CSeq extracted from the connection request message M5 and its message body is omitted.

Figure 20:
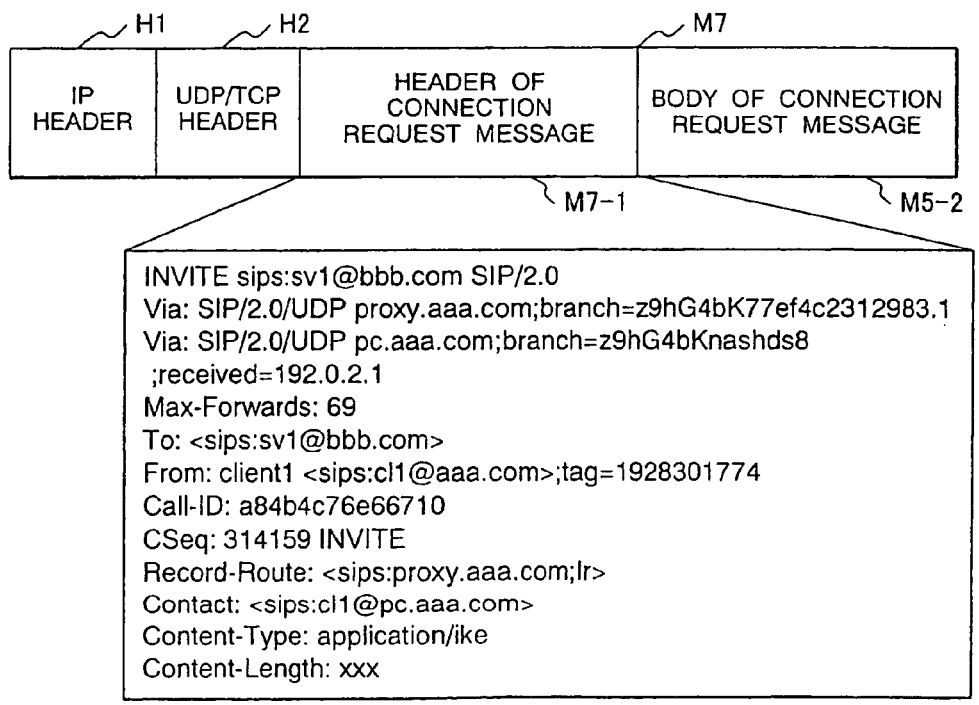
FIG. 20 shows an example of a format of a connection request message M7 shown in FIG. 11.

After completing the TLS negotiation with the SIP proxy PRb, the SIP proxy PRa composes a connection request message M7 which is shown in FIG. 20 by adding a new Via header including its own SIP-URI "proxy.aaa.com" and a Record-Route header specifying that the connection request passed via the URI "proxy.aaa.com" to the connection request message M5 received from the client and transmits the connection request message M7 to the SIP proxy PRb.

Figure 21:
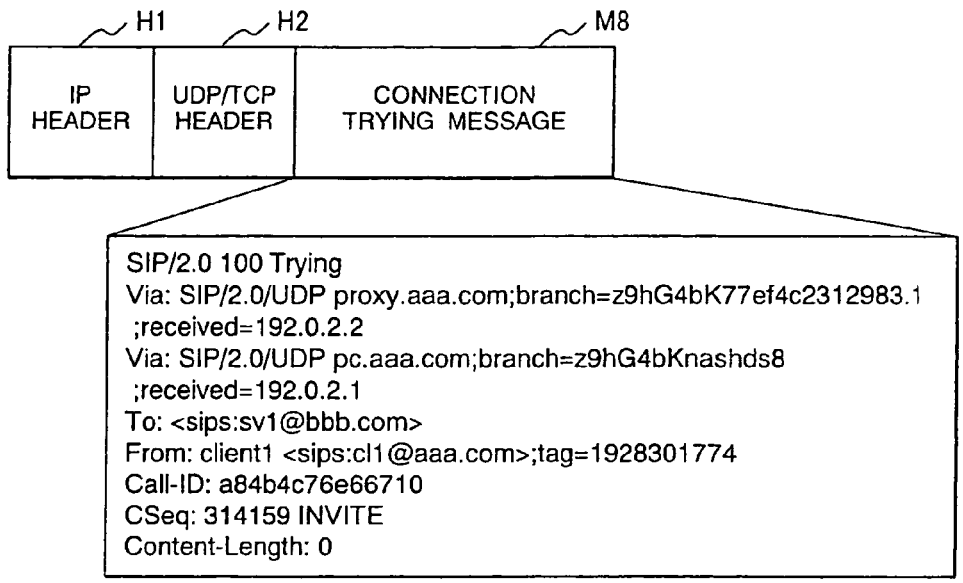
FIG. 21 shows an example of a format of a connection trying [100 Trying] message M8 shown in FIG. 12.

Upon receiving the connection request message M7, the SIP proxy PRb extracts the destination URI "SV1@aaa.com" from the start line of the received message and requests the location server LSV to search the location service DB (location data search) for the IP address corresponding to the above destination URI (S9), as show in FIG. 12. As the result of the search in the location service DB, the SIP proxy PRb receives location data (IP address "sv1@192.0.2.4") (S10) and transmits a connection trying [100 Trying] message M8 which is shown in FIG. 21 to the SIP proxy PRa that issued the connection request message M7. After that, the SIP proxy PRb performs TLS negotiation (S11) with the destination server SV1b identified by the IP address "sv1@192.0.2.4" for mutual authentication and setting parameters for encrypted communication.

Figure 22:
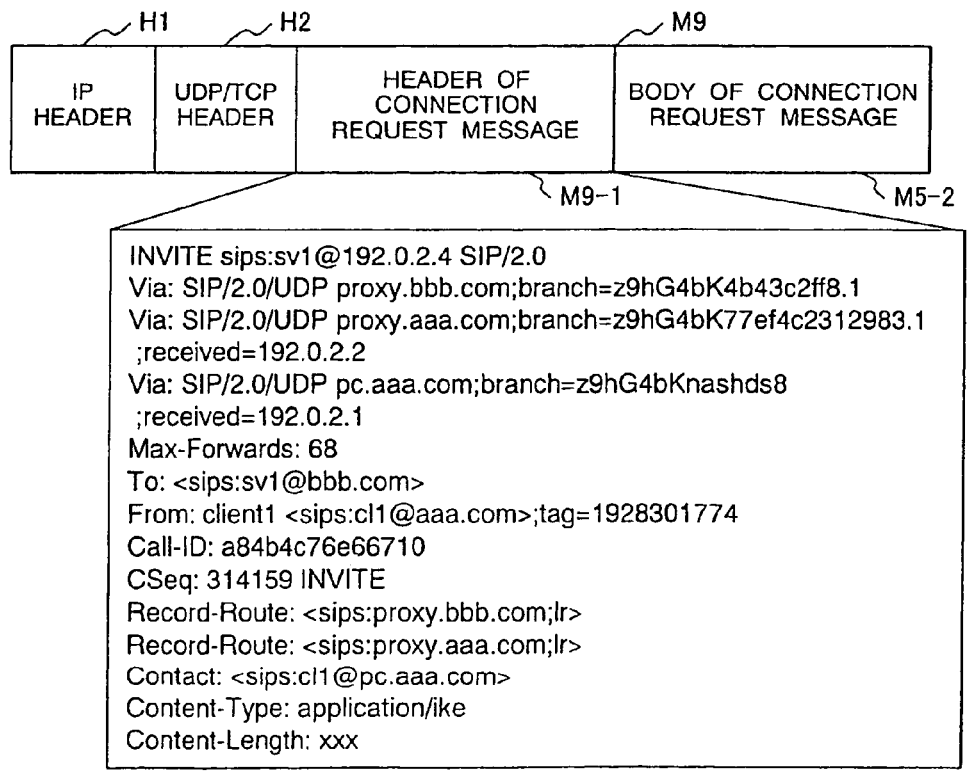
FIG. 22 shows an example of a format of a connection request [INVITE] message M9 shown in FIG. 12.

After completing the TLS negotiation with the destination server SV1b, the SIP proxy PRb composes a connection request [INVITE] message M9 which is shown in FIG. 22 by changing the Request-URI of the connection request message M7 to the IP address "sv1@192.0.2.4" and adding a new Via header including its own SIP-URI "proxy.bbb.com" and a Record-Route header specifying that the connection request passed via the URI "proxy.bbb.com" to the message M7 and transmits the connection request message M9 to the destination server SV1b.

Figure 23:
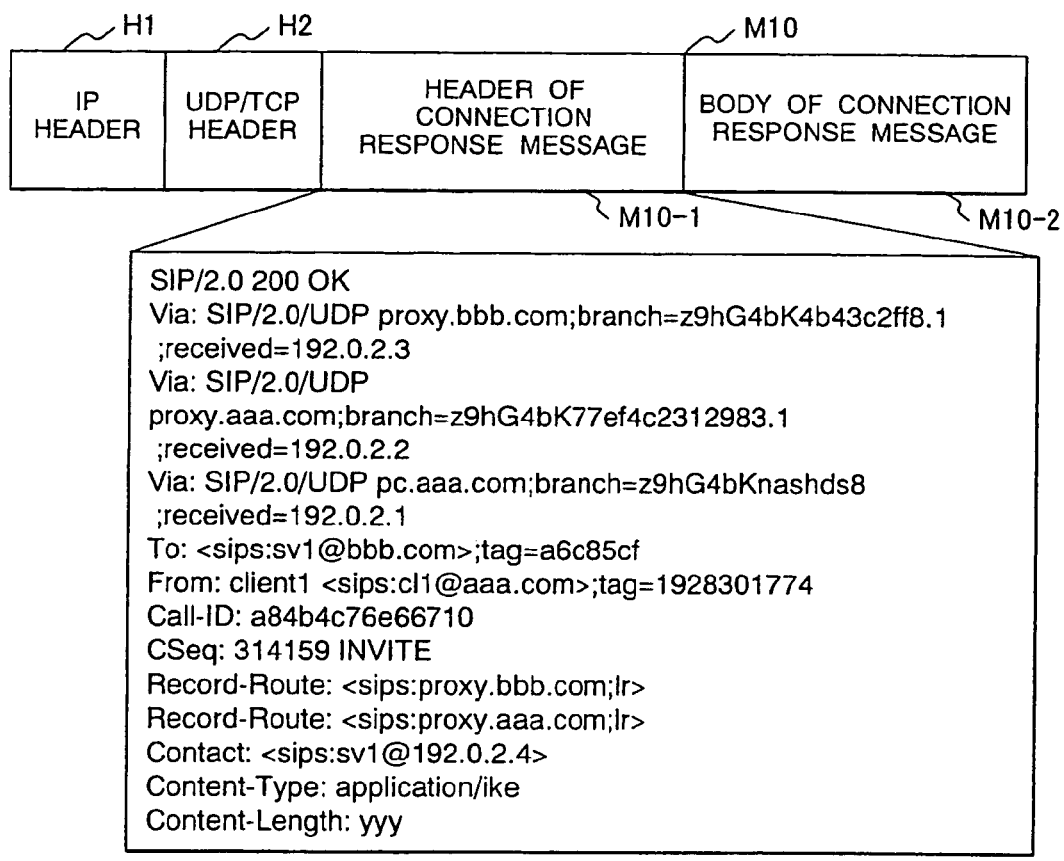
FIG. 23 shows an example of a format of a connection response message M10 shown in FIG. 12.
Figure 24:
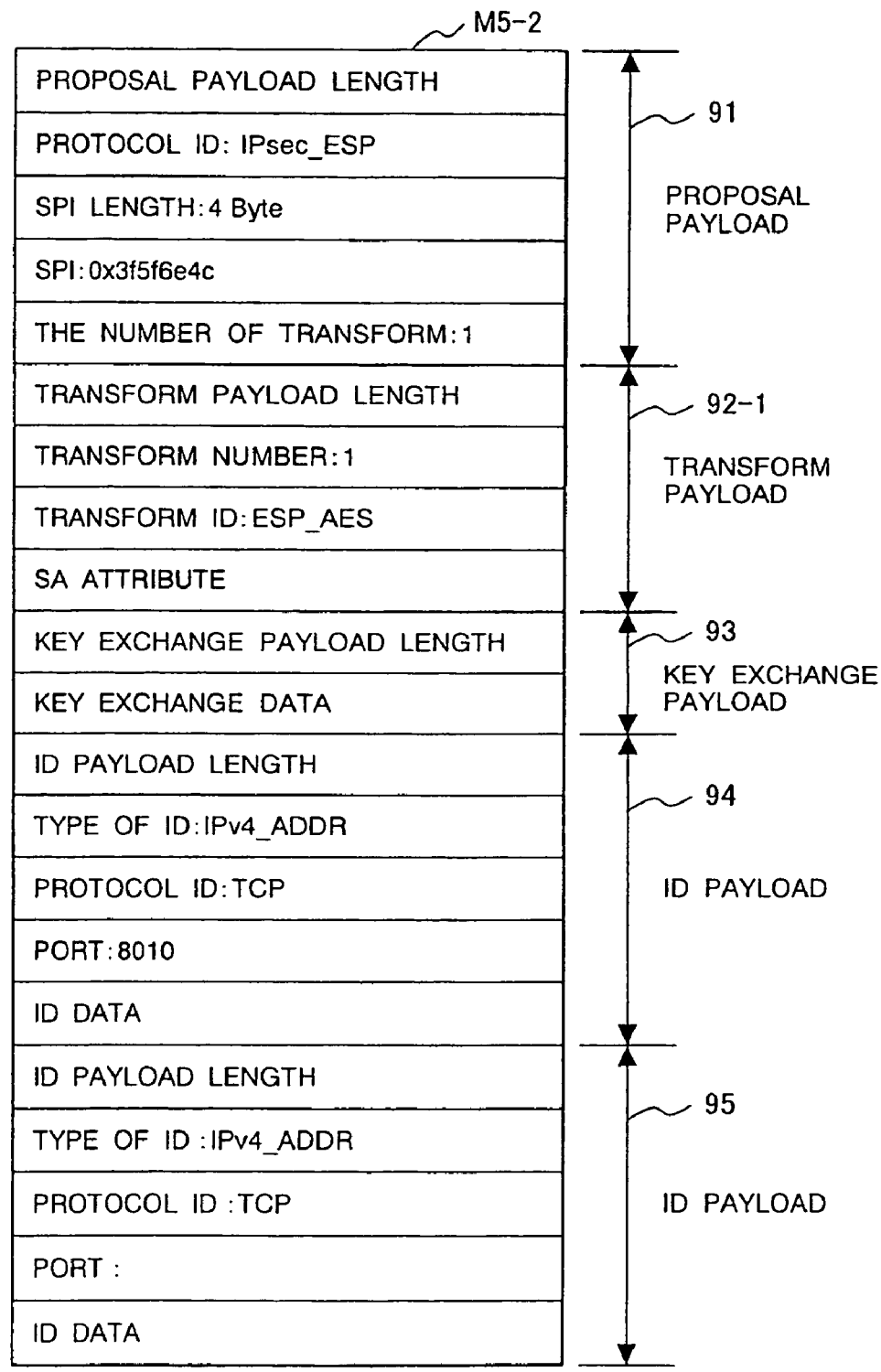
FIG. 24 shows an example of a format of a message body of the connection response [200 OK] message M10.

In response to the connection request message M9, the destination server SV1b returns a connection response message M10. As shown in FIG. 23, the connection response message M10 is comprised of a message header part M10-1 and a message body M10-2. The message header part M10-1 begins with the start line including "200 OK" indicating a response as the type of the message and includes a plurality of items of header information similar to those provided in the connection request message M9, following the start line. In the message body 10-2, for example, as shown in FIG. 24, one transform payload (ESP_AES in this example) remains as the one selected by the server SV1*b* out of the two transform payloads 92-1 and 92-2 proposed in the message body M5-2 of the connection request message M10.

Figure 25:
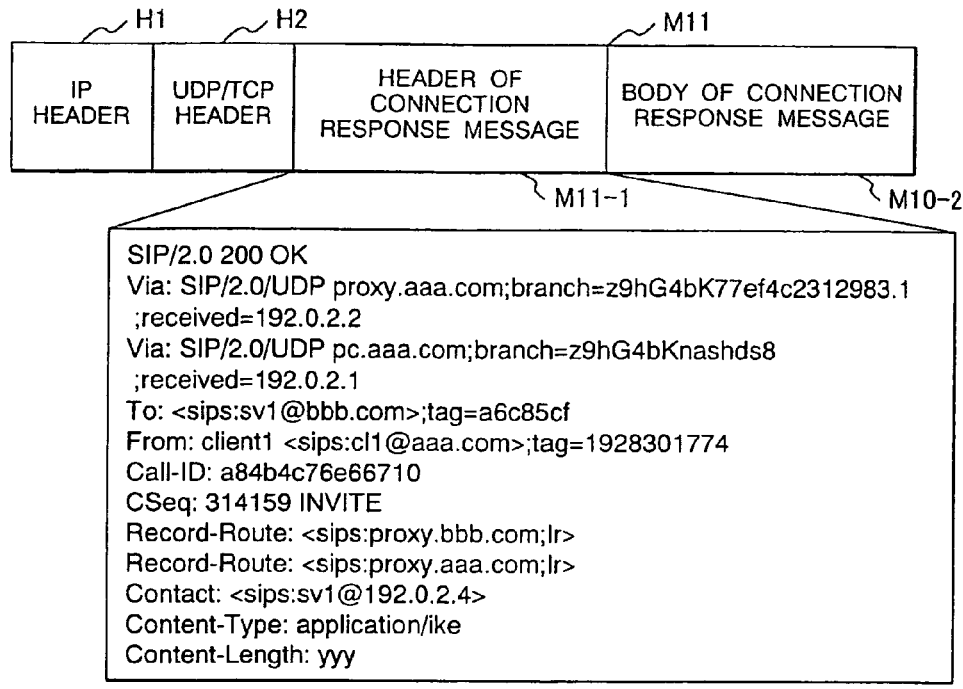
FIG. 25 shows an example of a format of a connection response [200 OK] message M11 shown in FIG. 12.
Figure 26:
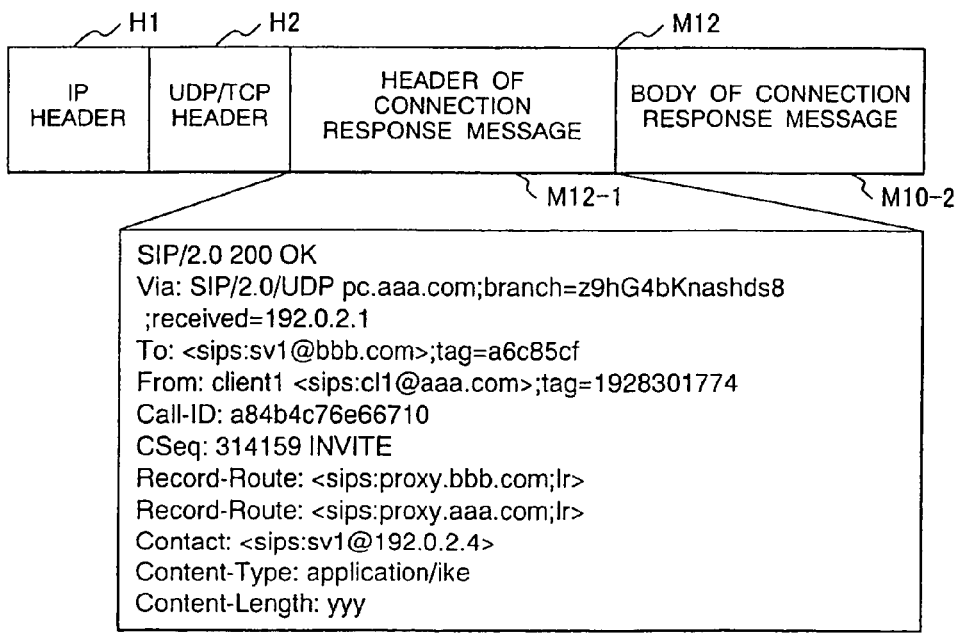
FIG. 26 shows an example of a format of a connection response [200 OK] message M12 shown in FIG. 12.

Upon receiving the connection response message M10, the SIP proxy PRb eliminates the Via header including its own URI from the header part of the received message to convert the received message M10 into a connection response [200 OK] message M11 which is shown in FIG. 25, and transmits the message M11 to the SIP proxy PRa. Upon receiving the connection response message M11, the SIP proxy PRa also eliminates the Via header including its own URI from the header part of the received message to convert the received message M1 into a connection response [200 OK] message M12 which is shown in FIG. 26, and transmits the message M12 to the requester client CL1*a*.

Figure 27:
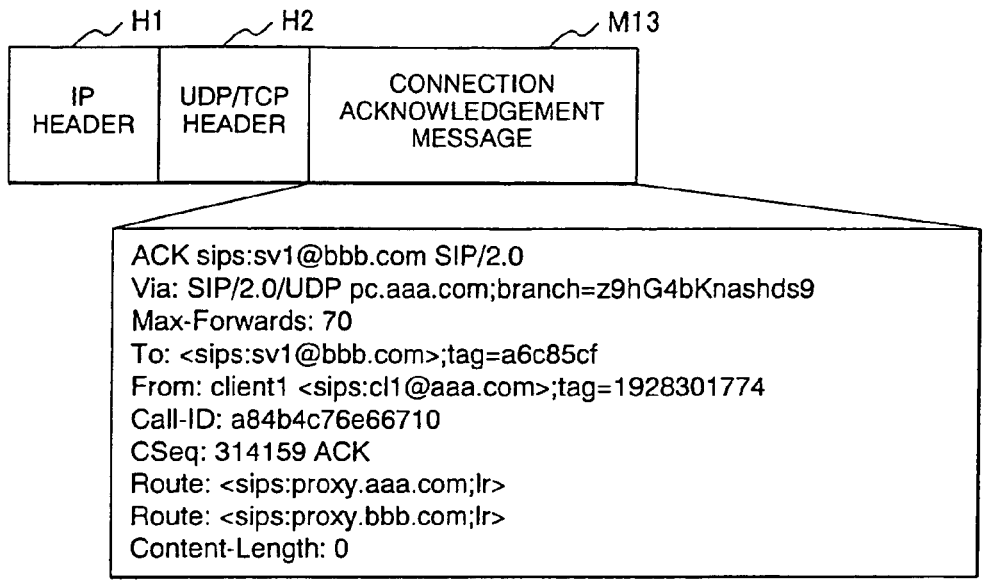
FIG. 27 shows an example of a format of a connection acknowledgment [ACK] message M13 shown in FIG. 12.

Upon receiving the connection response message M12, the requester client CL1*a* analyzes the body M10-2 of received message and determines SA information to be used for IPsec communication with the destination server SV1*b*. After registering this SA information into the SADB 33, the client CL1*a* transmits a connection acknowledgement [ACK] message M13 which is shown in FIG. 27 to the SIP proxy PRa. The connection acknowledgement message M13 begins with the start line including the message type "ACK" and the SIP-URI of the server SV1*b* as the Request-URI. The message M13 includes Via, To, From, Call-ID, CSeq, and Route headers as header information, and has no message body. In the Route header, the URI value extracted from the Record-Route header of the connection response message M12 is set.

Figure 28:
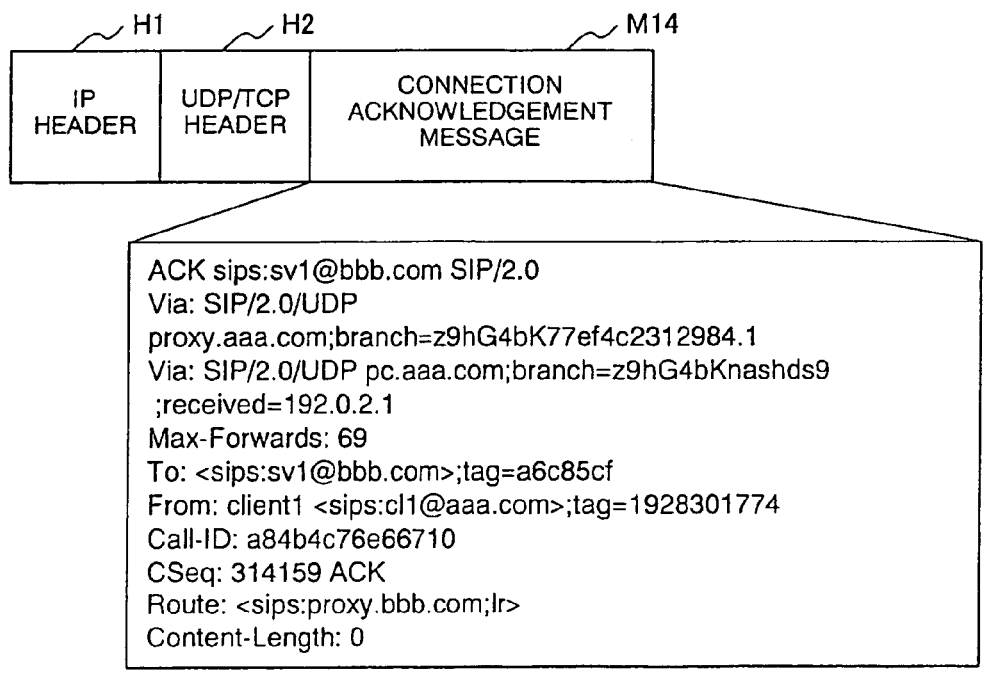
FIG. 28 shows an example of a format of a connection acknowledgment [ACK] message M14 shown in FIG. 12.
Figure 29:
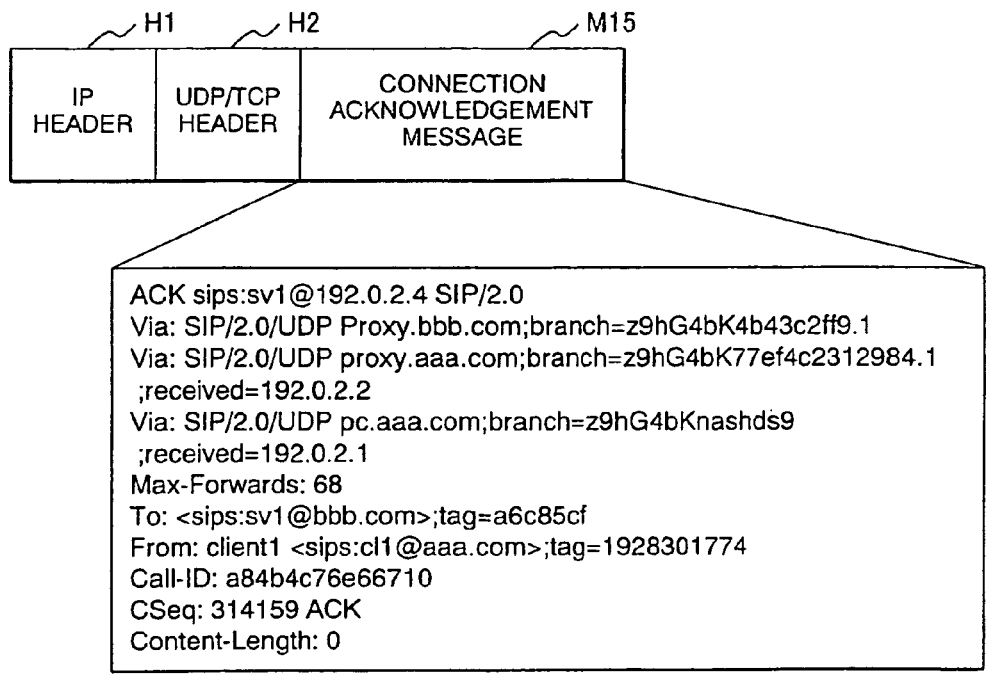
FIG. 29 shows an example of a format of a connection acknowledgment [ACK] message M15 shown in FIG. 12.

The SIP proxy PRa converts the connection acknowledgement message M13 into a connection acknowledgement [ACK] message M14 shown in FIG. 28 by adding a new Via header and eliminating the Route header corresponding to the SIP proxy PRa and forwards the message M14 to the SIP proxy PRb. The SIP proxy PRb converts the connection acknowledgement message M14 into a connection acknowledgement [ACK] message M15 shown in FIG. 29, by adding a new Via header and eliminating the Route header corresponding to the SIP proxy PRb, and forwards the message M15 to the destination server SV1*b*.

Once the server SV1*b* has received the connection acknowledgement message M15, the client CL1*a* and the server SV1*b* become able to perform application-to-application data communication (S20) to which IPsec encryption applies. That is, the client CL1*a* encrypts transmission data in accordance with SA information registered in the SADB 33C and transmits the encrypted data in IP packet form. The server SV1*b* decrypts the data received from the client CL1*a* in accordance with SA information registered in the SADB 33V. The server SV1*b* can encrypt transmission data for the client CL1*a* in accordance with the SA information and transmit the encrypted data in IP packet form.

Figure 31:
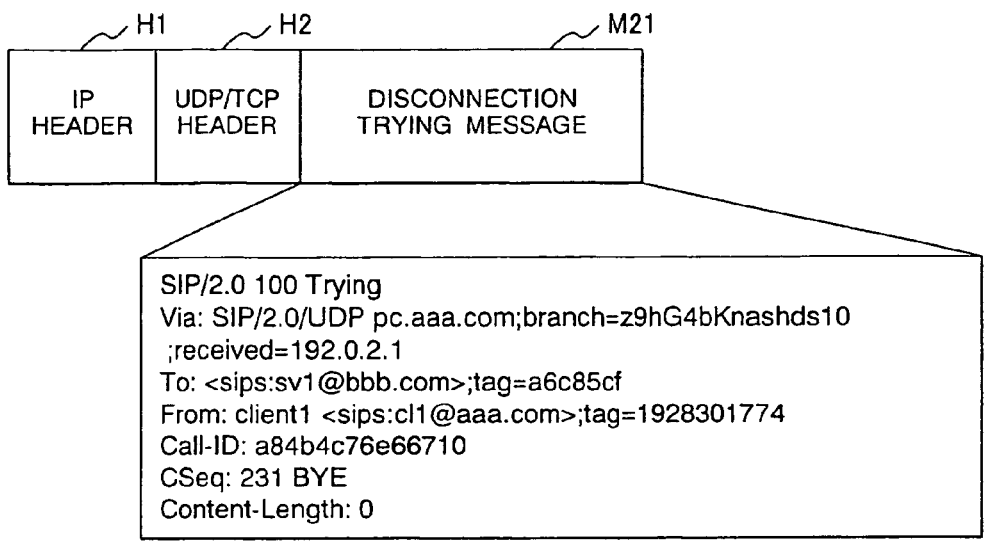
FIG. 31 shows an example of a format of a disconnection trying [100 Trying] message M21 shown in FIG. 12.

When terminating data communication with the server SV1*b*, the client CL1*a* transmits a disconnection request [BYE] message M20 which is shown in FIG. 31 to the SIP proxy PRa. The disconnection request message M20 begins with the start line including the message type "BYE" and the SIP-URI of the server SV1*b*. The message M20 includes Via, To, From, Call-ID, CSeq, and Route headers as header information similarly to the connection acknowledgement message M13, and has no message body.

Figure 32:
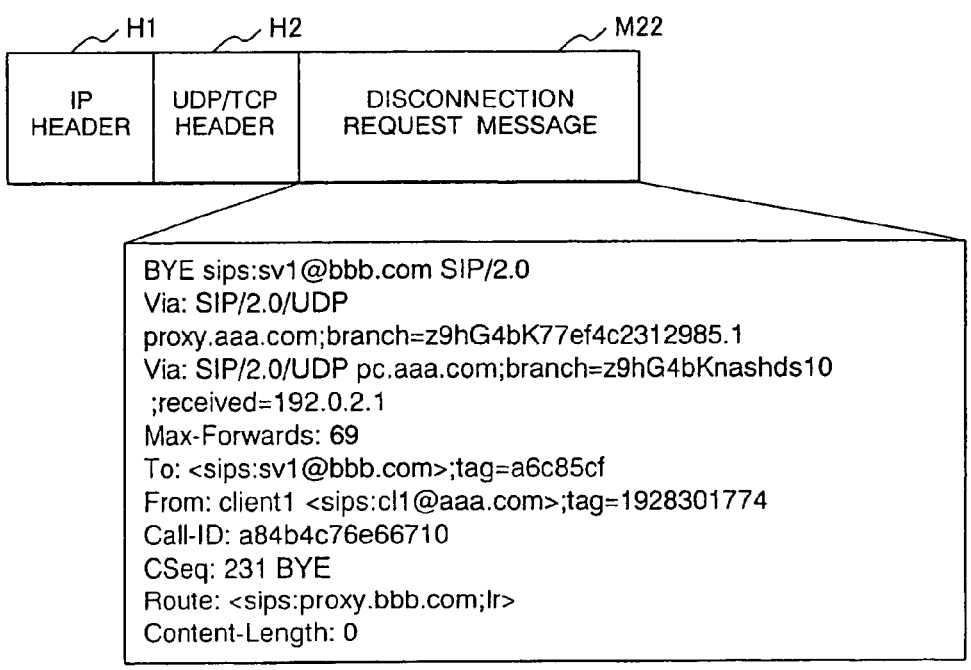
FIG. 32 shows an example of a format of a disconnection request [BYE] message M22 shown in FIG. 12.

Upon receiving the disconnection request message M20, the SIP proxy PRa transmits a disconnection trying [100 Trying] message M21 which is shown in FIG. 31 to the requester client CL1*a*. After that, the SIP proxy PRa converts the disconnection request message M20 into a disconnection request (BYE) message M22 shown in FIG. 32, by adding a new Via header and eliminating the Route header corresponding to the SIP proxy PRa, and transmits the message M22 to the SIP proxy PRb. The disconnection trying message M21 begins with the start line including, as the message type, "100 Trying" which indicates that the request is being processed. The message M21 has a header part including several items of header information such as Via, To, From, Call-ID, and CSeq extracted from the disconnection request message M20 and has no message body.

Figure 33:
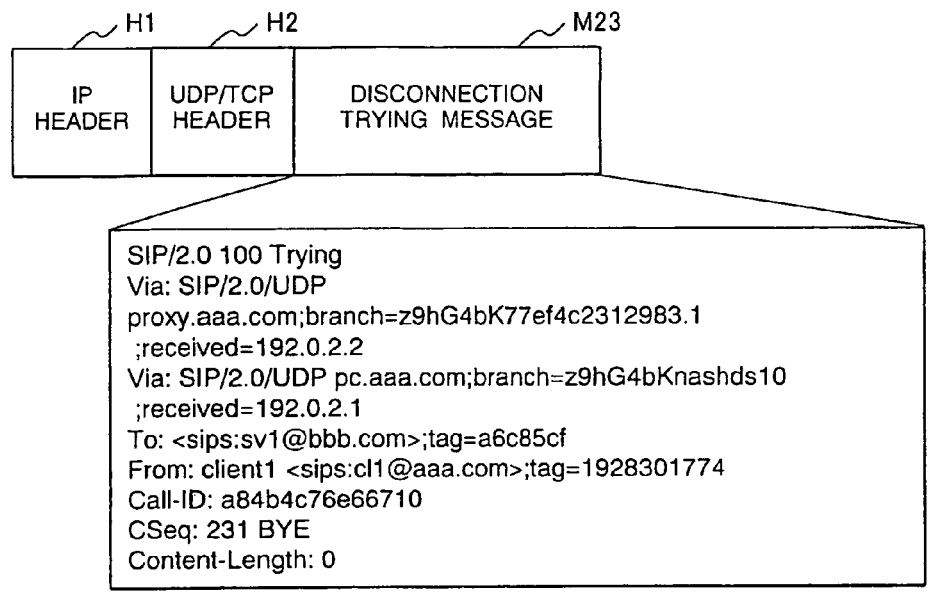
FIG. 33 shows an example of a format of a disconnection trying [100 Trying] message M23 shown in FIG. 12.
Figure 34:
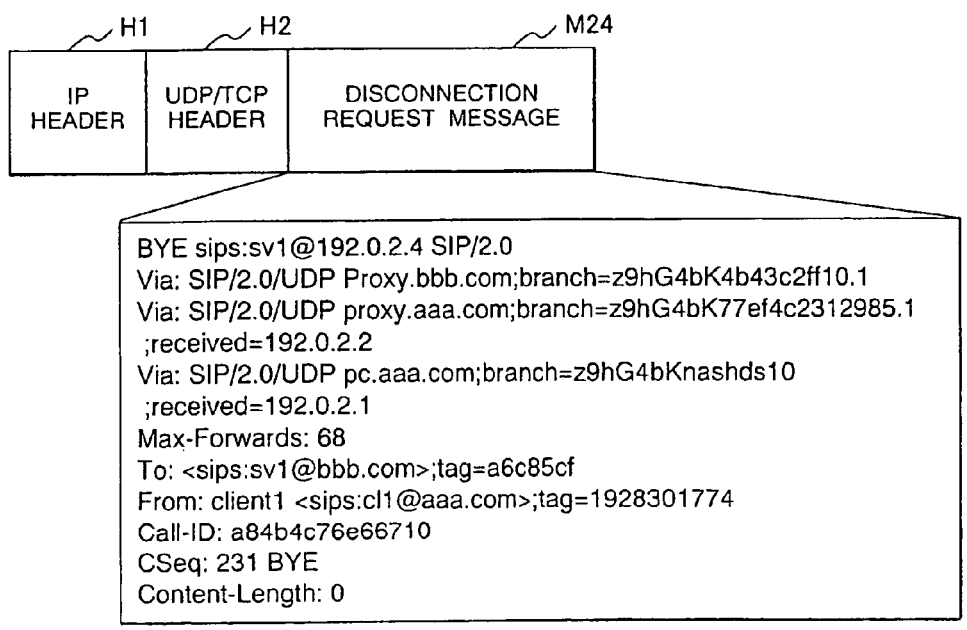
FIG. 34 shows an example of a format of a disconnection request [BYE] message M24 shown in FIG. 12.

Upon receiving the disconnection request message M22, the SIP proxy PRb transmits a disconnection trying [100 Trying] message M23 which is show in FIG. 33 to the SIP proxy PRa. After that, the SIP proxy PRb converts the disconnection request message M22 into a disconnection request [BYE] message M24 shown in FIG. 34, by adding a new header to the message M22 and eliminating the Route header corresponding to the SIP proxy PRb and transmits the message M24 to the server SV1*b*.

Figure 35:
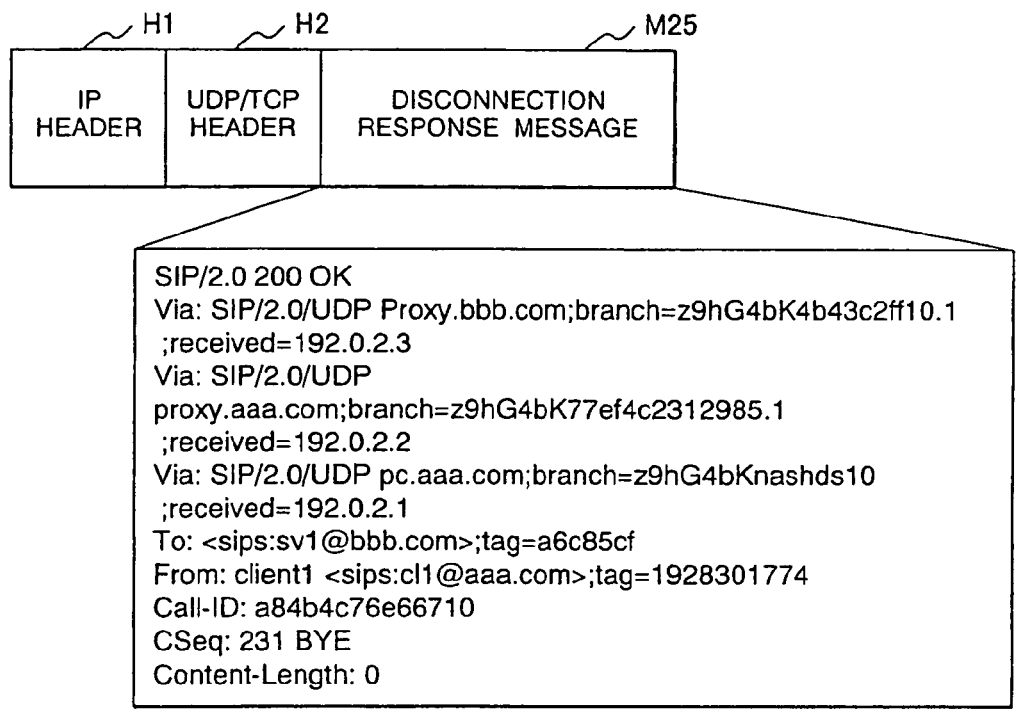
FIG. 35 shows an example of a format of a disconnection response [200 OK] message M25 shown in FIG. 12.

Upon receiving the disconnection request message M24, the server SV1*b* transmits a disconnection response [200 OK] message M25 which is shown in FIG. 35 to the SIP proxy PRb. The disconnection response message M25 begins with the start line including, as the message type, "200 OK" which indicates a response. The message M25 has a header part including several items of header information such as Via, To, From, Call-ID, and CSeq extracted from the disconnection request message M24 and has no message body.

Figure 36:
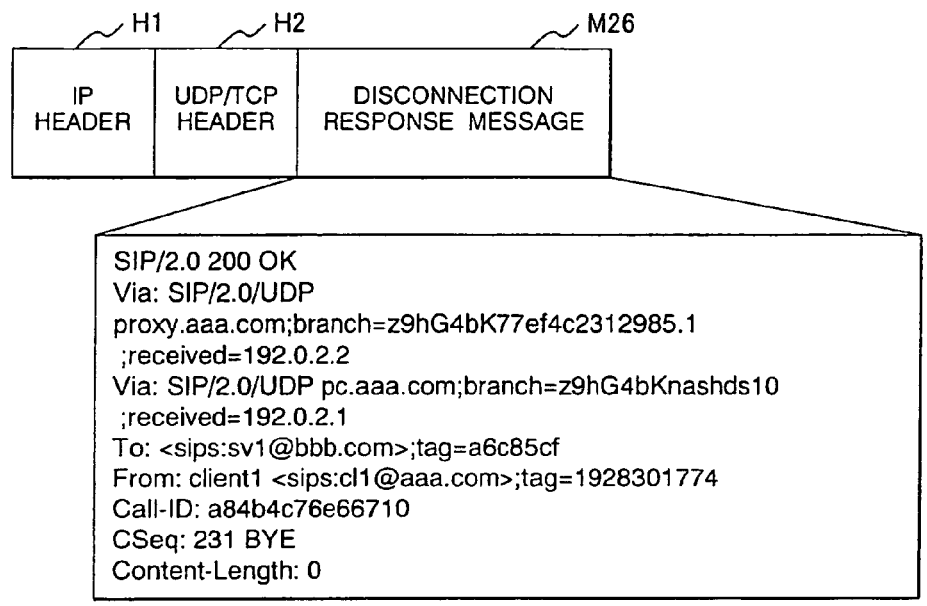
FIG. 36 shows an example of a format of a disconnection response [200 OK] message M26 shown in FIG. 12.
Figure 37:
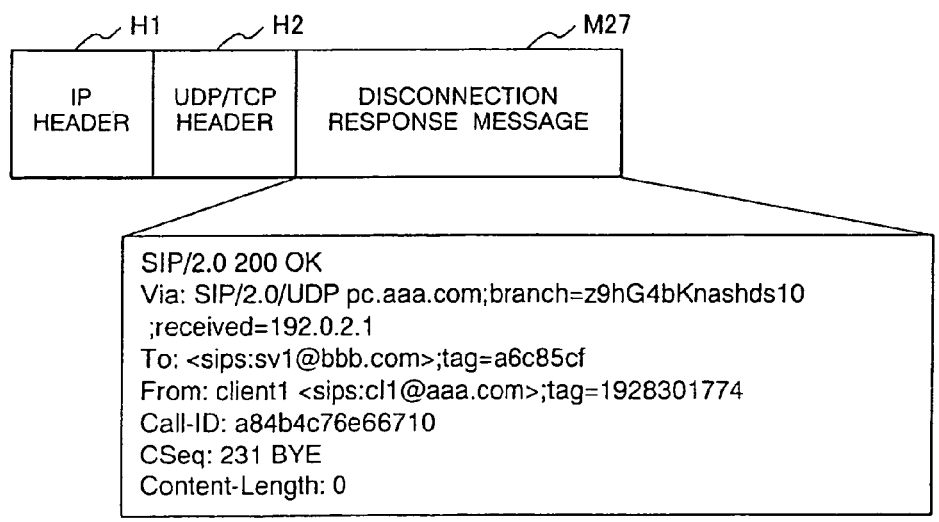
FIG. 37 shows an example of a format of a disconnection response [200 OK] message M27 shown in FIG. 12.

Upon receiving the disconnection response message M25, the SIP proxy PRb converts the message M25 into a disconnection response [200 OK] message M26 shown in FIG. 36, by eliminating the Via header including its own URI from the header part of the received message and transmits the message M26 to the SIP proxy PRa. Upon receiving the disconnection response message M26, the SIP proxy PRa converts the message M26 into a disconnection response [200 OK] message M27 shown in FIG. 37, by eliminating the Via header including its own URI from the header part of the received message and transmits the message M27 to the requester client CL1*a*. Upon receiving the disconnection response message M27, the requester client CL1*a* terminates IPsec encryption/decryption and waits for a new packet transmission request from the same or another application.

Next, by referring to FIGS. 38 through 48, a series of control operations on the client CL1*a*, SIP server SIPa (SIP proxy PRa, registrar RGa), and server SV1*b* to enable the above-described encrypted data communication of the first embodiment of the present invention will be described.

On detection of a communication request from the application 40C to the URL of the server SV1*b*, the encryption engine 31C of the client CL1*a* requests the key management process 50C to determine whether or not the encryption processing is to be applied to the communication with the URL. If the process 50C determines that the encrypted communication is required to be applied, the engine 31C acquires an IP address corresponding to the SIP-URI via DNS. Thereafter, the engine 31C retrieves from the Security Association Database (SADB) Security Association (SA) information such as a secret key to be applied to the communication with the IP address. Using the SA information, the engine 31C encrypts communication data sent from the application 40C to the server SV1*b* or decodes communication data sent from the server SV1*b* to the application 40C. If the SA information to be applied to the communication with the IP address has not been registered to the SADB 33C, the encrypted communication control module 51C determines to discard the communication data sent from the application 40C to the server SV1*b* or the communication data sent from the server SV1*b* to the application 40C.

Figure 38:
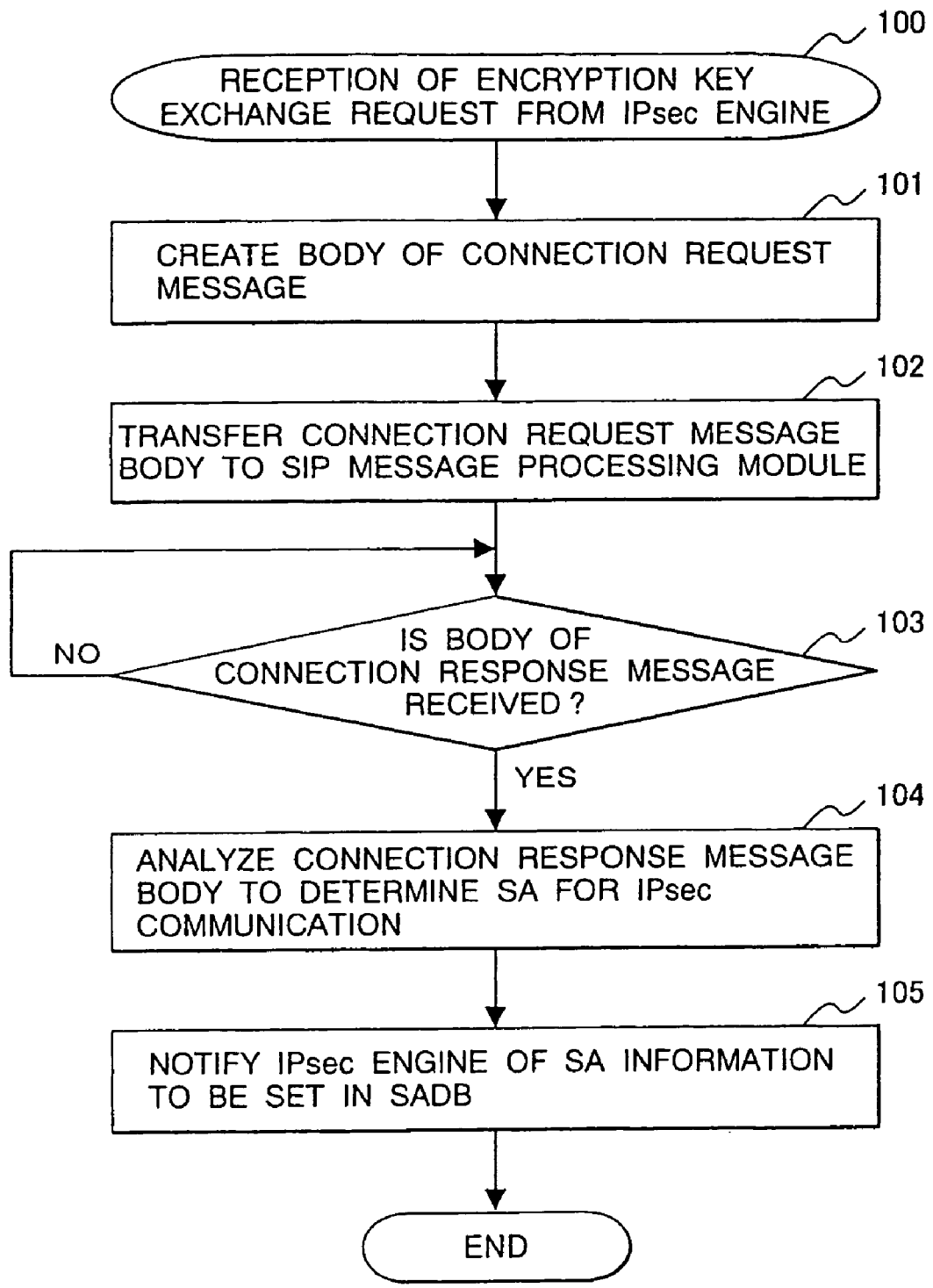
FIG. 38 is a flowchart illustrating control operation to be performed by an encrypted communication control module 51C on a client CL1a, when receiving a key exchange request.

FIG. 38 shows a flowchart 100 of control operation to be performed by the encrypted communication control module 51C on the client CL1*a* in response to a request of encrypted communication application judgment issued by the encryption engine 31.

In this embodiment, the request of encrypted communication application judgment issued by the encryption engine 31 is processed by the encrypted communication control module 51C. Upon receiving the request, the module 51C requests the SIP message processing module 53C to acquire an SIP-URI in the AOR form corresponding to the URL indicated by the request (step 101) to await a response from the module 53C (102). Next, the control module 51C refers to the Security Policy DataBase (SPDB) 32C to judge necessity for the encrypted communication application to the SIP-URI which is corresponding to the URL and which is contained in the response from the processing module 53C. If it is judged to apply the encrypted communication, the key management process 50C searches the SADB 33C for SA information such as an encrypted key to be applied to the SIP-URI. If such SA information has not been registered to the SADB 33C, the encrypted communication control module 51C exchanges (key exchange) the encryption parameters for the communication partner.

According to the TCP/IP communication parameters of the URL obtained by referring to the DNS and the available SA information under supervision of the control module 51C, the encrypted communication control module 51C creates a body M5-2 of the connection request message illustrated in FIG. 18 (step 103), passes the body M5-2 and the SIP-URI to the SIP message processing module 53C (104), and then awaits reception of a connection response message body therefrom (105).

Upon receiving the body M10-2 of a connection response message illustrated in FIG. 24 from the SIP message processing module 53C, the encrypted communication control module 51C analyzes the received message body, determines SA information to be used for the current encrypted communication to set the information to the SADB 33C (106), and notifies the encryption engine 31*c* of the result of the judgment to the engine 31C (107).

Figure 39A:
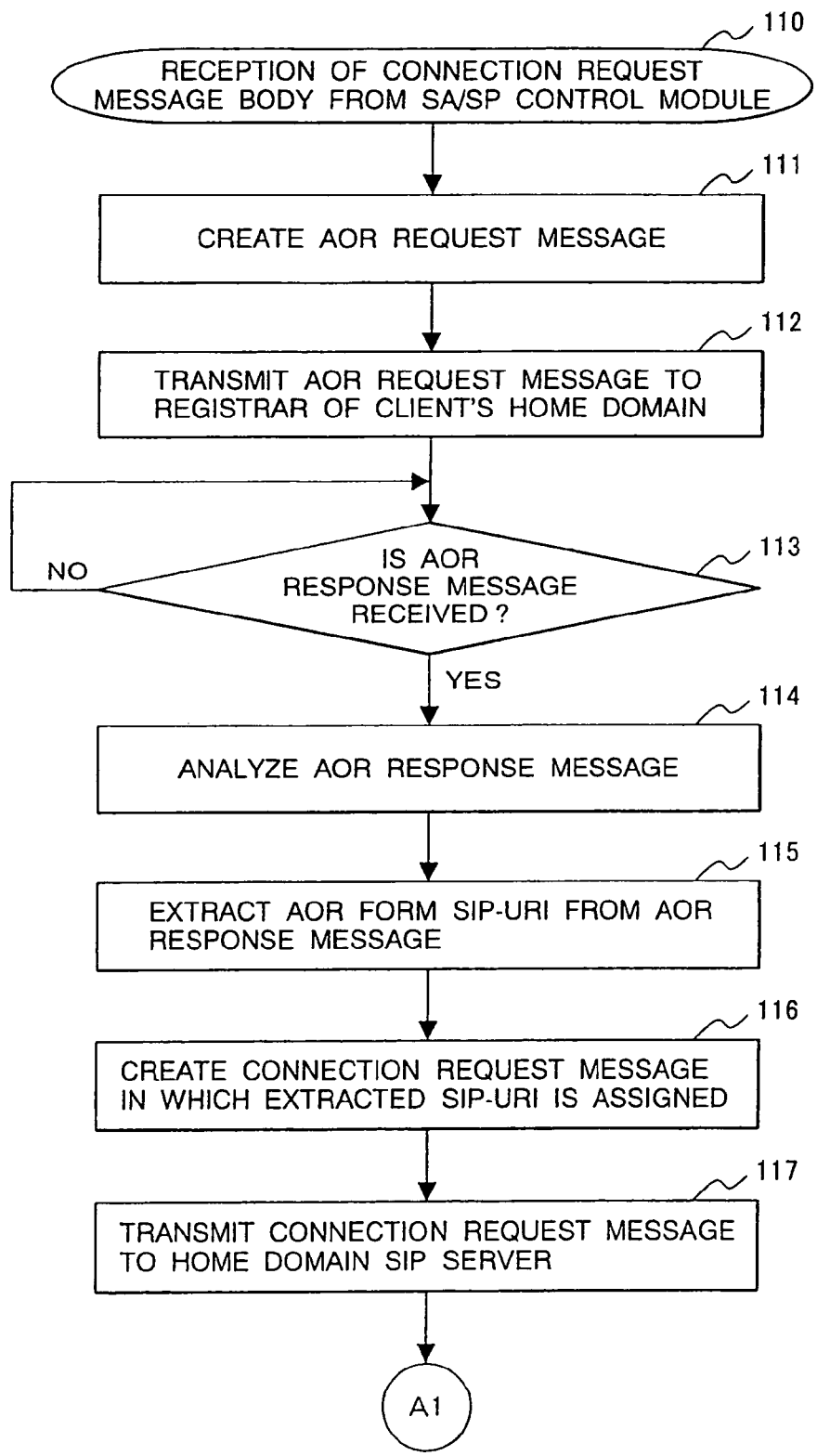
FIG. 39A is a part of a flowchart illustrating control operation to be performed by a SIP message processing module 53C on the client CL1a, when receiving the body of a connection request message.

FIG. 39A shows a flowchart 110 of control operation to be performed by the SIP message processing module 53C at reception of the SIP-URI acquisition request from the control module 51C. Upon receiving a URL from the control module 51C, the SIP message processing module 53C creates an AOR request message M3 illustrated in FIG. 15 (step 111) and transmits the message addressing to the SIP server SIPa (registrar RGa) located in a domain to which the client CL1*a* belongs via the TSL module 52C, TCP/IP module 30C, and NIC module 20C (112). At this time, the TLS module 52C performs TLS negotiation (the sequence S5 in FIG. 11) with the registrar RGa and then transmits the TLS-encrypted AOR request message M3 to the registrar RGa via the TCP/IP module 30C and the NIC module 20C. In this case, the TCP/IP module 30C attaches an IP header H1 including the destination IP address of the SIP server SV1 and a UDP/TCP header H2 to the AOR request message M3 and the message is transmitted onto the network NW1 in the form of IP packet.

The SIP message processing module 53C waits for an AOR response message from the registrar RGa (113). Upon receiving the AOR response message, the SIP message processing module 53C analyzes the received message (114) and extracts a SIP-URI in AOR form assigned to the destination server from the AOR header (115).

Figure 39B:
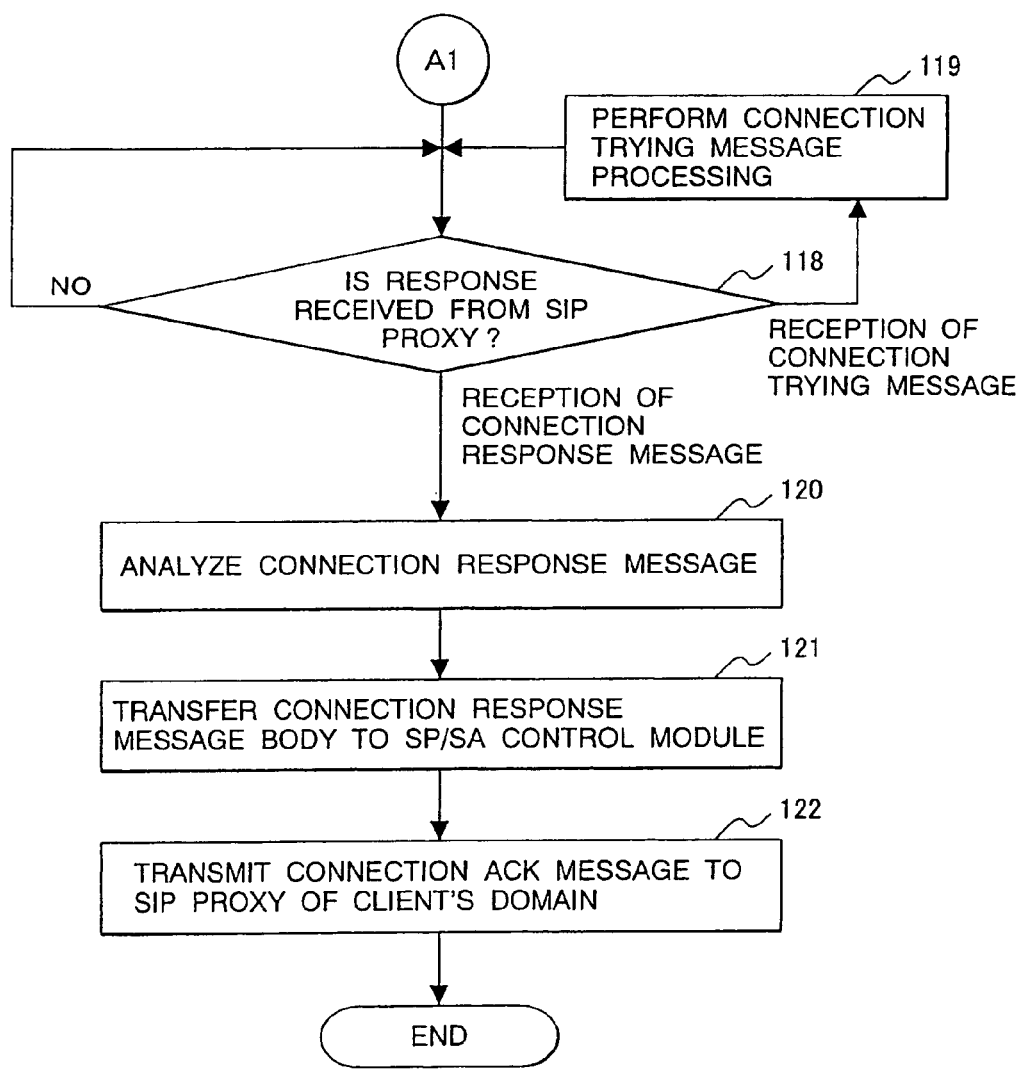
FIG. 39B is the remaining part of the flowchart illustrating the control operation to be performed by the SIP message processing module 53C on the client CL1a, when receiving the body of the connection request message.

FIG. 39B shows a flowchart 120 of control operation of the SIP message processing module 53C at reception of the body of the connection request message from the encrypted communication control module 51C.

When the body and the SIP-URI are received from the control module 51C, the processing module 53C applies the SIP-URI to the start line and the To header to create a connection request message M5 illustrated in FIG. 17 including the header part M5-1 and the message body M5-2 received from the control module 51C (121).

The SIP message processing module 53C transmits the above connection request message addressing to the SIP proxy PRa of the SIP server SIPa via the TLS module 52C, TCP/IP module 30C, and NIC module 20C (122) and waits for a response from the SIP proxy PRa (123). When receiving a connection trying message M6 from the SIP proxy PRa, the SIP message processing module 53C performs processing of the connection trying message (124) and waits for the next response from the SIP proxy PRa.

Upon receiving a connection response message M12 from the SIP proxy PRa, the SIP message processing module 53C analyzes the received message (125) and transfers the connection response message body M12-2, illustrated in FIG. 24, extracted from the received message to the encryption communication control module 51C (126). After that, the SIP message processing module 53C creates a connection acknowledgement message M13 illustrated in FIG. 27 and transmits the message M13 addressing to the SIP proxy PRa via the TLS module 52C, TCP/IP module 30C, and NIC module 20C (127), and terminates this routine.

Figure 40:
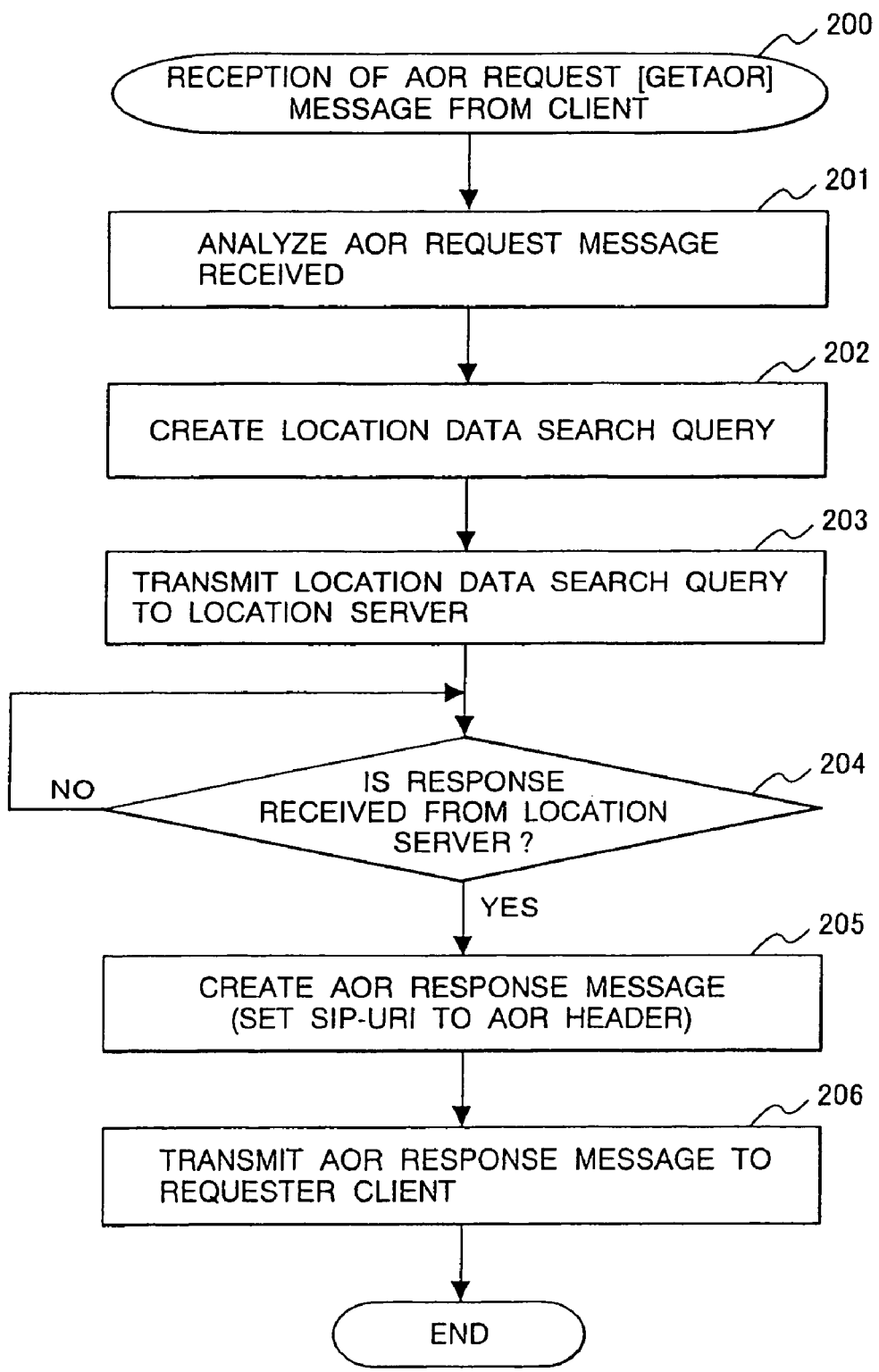
FIG. 40 is a flowchart illustrating control operation to be performed by a SIP message processing module 53R on a registrar RGa, when receiving an AOR request message.
Figure 41A:
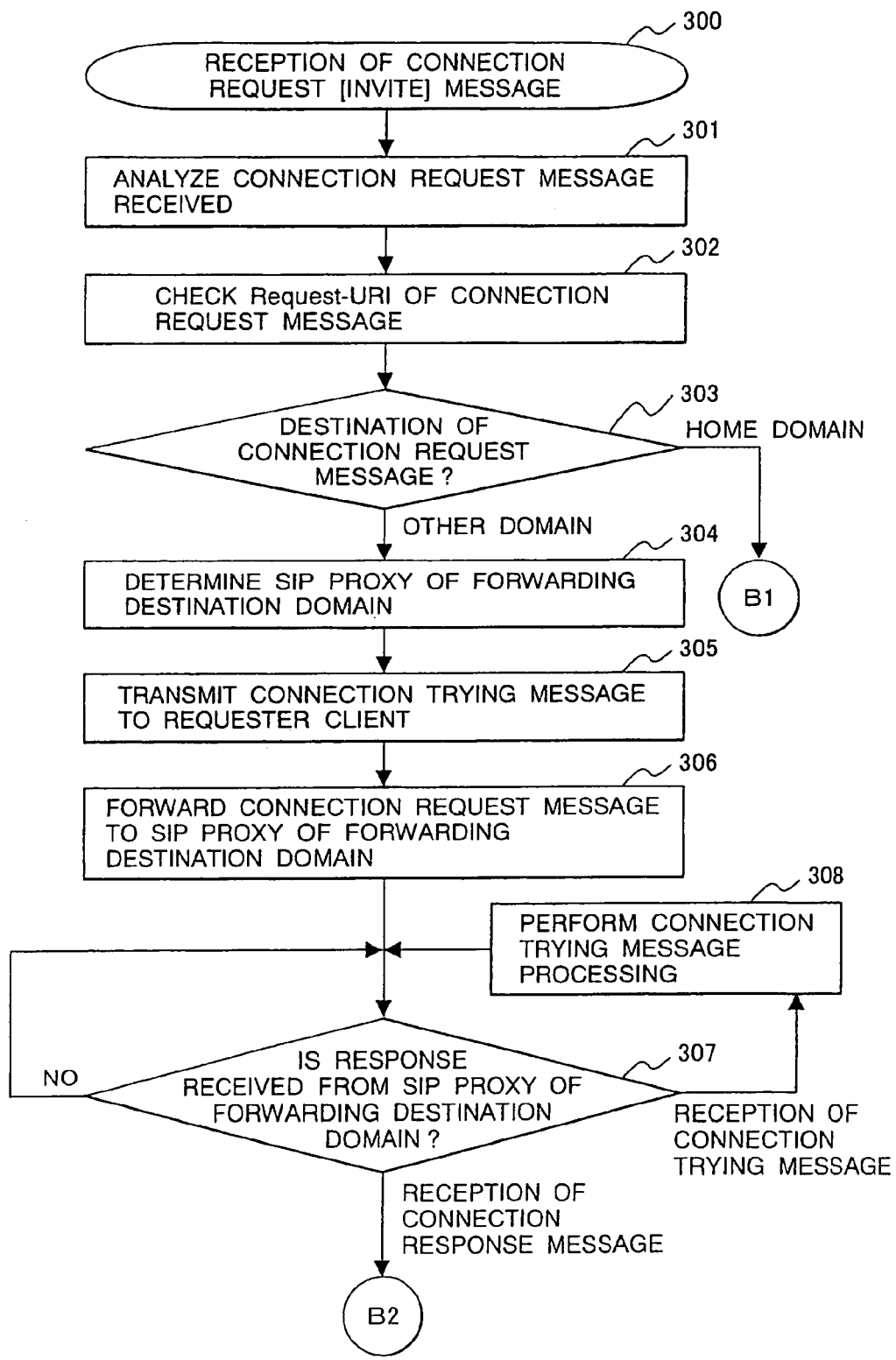
FIG. 41A is a first part of a flowchart illustrating control operation to be performed by a SIP message processing module 53P on the originating SIP proxy PRa, when receiving an connection request message.
Figure 41B:
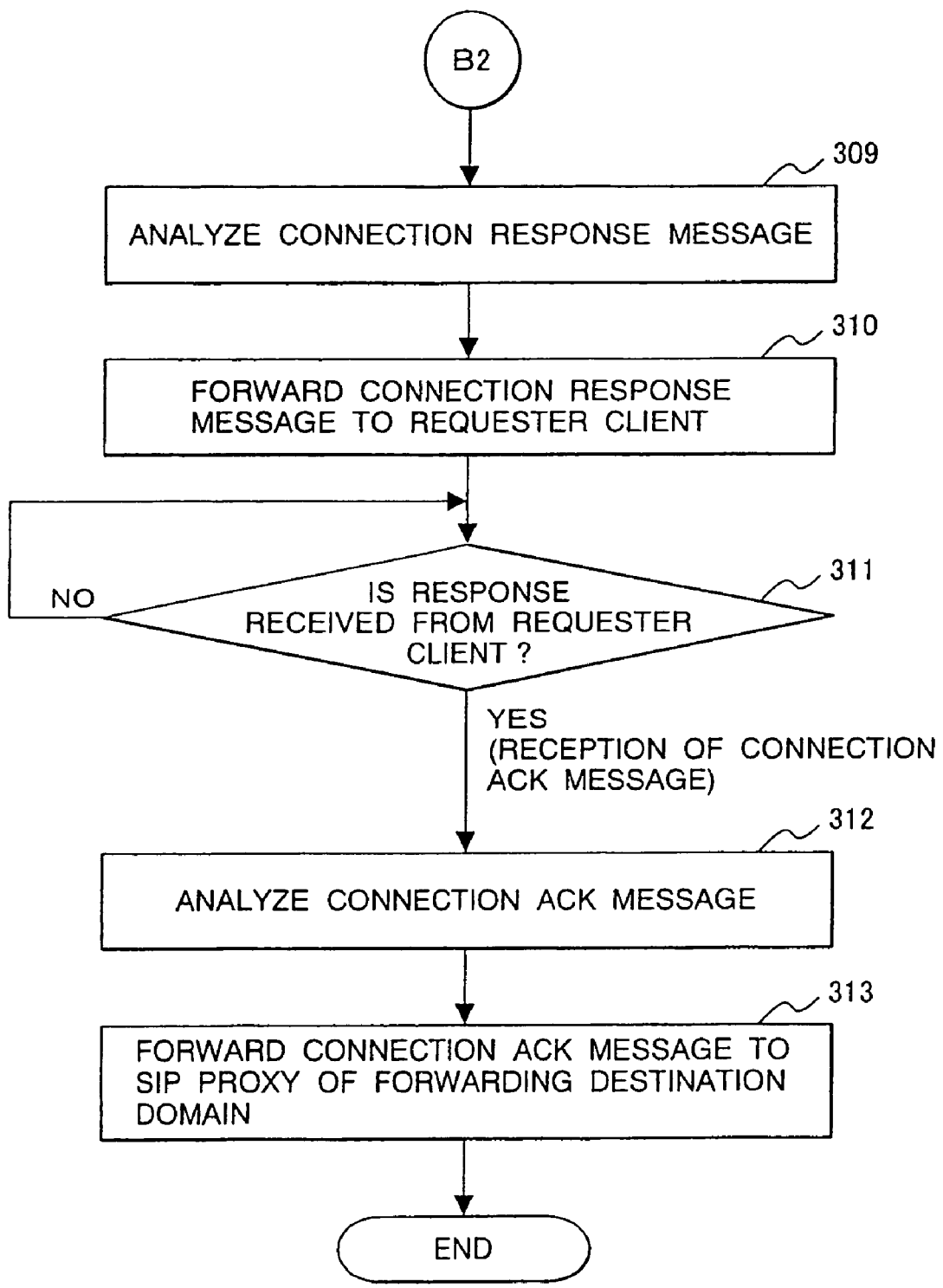
FIG. 41B is a second part of the flowchart illustrating control operation to be performed by the SIP message processing module 53P on the SIP proxy PRa, when receiving the connection request message.
Figure 41C:
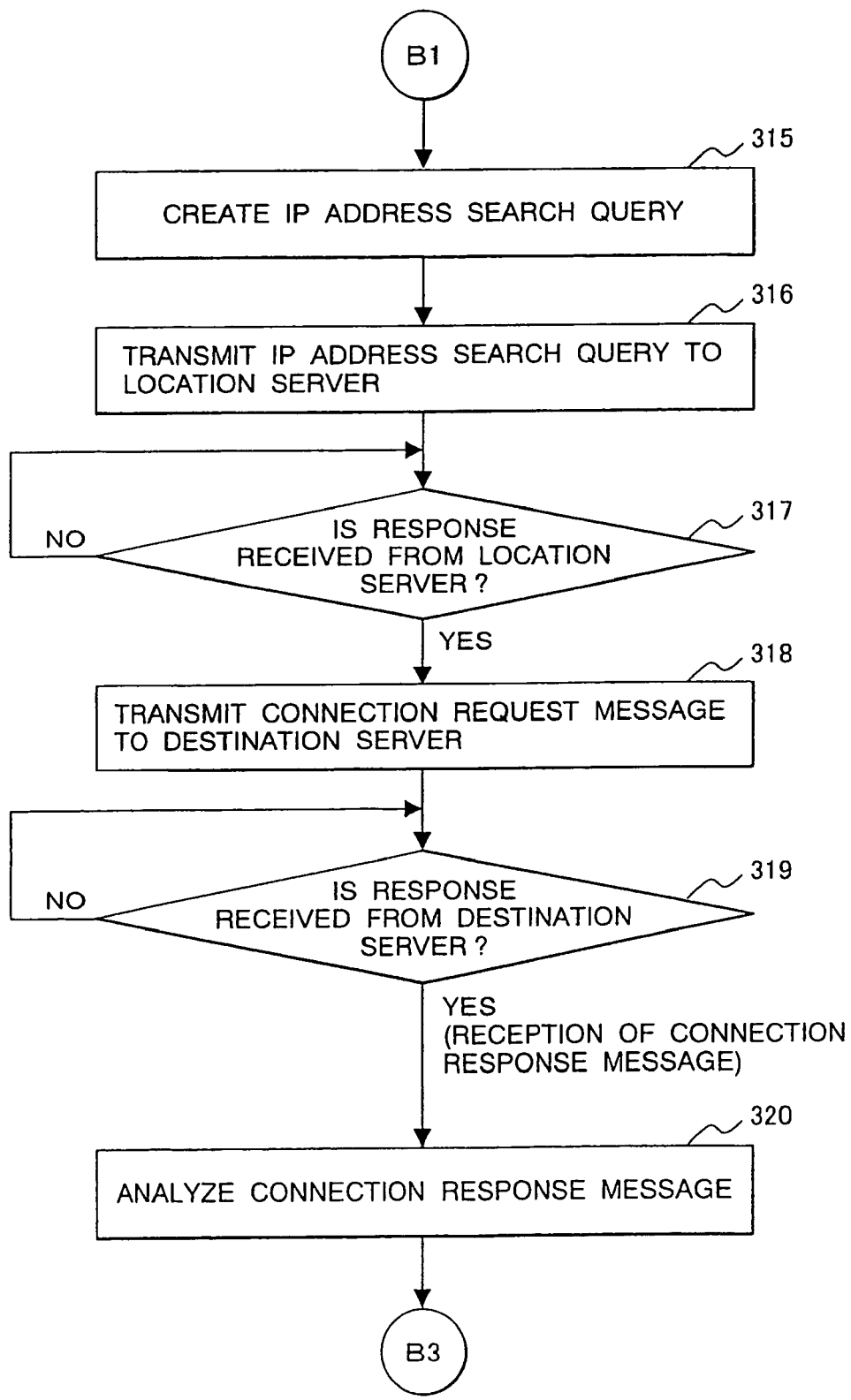
FIG. 41C is a third part of the flowchart illustrating control operation to be performed by the SIP message processing module 53P on the SIP proxy PRa, when receiving the connection request message.
Figure 41D:
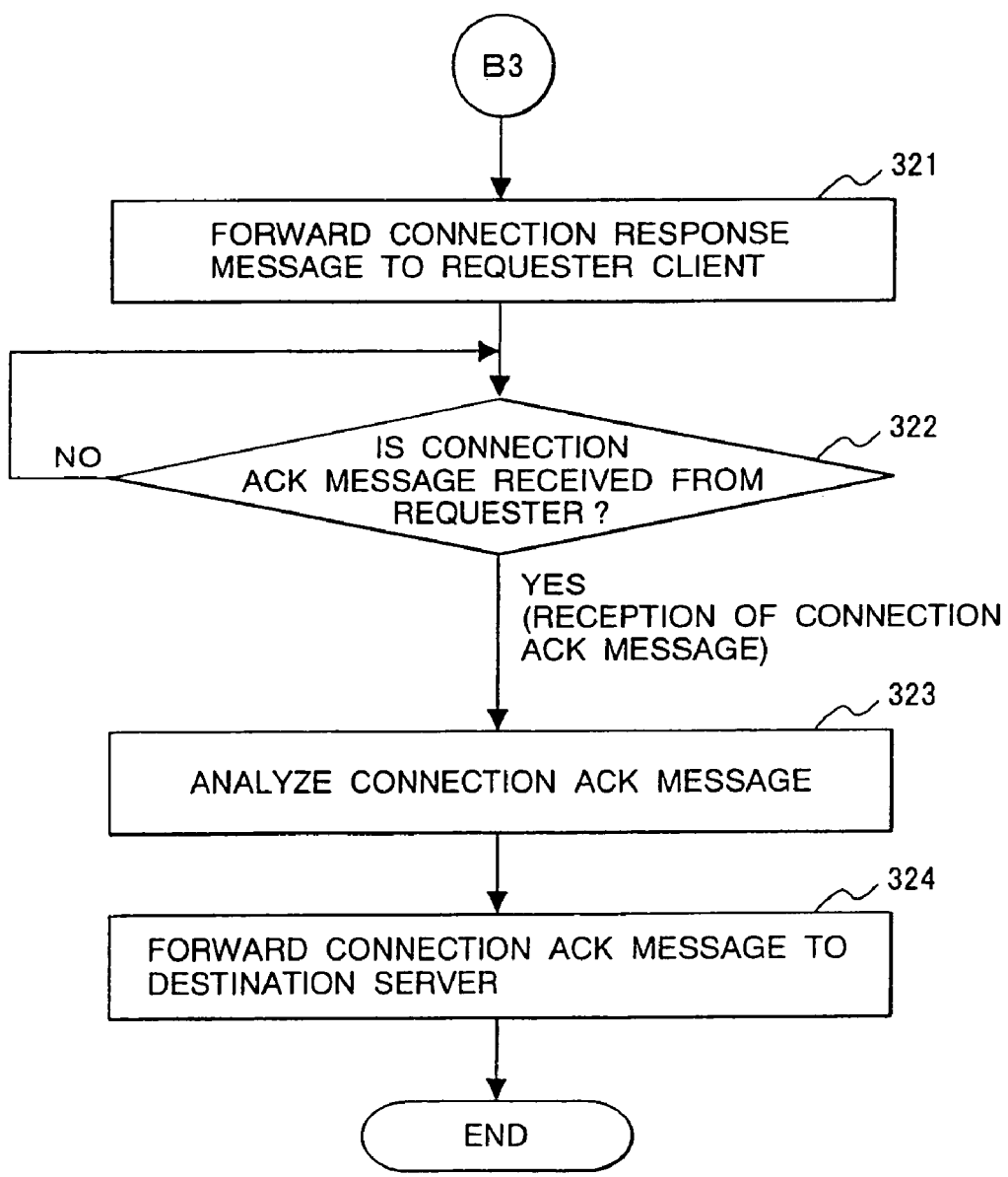
FIG. 41D is a fourth part of the flowchart illustrating control operation to be performed by the SIP message processing module 53P on the SIP proxy PRa, when receiving the connection request message.

FIG. 40 shows a flowchart 200 of control operation to be performed by the SIP message processing module 53R on the registrar RGa, when receiving an AOR request message M3. The SIP message processing module 53R on the registrar RGa analyzes the received AOR request message M3 (step 201), creates a location data search query using the URL of the destination server SV1*b* specified in the To header as a search key (202), transmits the search query to the location server LSV via the registrar processing module 60R (203), and waits for a response from the location server (204).

Upon receiving location data from the location server LSV via the registrar processing module 60R, the SIP message processing module 53R creates an AOR response message M4 illustrated in FIG. 16 including the AOR header specifying the SIP-URI given by the received data (205), transmits the message M4 to the source of the AOR request message M3 (client CL1*a* in this example) via the TCP/IP module 30R and NIC module 20R (206), and terminates this routine.

FIGS. 41A through 41D show a flowchart 300 of control operation to be performed by the SIP message processing module 53P on the SIP proxy PRa, when receiving a connection request message M5 from the client CL1*a*. Upon receiving a connection request message M5 from the client CL1*a*, the SIP message processing module 53P on the SIP proxy PRa analyzes the received message (step 301), checks the Request-URI specified in the start line of the received message (302), and determines the forwarding destination of the received message from the domain name given by the Request-URI (303).

If having determined that the forwarding destination of the received message belongs to a domain other than the home domain of the SIP proxy PRa, the SIP message processing module 53P determines a SIP server (SIP proxy) in the domain, to which the received message should be forwarded, by DNS search (NAPTR search+SRV search+A search) or the like (304). In the example shown in FIG. 11, the SIP proxy PRb is found as the forwarding destination of the connection request message M5 by the DNS search. In this case, the SIP message processing module 53P transmits a connection trying message M6 illustrated in FIG. 19 to the client CL1a that is the source of the connection request message M5 via the TLS module 52P, TCP/IP module 30P, and NIC module 20P (305). Then, the SIP message processing module 53P forwards to the SIP proxy PRb a connection request message M7 which is composed by adding a new Via header to the connection request message M5 (306) and waits for a response from the SIP proxy PRb (307).

Upon receiving a connection trying message M8 from the SIP proxy PRb, the SIP message processing module 53P performs processing of the connection trying message (308) and waits for the next response from the SIP proxy PRb. Upon receiving a connection response message M11 from the SIP proxy PRb, the SIP message processing module 53P analyzes the received message (309), converts the message M11 into a connection response message M12 by eliminating the Via header including its own SIP-URI from the received message M11, and forwards the message M12 to the connection requester client CL1a (310). Then, the SIP message processing module 53P waits for a response from the connection requester client CL1a (311). Upon receiving a connection acknowledgement message M13, the SIP message processing module 53P analyzes the received message (312), converts the message M13 into a connection acknowledgement message M14 by adding a new Via header including its own SIP-URI to the received message M13, forwards the message M14 to the SIP proxy PRb (313), and terminates this routine.

If, it is determined, by the decision step 303, that the forwarding destination of the connection request message received from the client terminal CL1a belongs to the same domain as for the SIP proxy PRa, for example, like a server SV1a (or SV2a), the SIP message processing module 53P creates a location data (IP address) search query using the SIP-URI given by the Request-URI in the received message as a search key (315), transmits the location data search query to the location server LSV (316), and waits for a location service response (317).

Upon receiving location data from the location server LSV, the SIP message processing module 53P transmits onto the network NW1 a connection request message in the form of IP packet by applying the IP address of the destination server given by the location data to the destination IP address (318) and waits for a response from the destination server (319). To the connection request message, a new Via header including the SIP-URI of the SIP proxy PRa is added.

Upon receiving a connection response message from the destination server, the SIP message processing module 53P analyzes the received message (320), forwards a connection request message, from which the Via header corresponding to its own node was eliminated, to the connection requester (client CL1a) (321), and waits for a response from the connection requester (322). Upon receiving a connection acknowledgement message from the connection requester, the SIP message processing module 53P analyzes the received message (323), forwards a connection acknowledgement message, to which a new Via header was added, to the destination server (324), and terminates this routine.

Figure 42:
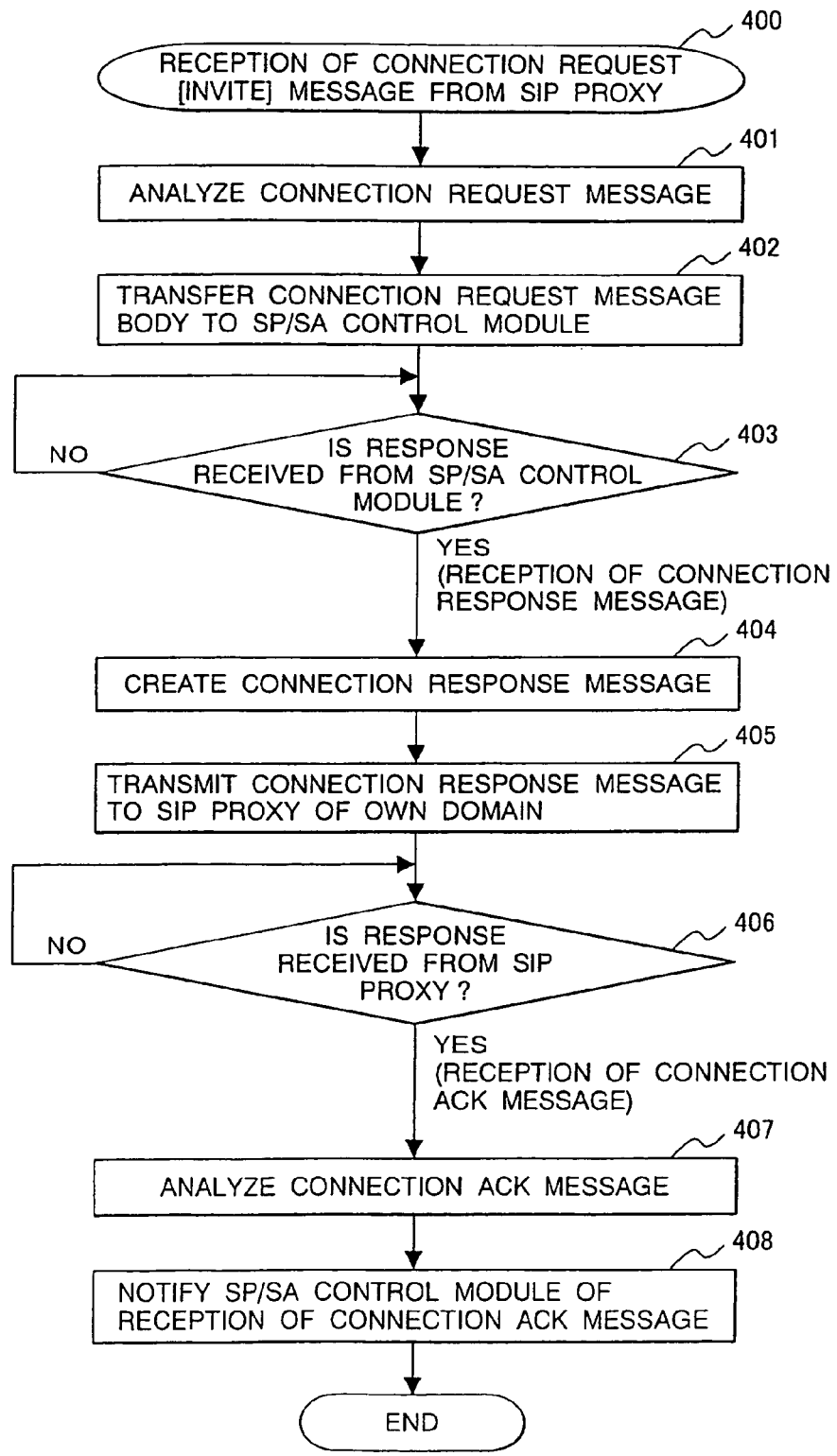
FIG. 42 is a flowchart illustrating control operation to be performed by a SIP message processing module 53S on a server SV1b, when receiving a connection request message.

FIG. 42 shows a flowchart 400 of control operation to be performed by the SIP message processing module 53S on the destination server SV1b, when receiving a connection request message M9 from the SIP proxy PRb. The connection request message M9 transmitted from the SIP proxy PRb to the destination server SV1b is decrypted by the TLS module 52S and input to the SIP message processing module 53S. Upon receiving the connection request message M9, the SIP message processing module 53S analyzes the received message (step 401), transfers the connection request message body M5-2 extracted from the received message to the encrypted communication control module 51S (402), and waits for a response from control module 51S (403).

Upon receiving a connection response message body M10-2 from the encrypted communication control module 51S, the SIP message processing module 53S creates a connection response message M11 illustrated in FIG. 25 (404). The SIP message processing module 53S forwards the connection response message M11 to the SIP proxy PRb via the TLS module, TCP/IP module, and NIC module (405) and waits for a response from the SIP proxy PRb (406). Upon receiving a connection acknowledgment message M15 from the SIP proxy PRb, the SIP message processing module 53S analyzes the received message (407), notifies the control module 51S of receiving of the connection acknowledgment message M15 (408), and terminates this routine.

Figure 43:
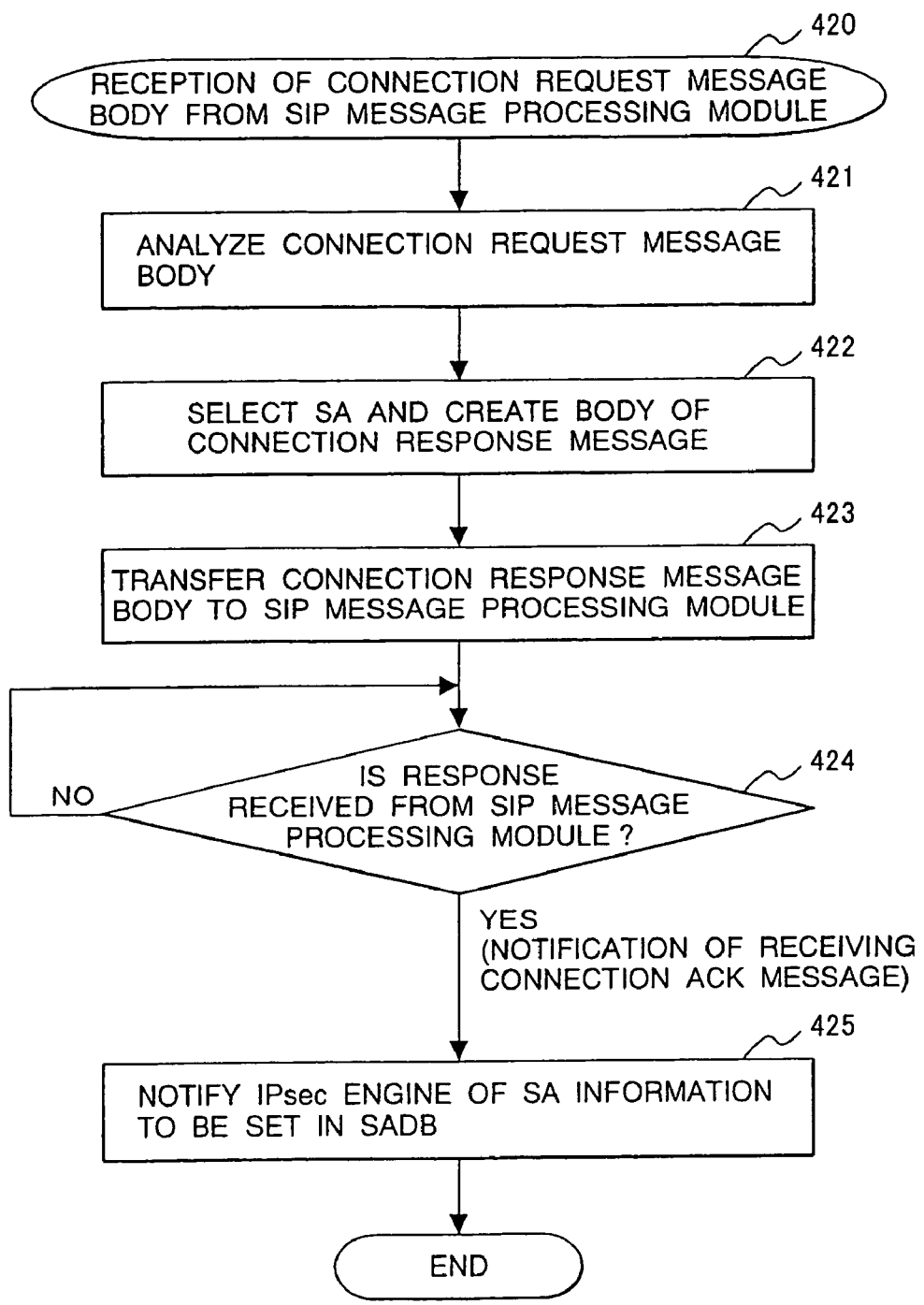
FIG. 43 is a flowchart illustrating control operation to be performed by the encrypted communication control module 51S on the server SV1b, when receiving the connection request message body.

FIG. 43 shows a flowchart 500 of control operation to be performed by the encrypted communication control module 51S on the server SV1b, when receiving the connection request message body M5-2 from the SIP message processing module 53S.

The encrypted communication control module 51S analyzes the connection request message body M5-2 received from the SIP message processing module 53S (step 421), selects SA to be used for encrypted communication with the client out of SA information specified in the connection request message body M5-2 (transform payloads 92-1, 92-2 in the example of FIG. 8), and creates the body M10-2 of the connection response message illustrated in FIG. 24 (422). The encrypted communication control module 51S transfers the connection response message body M10-2 to the SIP message processing module 53S (423) and waits for a response from the SIP message processing module 53S (424). Upon receiving the notification of receiving of the connection acknowledgement message from the SIP message processing module 53S, the control module 51S sets the SA information to the SADB 33S (425), and terminates this routine.

Figure 44:
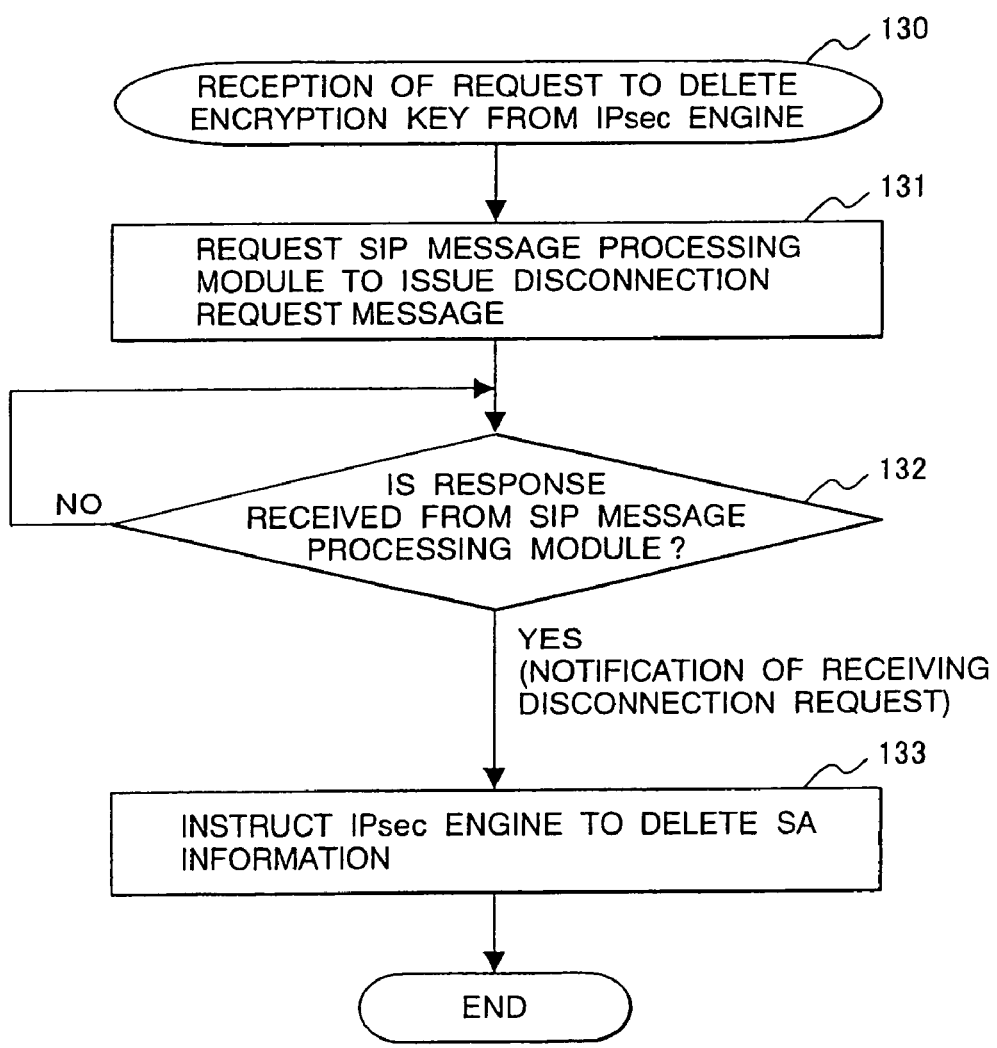
FIG. 44 is a flowchart illustrating control operation to be performed by the encrypted communication control module 51C on the client CL1a, when receiving a request to delete key information.

FIG. 44 shows a flowchart 130 of control operation to be performed by the encrypted communication control module 51C on the client CL1a in response to a request to terminate communication issued by the encryption engine 31C. When the user of the client CL1a terminates the application for communicating with the server SV1b, a request to terminate the communication is issued from the encryption engine 31C to the encrypted communication control module 51C. Upon receiving the request to terminate the communication from the engine 31C, the control module 51C requests the SIP message processing module 53C to issue a disconnection request message (131) and waits for a response from the SIP message processing module 53C (132). Upon receiving notification of receiving of a disconnection response message from the SIP message processing module 53C, the control module 51C deletes from the SADB 33S the setting value corresponding to the encryption key detection request (133), and terminates this routine.

Figure 30:
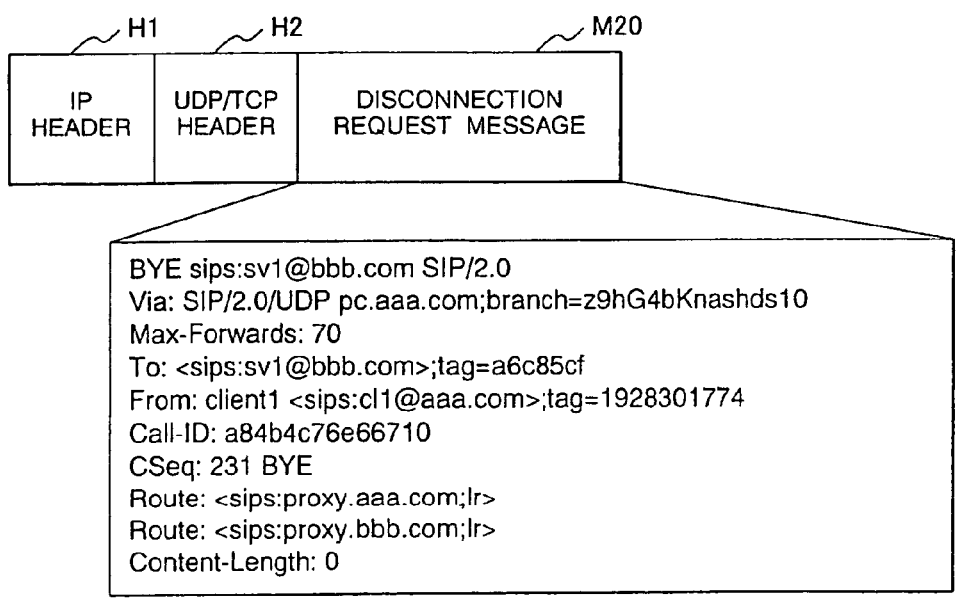
FIG. 30 shows an example of a format of a disconnection request [BYE] message M20 shown in FIG. 12.
Figure 45:
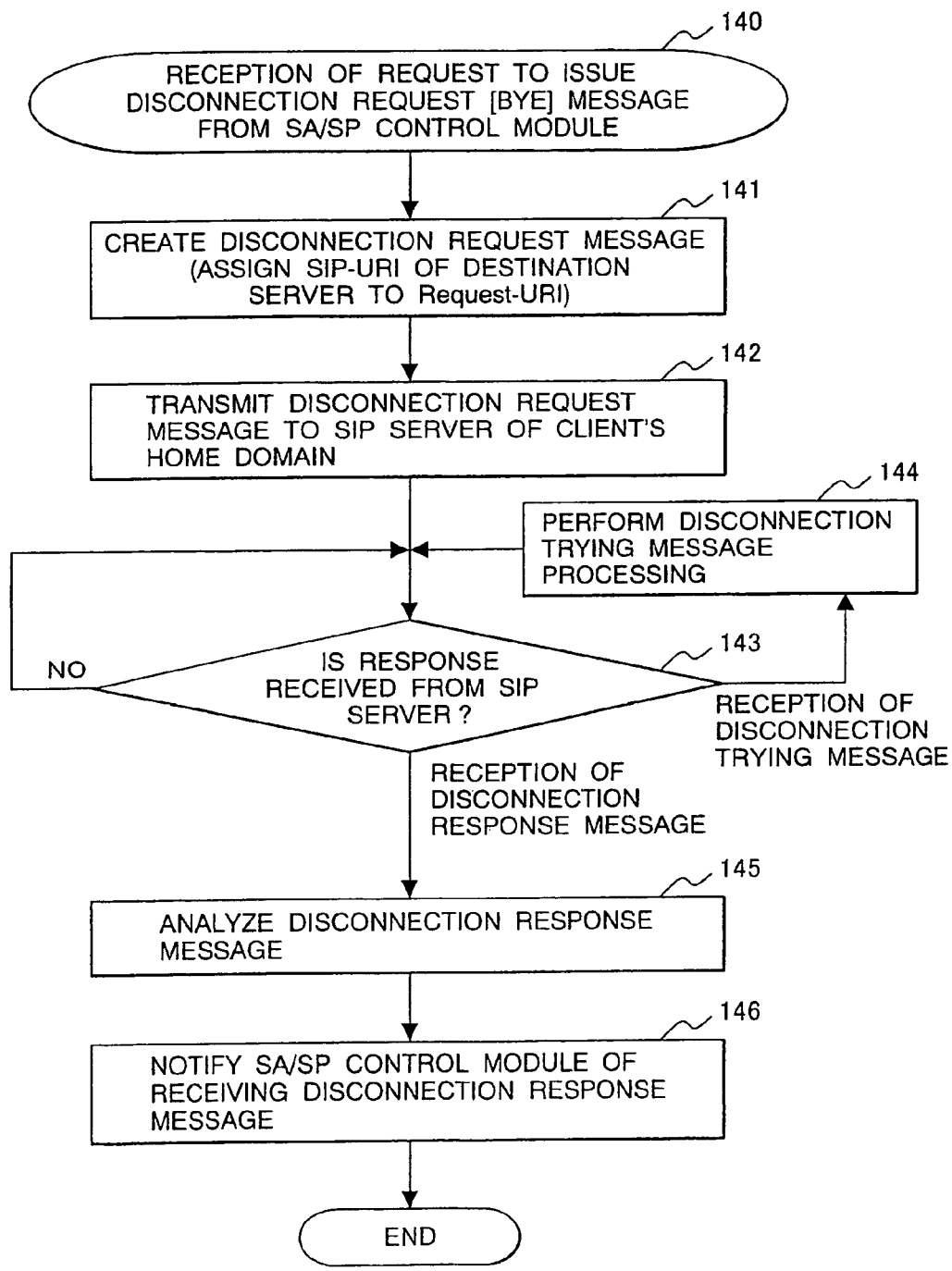
FIG. 45 is a flowchart illustrating control operation to be performed by the SIP message processing module 53C on the client CL1a, when receiving a request to issue a disconnection request message.

FIG. 45 shows a flowchart 140 of control operation to be performed by the SIP message processing module 53C, when receiving the request to issue a disconnection request message from the SP/SA control module 51C. Upon receiving the request to issue a disconnection request message from the SP/SA control module 51C, the SIP message processing module 53C creates a disconnection request message M20 illustrated in FIG. 30 (step 141) and transmits an IP packet including the disconnection request message M20 to the SIP server SIPa (SIP proxy PRa) via the TLS module 52C, the encryption engine 31C in the TCP/IP module 30C, and the NIC module 20C (142).

The SIP message processing module 53C waits for a response from the SIP proxy PRa (143). When receiving a disconnection trying message M21, the SIP message processing module 53C performs processing of the disconnection trying message (144) and waits for the next response from the SIP proxy PRa. When receiving a disconnection response message M27 illustrated in FIG. 37 from the SIP proxy PRa, the SIP message processing module 53C analyzes the received message (145), notifies the encrypted communication control module 51C of receiving of the disconnection response message (146), and terminates this routine.

Figure 46A:
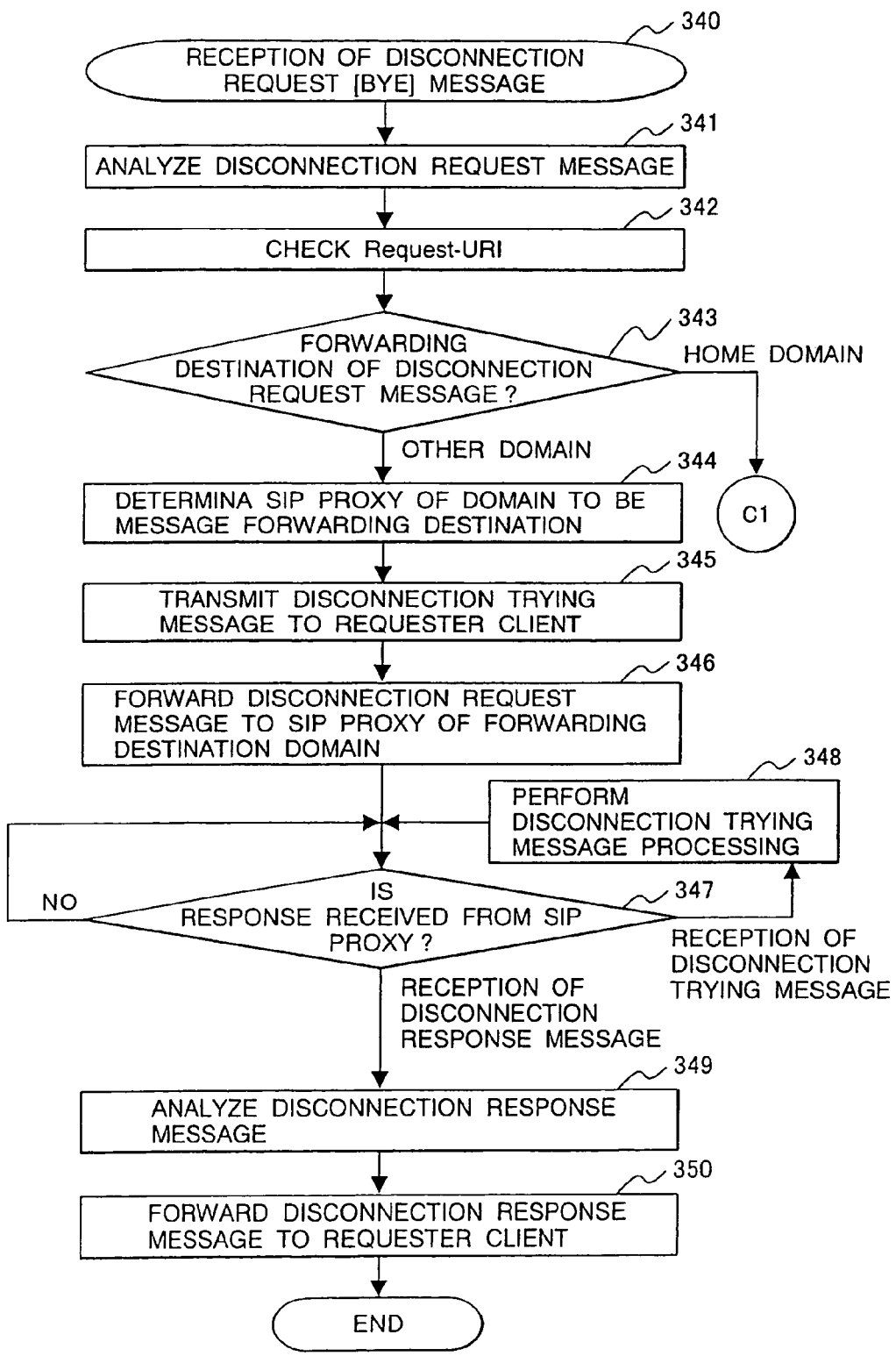
FIG. 46A is a part of a flowchart illustrating control operation to be performed by the SIP message processing module 53P on the SIP proxy PRa, when receiving a disconnection request message.
Figure 46B:
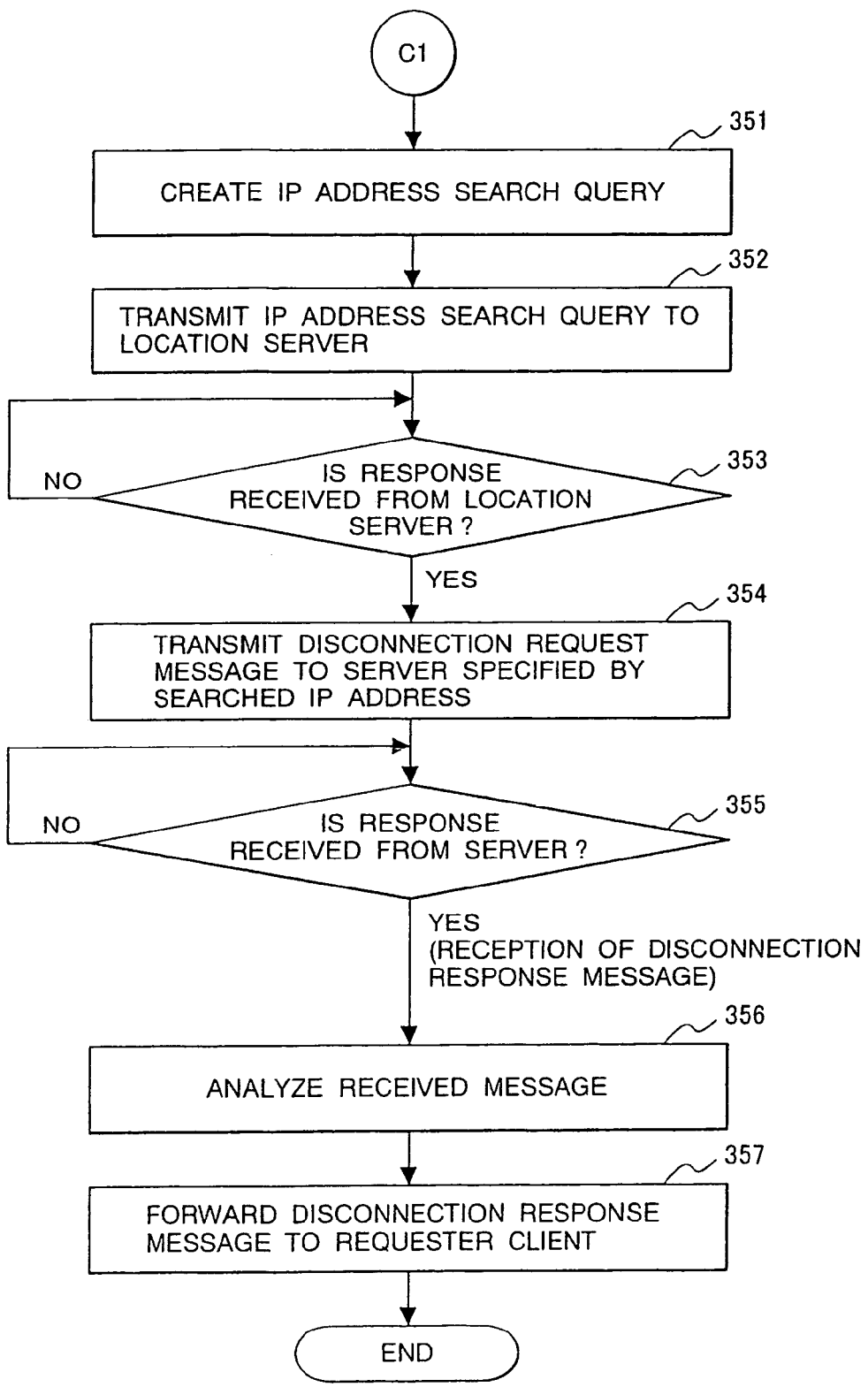
FIG. 46B is the remaining part of the flowchart illustrating control operation to be performed by the SIP message processing module 53P on the SIP proxy PRa, when receiving the disconnection request message.

FIGS. 46A and 46B show a flowchart 340 of control operation to be performed by the SIP message processing module 53P on the SIP proxy PRa, when receiving a disconnection request message M20 from the client. The SIP message processing module 53P analyzes the received disconnection request message M20 (step 341) and checks the Request-URI in the received message (342). The SIP message processing module 53P determines the forwarding destination of the received message from the domain name specified in the Request-URI (343). If having determined that the forwarding destination belongs to a domain other than the home domain of the SIP proxy PRa, the SIP message processing module 53P determines a SIP server (SIP proxy) in the domain, to which the received message should be forwarded, by DNS search (NAPTR search+SRV search+A search) or the like (344).

In the example shown in FIG. 12, the SIP proxy PRb is found as the forwarding destination of the disconnection request message M20 by the DNS search. In this case, the SIP message processing module 53P transmits a disconnection trying message M21 illustrated in FIG. 31 to the client CL1a that is the source of the disconnection request message M20 via the TLS module 52P, TCP/IP module 30P, and NIC module 20P (345). Then, the SIP message processing module 53P forwards to the SIP proxy PRb a disconnection request message M22 obtained by adding a new Via header to the disconnection request message M20 and eliminating the Route header corresponding to the SIP proxy PRa therefrom (346) and waits for a response from the SIP proxy PRb (347).

Upon receiving a disconnection trying message M23 from the SIP proxy PRb, the SIP message processing module 53P performs processing of the disconnection trying message (348) and waits for the next response from the SIP proxy PRb. Upon receiving a disconnection response message M26 from the SIP proxy PRb, the SIP message processing module 53P analyzes the received message (349), converts the received message into a disconnection response message M27 by eliminating the Via header including its own SIP-URI from the received message, forwards the message M27 to the disconnection requester client CL1a (350), and terminates this routine.

If, it is determined by the decision step 343 that the forwarding destination of the disconnection request message M20 received from the client terminal CL1a belongs to the same domain as for the SIP proxy PRa, the SIP message processing module 53P creates a location data (IP address) search query using the SIP-URI given by the Request URI in the received message as a search key (351), transmits the location data search query to the location server LSV (352), and waits for a location service response (353).

Upon receiving location data from the location server LSV, the SIP message processing module 53P transmits an IP packet of a disconnection request message, in which the IP address of the server given by the location data is assigned to the destination IP address, onto the network NW1 (354) and waits for a response from the server (355). To this disconnection request message, a new Via header including the SIP-URI of the SIP proxy PRa is added. Upon receiving a disconnection response message from the server that is the destination of the disconnection request message, the SIP message processing module 53P analyzes the received message (356), forwards a disconnection request message from which the Via header specifying its own node was eliminated to the disconnection requester (357), and terminates this routine.

Figure 47:
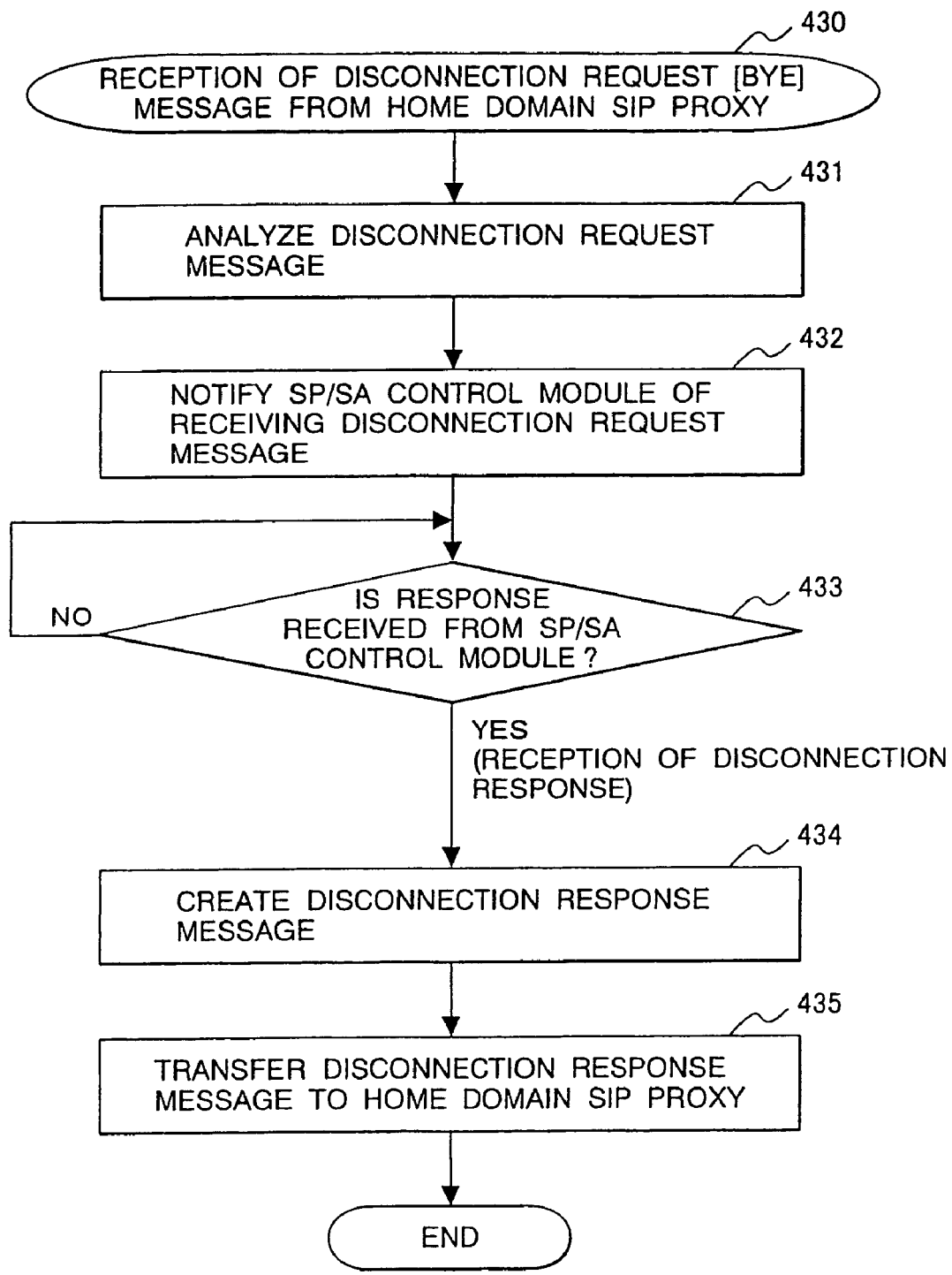
FIG. 47 is a flowchart illustrating control operation to be performed by the SIP message processing module 53S on the server SV1b, when receiving a disconnection request message.

FIG. 47 shows a flowchart of control operation to be performed by the SIP message processing module 53S on the server SV1b, when receiving a disconnection request message M24 from the SIP proxy. Upon receiving the disconnection request message M24 via the TLS module 52S, the SIP message processing module 53S analyzes the received message (step 431), notifies the encrypted communication control module 51S of receiving of the disconnection request message designating identification information of session to be disconnected (e.g., Call-ID) (432), and waits for a response from the control module 51S (433). Upon receiving a disconnection response from the control module 51S, the SIP message processing module 53S creates a disconnection response message M25 illustrated in FIG. 35 (424), forwards the message M25 to the SIP proxy PRb via the TLS module, TCP/IP module, and NIC module (435), and terminates this routine.

Figure 48:
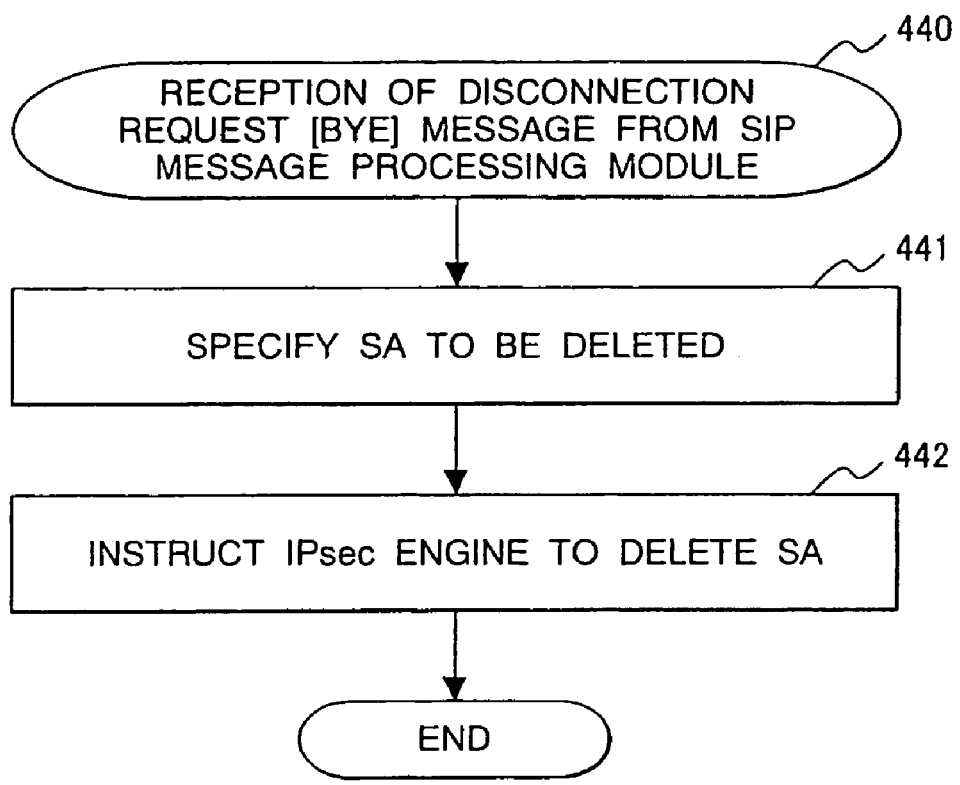
FIG. 48 is a flowchart illustrating control operation to be performed by the encrypted communication control module 51S on the server SV1b, when receiving notification of a disconnection request occurring.

FIG. 48 shows a flowchart of control operation to be performed by the encrypted communication control module 51S, when receiving the notification of a disconnection request occurring from the SIP message processing module 53S. The encrypted communication control module 51S identifies SA information to be deleted from the SADB 33S, based on the communication identification information notified (step 441), deletes the SA information (442), and terminates this routine.

In the embodiment, the body part of the registration request message includes the identification information such that the identification information management table 64 is updated by analyzing the message. However, the present invention is not restricted by the embodiment. That is, the manager of the location server LSV may beforehand set values to the table 64 or part of the entries thereof.

Next, by referring to FIGS. 49 through 54, a second embodiment of encrypted data communication according to the present invention will be described. In the first embodiment, the SIP proxy PR and the registrar RG are operating on one and the same SIP server. When searching for the relation between the identification information and the SIP-URI in the identification information management table 64, a searching SIP message is employed such that the SIP proxy PR makes a search through the table 64 according to the header of the SIP message. The communication between the client or the sever and the SIP server is protected by TLS.

According to one aspect of the second embodiment of the present invention, there is provided an identification information management server ISV on which an identification information management service 65 operates to register and to delete location information to and from the identification information management table 64 and to make a search through the table 64. Additionally, the body part of the SIP message exchanged between the client or the server and the table 64 is protected using message cryptograph (S/MINE).

Figure 49:
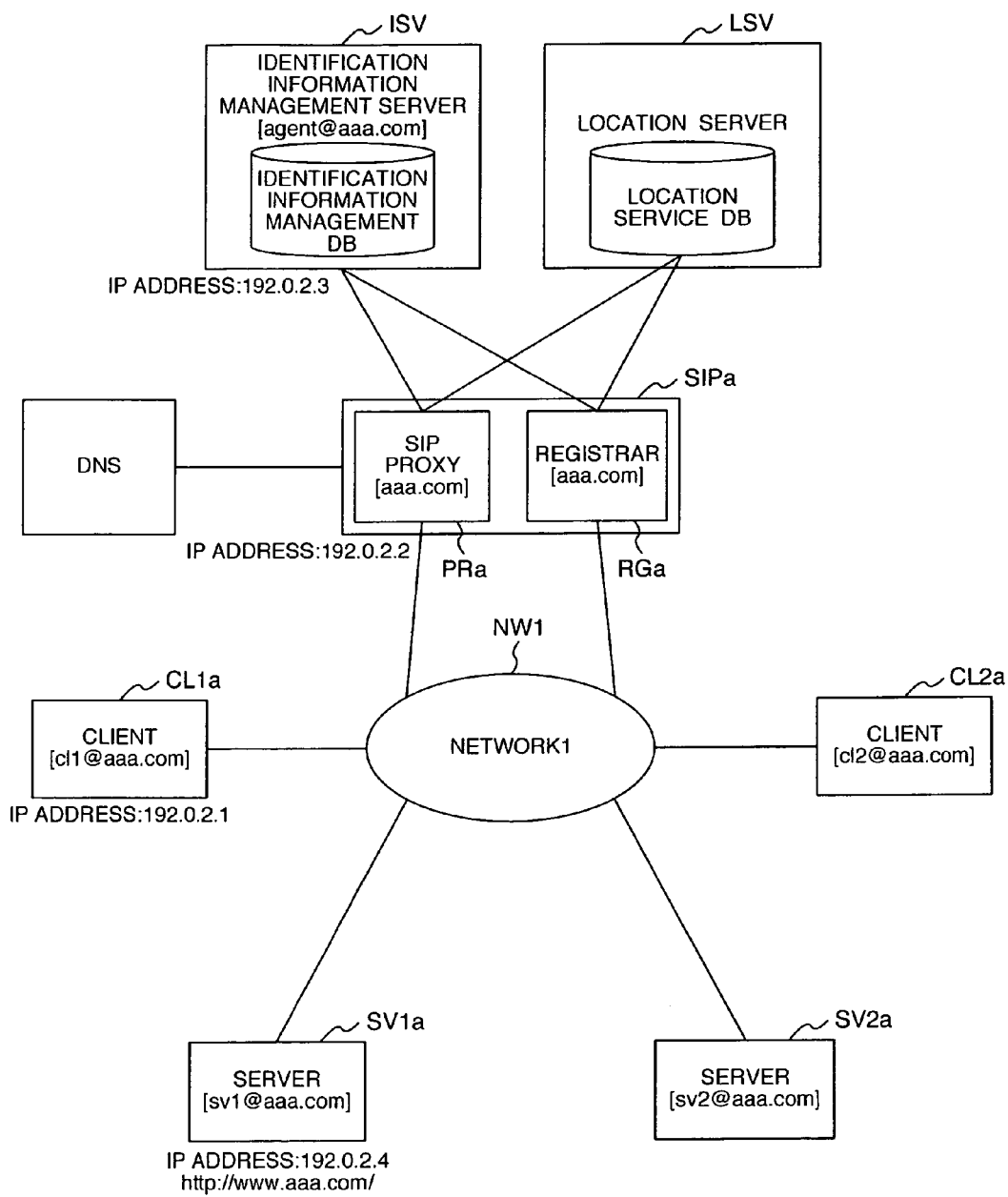
FIG. 49 is an example of a network configuration of a second embodiment of encrypted communication according to the present invention.

The network configuration in the second embodiment includes as shown in FIG. 49 a network NW1, a location server LSV, a Domain Name System (DNS), and an identification information management server ISV which are managed by an SIP server SIPa.

The network NW1 is coupled with clients CL1a and CL2a and servers SV1a and SV2a. The SIP server SIPa includes an SIP proxy PRa and a registrar PGa.

The management server ISV is assigned with an SIP-URI "agent@aaa.com". The client CL or the sever SV of the embodiment updates the contents of the management table 64 by transmitting an SIP message requesting location registration or registration cancellation to the associated SIP-UEI. Moreover, the client CL or the sever SV of the embodiment retrieves the contents of the management table 64 by transmitting an SIP message requesting AOR acquisition to the SIP-URI.

Figure 50:
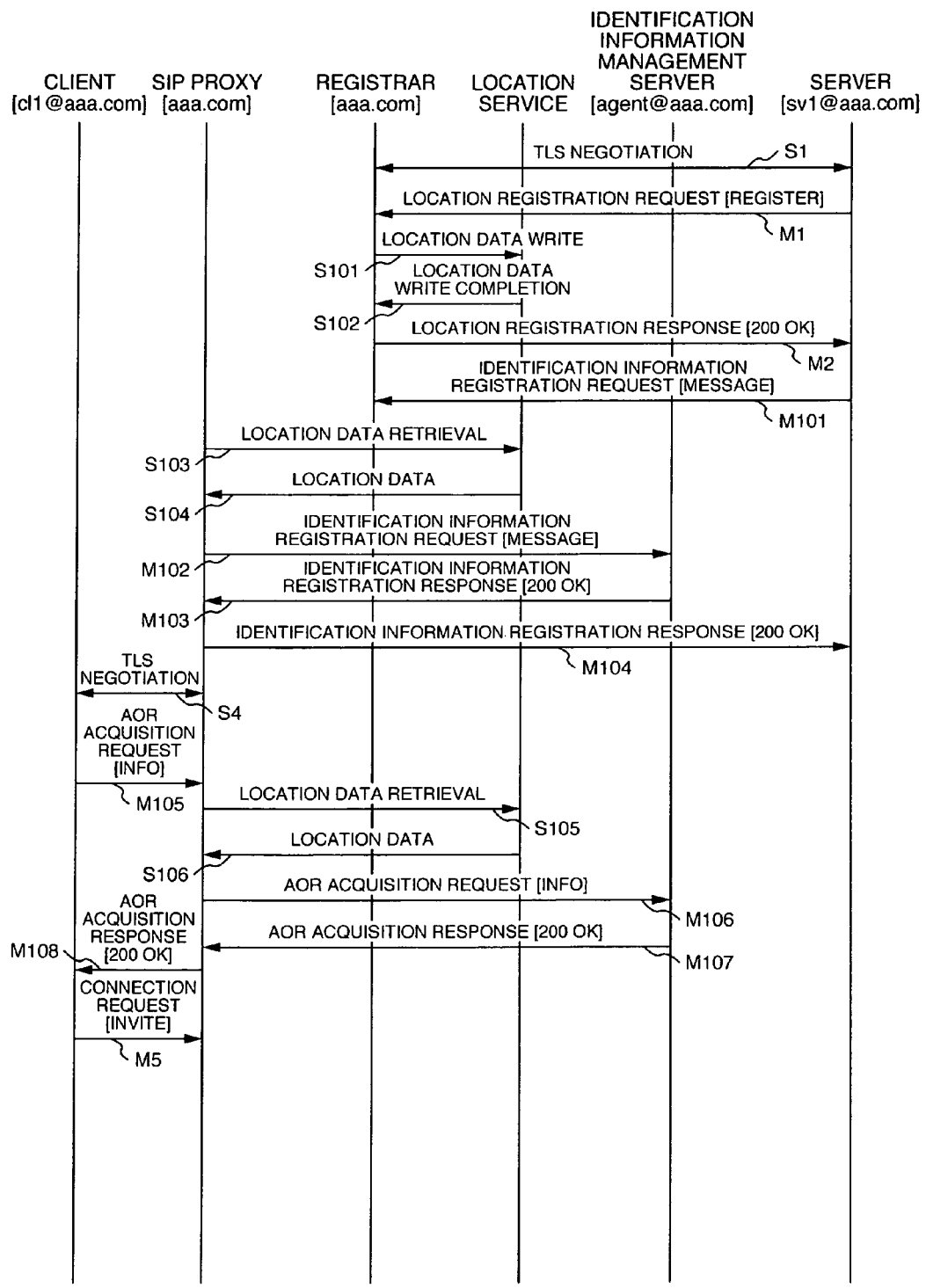
FIG. 50 is part of a sequence chart for illustrating the second embodiment of encrypted communication according to the present invention.

FIG. 50 shows an encrypted communication sequence chart of the second embodiment. Description of the steps and the messages assigned with the same reference numerals as those of the first embodiment shown in FIGS. 11 and 12 and already described in conjunction therewith will be avoided. In the second embodiment, before a connection request from the client CL1a, the server SV1a conducts the TLS negotiation (S1) between the SIP server SIPa and the registrar RGa for the authentication of the server SV1a and the setup of parameters for encrypted communication and then transmits a location registration request message M1 to the registrar RGb.

When the message M1 is received, the registrar RGa registers to the location service table 60 in the location service DB a relation between the request source SIP-URI "sv1@aaa.com" indicated by the From header of the received message and the request source IP address "sv1@192.0.2.4" indicated by the Contact header (S101). When the data registration is completed (S102), the registrar RGa sends a location registration response message M2 to the server SV2a.

When the message M2 is received, the server SV1a transmits to the SIP server SIPa an identification information registration message M101 (SIP message: MESSAGE) addressed to the authentication information management server ISV.

Figure 51:
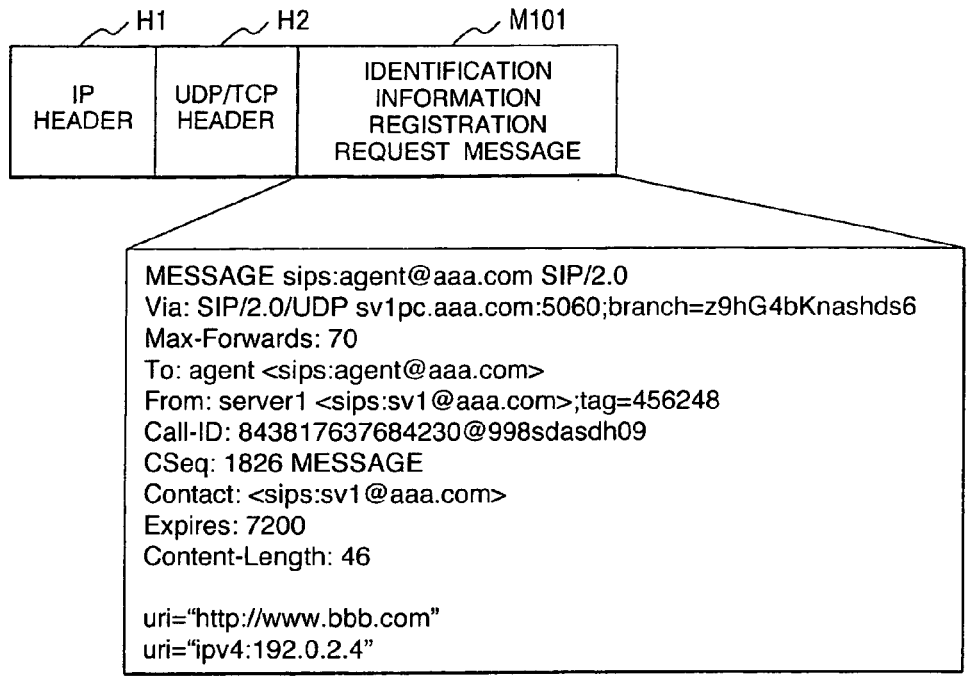
FIG. 51 shows an example of a format of an identification information registration request message M101 shown in FIG. 50.

As shown in FIG. 51, the message M101 includes in the start line, for example, "MESSAGE" indicating the type of the SIP message and "agent@aaa.com" as the SIP-URI of the authentication information management server ISV as well as the value of the FQDN of the server SV1a in the Via header. Additionally, "agent@aaa.com" as the SIP-URI of the authentication information management server ISV is set to the To header, and "sips:sv1@aaa.com" is set as the SIP-URI of the server SV1a to the From header. The message M101 also includes an Expire header indicating the valid time of the message, a Content-Length header indicating the length of the subsequent message body part, and other header information. The message body part of the message M101 further includes the list of identification information 63 of the server SV1a.

When the message M101 is received, the SIP server SIPa makes a search through the location database using, as a key, "agent@aaa.com" as the destination of the message M101 (S103) to obtain the IP address "192.168.0.3" of the management server ISV (S104) and then sends an identification information registration request message M102 to the IP address (M102).

Figure 52:
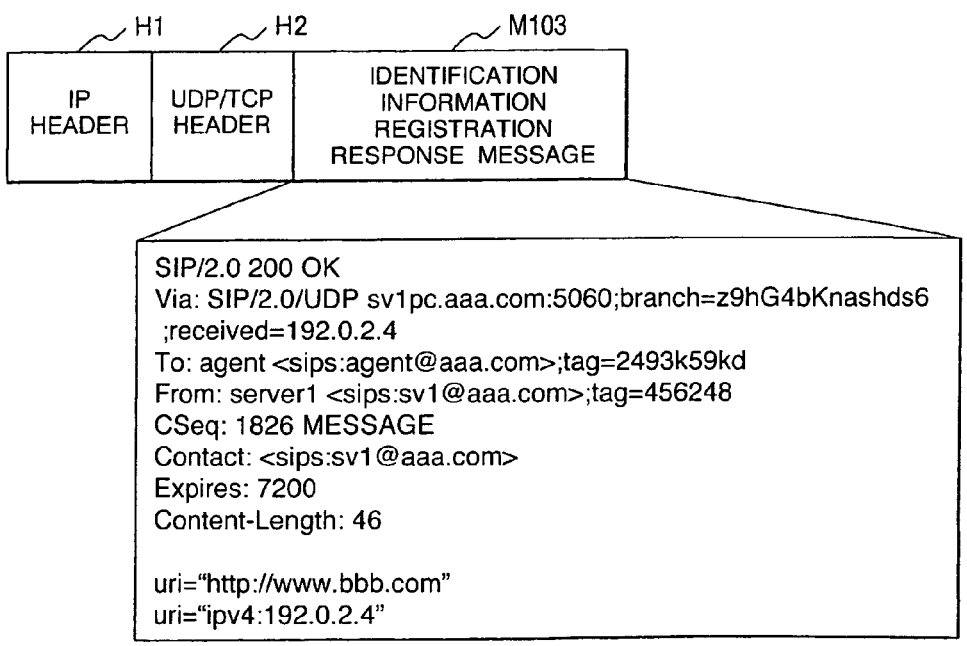
FIG. 52 shows an example of a format of an identification information registration response message M103 shown in FIG. 50.

Having received the message M102, the management server ISV stores in the identification information management table 64 various identification information 63 of the body part of the message M102 with a relation established between the information 63 and the transmission source SIP-URI "sips:sv1@aaa.com" of the identification information registration request message M101 and then transmits an identification information registration response message M103 (SIP message: 200 OK) shown in FIG. 52 to the SIP server SIPa. The start line of the message M103 includes the SIP message type, i.e., "200 OK" indicating a response message, and header information substantially equal in the contents to that of the location registration request message M1 is set to the header part.

When the message M103 is received, the SIP server SIPa sends an identification information registration response message M104 to "sips:sv1@aaa.com" as the destination (transmission source?) of the message M103 (M104).

In this situation, if the user of the client CL1a conducts operation to initiate an application program to issue a communication request to the URL "http:/www.aaa.com/" of the server SV1a in the second embodiment, the client CL1a first conducts the TLS negotiation (S4) to set parameters for the client authentication and the encrypted communication and then sends to the SIP server SIPa an Address-Of-Record (AOR) request message (SIP message: INFO) M105 addressed to the authentication information management server ISV.

Figure 53:
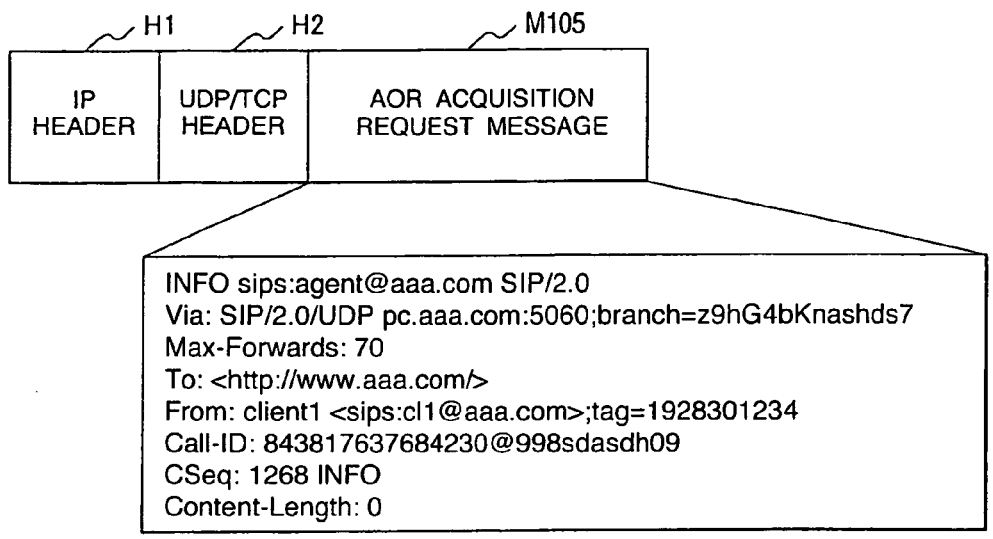
FIG. 53 shows an example of a format of an AOR acquisition request message M105 shown in FIG. 50.

As shown in FIG. 53, the message M105 includes in the start line, for example, "INFO" indicating the type of the SIP message and "sips:sv1@aaa.com" as the SIP-URI of the authentication information management server ISV, and the Via header indicates the value of the FQDN of the client CL1a. Additionally, "http:/www.aaa.com/" as the URL of the server SV1a as the connection partner of the client CL1a is set to the To header and "sips:sv1@aaa.com" as the URI of the client CL1a is set to the From header.

When the message M105 is received, the SIP server SIPa makes a search through the location database using, as the key, "agent@aaa.com" as the destination of the message M105 (S105) to obtain the IP address of the management server ISV (S106) and then sends the message M105 to the IP address (M106).

When the message M105 is received, the management server ISV retrieves, from the domain management table 64 of the domain management database, the value of the AOR (URI of the server SV1a) corresponding to the URL "http:/www.aaa.com/" indicated by the To header of the received message. When the retrieval is finished, the server ISV transmits an AOR acquisition response message M107 via the SIP server SIPa to the request source client CL1a.

Figure 54:
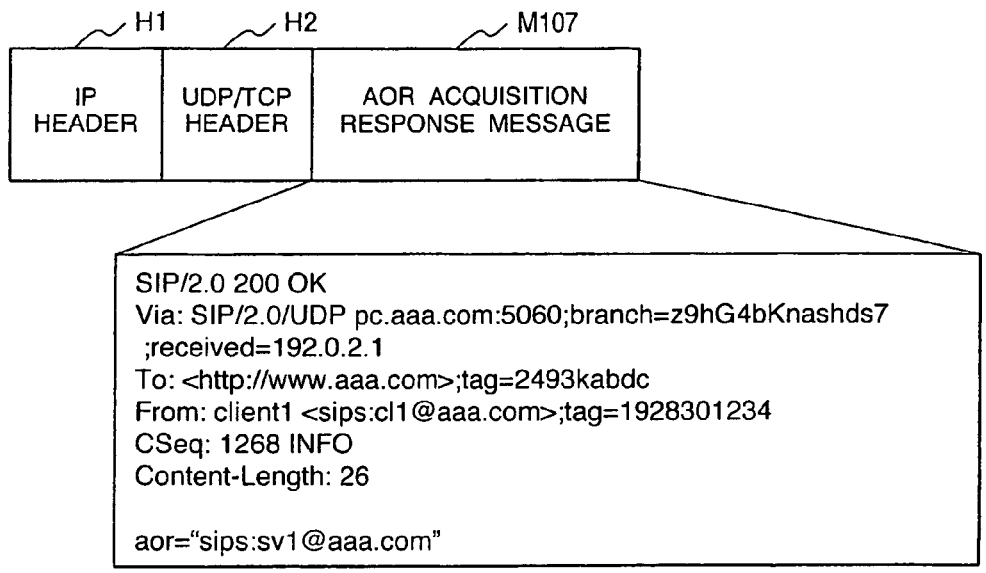
FIG. 54 shows an example of a format of an AOR acquisition response message M107 shown in FIG. 50.

As shown in FIG. 54, the message M107 includes in the start line, for example, "200 OK" indicating that the type of the message is a response message; and header information substantially equal in the contents to that of the message M105 is set to the header part, and the value indicating "sv1@aaa.com" of the SIP-URI of the server SV1a retrieved from the table 64 is set to the body part.

The client CL1a having obtained the SIP-URI of the server SV1a by receiving the message M105 sends to the SIP proxy PTa a connection request message M5 addressed to the server SV1a.

The subsequent operation is almost the same as that of the first embodiment and hence description thereof will be avoided.

Figure 14:
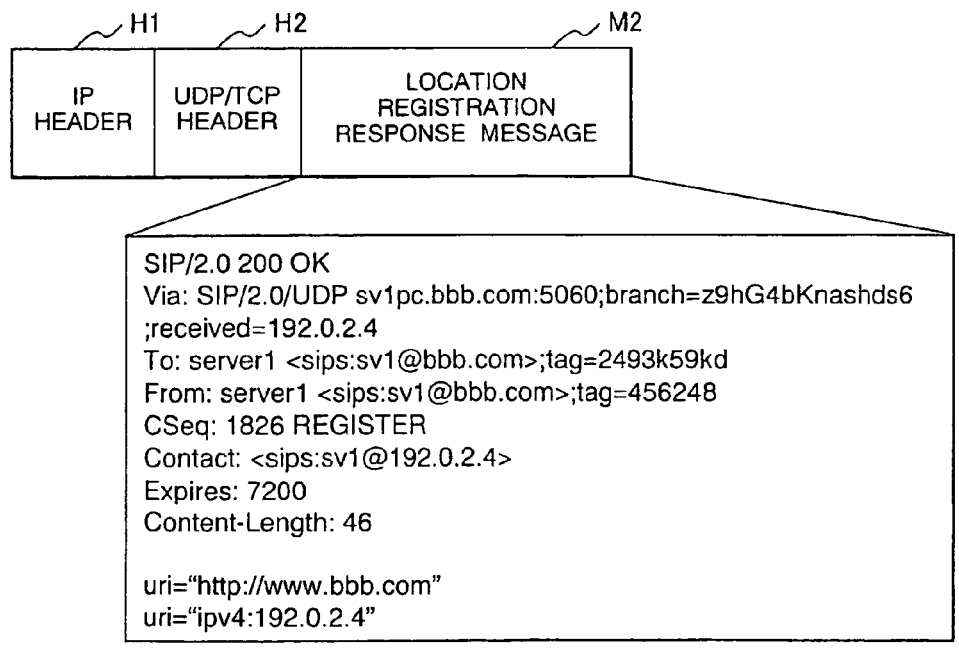
FIG. 14 shows an example of a format of a location registration response [200 OK] message M2 shown in FIG. 11.

In the described embodiments, an IP address that is assigned to the Request-URI and the To header in an SIP message is assumed to be described in the form like "sips: 192.0.2.4" provided, for example, in FIG. 14 and FIG. 51. In this case, a SIP proxy, registrar, or server having received the SIP message can determine whether the message adopts SIP- URI description or IP address description, by judging whether the character string following the "sips:" in the checked field has an IP address notation in which three or less digits numbers each delimited by a dot are arranged. To ensure the discrimination between SIP-URI description and IP address description, an URI parameter may be appended to clarify that it is a SIP-URI requiring AOR resolution; for example, like "sips:192.0.2.4; id=ipv4". It may be stipulated that if a scheme such as an IPv4 (or IPv6) is detected in the checked field, an IP address always follows thereafter, for example, like "ipv4: 192.0.2.4".

In the embodiments, when an operation is conducted such that the application program of the client sends a packet to the IP address of the connection destination server, an AOR request message is sent to the SIP server to acquire the SIP-URI corresponding to the IP address of the connection destination server. However, the present invention is not restricted by the embodiments, but is applicable to acquire, from connection destination identifiers of an arbitrary system used by the application program, a resource identifier (an identifier adopted by the session management server to identify the destination server) corresponding to the destination identifier. For example, in an operation in which the client application program requests connection to a URL including information specifying a destination server, it is also possible to send to the SIP server an AOR request message to acquire an SIP-URI corresponding to the URL. In this situation, the URL may be beforehand registered to the SIP server. Or, the location registration request message used by the destination server for location registration may include a list of URLs which can be accessed by the destination server.

Although the communication between the client or the server and the SIP server is protected by the TLS in the embodiments, the present invention is not restricted by the embodiments. That is, the communication may be protected by the S/MIME. In the second embodiment, an SIP message protected by the S/MIME may be communicated between the client or the server and the identification information management server ISV.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data communication method for communication between a client and a destination server via a communication network to which session management servers are connected, comprising:
    a first step of sending from said client to first one of said session management servers a query, in which a known destination identifier of a destination server is specified, to request retrieval of a corresponding resource identifier including a domain name assigned to the destination server;
    a second step of retrieving by said first one of said session management servers, a resource identifier of said destination server corresponding to the known destination identifier of said destination server from an identification information management table indicating the correspondence of destination identifiers to resource identifiers, and notifying said client of the resource identifier;
    a third step of transmitting a connection request message from said client to said first one of said session management servers, said connection request message designating a request resource with the resource identifier of said destination server; and
    a fourth step of determining, by said first one of said session management servers having received the connection request message, a forwarding destination of the received connection request message based on a domain name included in the resource identifier specified in the received message, and forwarding the received message to the destination server or second one of said session management servers managing a domain to which the destination server belongs, and
    said first and second one of said session management servers are Session Initiation Protocol servers.

2. A data communication method for communication between a client and a destination server via a communication network to which session management servers are connected, comprising:
    a first step of transmitting a connection request message from said client to first one of said session management servers, said connection request message specifying a request resource with a known destination identifier of a destination server;
    a second step of retrieving, by said first one of said session management servers having received said connection request message, a resource identifier of said destination server corresponding to the known destination identifier of said destination server from an identification information management table indicating the correspondence of destination identifiers to resource identifiers;
    a third step of changing by said first one of said session management servers, the known destination identifier specifying the request resource in the received message to the resource identifier retrieved from said identification information management table; and
    a fourth step of determining by said first one of said session management servers, a forwarding destination of the received message based on a domain name included in the resource identifier, and forwarding the received message to the destination server or second one of said session management servers managing a domain to which the destination server belongs, and
    said first and second one of said session management servers are Session Initiation Protocol servers.

3. A data communication method for communication between a client and a destination server via a communication network to which session management servers are connected, comprising:
    a first step of sending from said client to a destination server a query for a resource identifier of said destination server, including a domain name assigned to the server;
    a second step of sending the resource identifier from said server to said client;
    a third step of transmitting a connection request message from said client to first one of said session management servers, said connection request message designating a request resource with the resource identifier of said destination server; and
    a fourth step of determining, by said first one of said session management servers having received the connection request message, a forwarding destination of the received connection request message based on a domain name included in said resource identifier specified in the received connection request message, and forwarding the received message to the destination server or second one of said session management servers managing a domain to which the destination server belongs, and said first and second one of said session management servers are Session Initiation Protocol servers.

4. The data communication method according to claim 1, further comprising:
   a fifth step of replying, in response to receiving said connection request message, a connection response message including parameters required for encrypted data communication from said destination server to said client via said first or second one of said session management servers; and
   a sixth step of communicating packets of messages encrypted in accordance with the parameters specified in said connection response message between said client and said destination server.

5. The data communication method according to claim 2, further comprising:
   a fifth step of replying, in response to receiving said connection request message, a connection response message including parameters required for encrypted data communication from said destination server to said client via said first or second one of said session management servers; and
   a sixth step of communicating packets of messages encrypted in accordance with the parameters specified in said connection response message between said client and said destination server.

6. The data communication method according to claim 3, further comprising:
   a fifth step of replying, in response to receiving said connection request message, a connection response message including parameters required for encrypted data communication from said destination server to said client via said first or second one of said session management servers; and
   a sixth step of communicating packets of messages encrypted in accordance with the parameters specified in said connection response message between said client and said destination server.

7. The data communication method according to claim 1, wherein:
   messages to be communicated between said client and said first and second one of said session management servers are encrypted according to Transport. Layer Security defined in RFC 3261; and
   said known destination identifier of the destination is an IP address.

8. The data communication method according to claim 2, wherein:
   messages to be communicated between said client and said first and second one of said session management servers are encrypted according to Transport Layer Security defined in RFC 3261; and
   said known destination identifier of the destination is an IP address.

9. The data communication method according to claim 3, wherein:
   messages to be communicated between said client and said first and second one of said session management servers are encrypted according to Transport Layer Security defined in RFC 3261; and
   said known destination identifier of the destination is an IP address.

10. The data communication method according to claim 4, wherein data to be communicated between said client and said destination server is encrypted according to Internet Protocol Security (IPsec) defined in RFC 2401.

11. The data communication method according to claim 5, wherein data to be communicated between said client and said destination server is encrypted according to Internet Protocol Security (IPsec) defined in RFC 2401.

12. The data communication method according to claim 6, wherein data to be communicated between said client and said destination server is encrypted according to Internet Protocol Security (IPsec) defined in RFC 2401.

13. The session management server according to claim 7, further comprising:
   a network interface connected to said communication network;
   a message processing module adapted to process session control messages; and
   a security module adapted to decrypt an encrypted message received from said network interface to transfer a decrypted message to said message processing module and to encrypt a session control message received from said message processing module to output an encrypted message to said network interface,
   wherein said message processing module is provided with the functions of a first unit adapted to change the description of said request resource and a second unit adapted to forward the received message.

* * * * *

UNITED STATES PATENT AND TRADEMARK OFFICE
CERTIFICATE OF CORRECTION

| | | |
|---|---|---|
| PATENT NO. | : 8,205,074 B2 | Page 1 of 1 |
| APPLICATION NO. | : 11/637694 | |
| DATED | : June 19, 2012 | |
| INVENTOR(S) | : Hoshino et al. | |

It is certified that error appears in the above-identified patent and that said Letters Patent is hereby corrected as shown below:

Title Page Item (45), add --*-- before Jun. 19, 2012

On the Title Page:

The first or sole Notice should read --

Subject to any disclaimer, the term of this patent is extended or adjusted under 35 U.S.C. 154(b) by 1555 days.

This patent is subject to a terminal disclaimer. --

Signed and Sealed this
Twenty-seventh Day of November, 2012

David J. Kappos
*Director of the United States Patent and Trademark Office*